United States Patent
Nagai et al.

(10) Patent No.: US 9,747,533 B2
(45) Date of Patent: Aug. 29, 2017

(54) IMAGE PROCESSING APPARATUS AND IMAGE PROCESSING METHOD

(71) Applicant: CANON KABUSHIKI KAISHA, Tokyo (JP)

(72) Inventors: Hajime Nagai, Kawasaki (JP); Yoshinori Nakajima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/090,998

(22) Filed: Apr. 5, 2016

(65) Prior Publication Data

US 2016/0300129 A1    Oct. 13, 2016

(30) Foreign Application Priority Data

Apr. 8, 2015    (JP) .................. 2015-079488

(51) Int. Cl.
| | |
|---|---|
| *G06K 15/10* | (2006.01) |
| *B41J 2/21* | (2006.01) |
| *B41J 2/205* | (2006.01) |
| *G06K 15/02* | (2006.01) |

(52) U.S. Cl.
CPC ............ *G06K 15/107* (2013.01); *B41J 2/205* (2013.01); *B41J 2/21* (2013.01); *B41J 2/2139* (2013.01); *G06K 15/02* (2013.01); *G06K 15/102* (2013.01)

(58) Field of Classification Search
CPC .... G06K 15/107; G06K 15/102; G06K 15/02; B41J 2/205; B41J 2/21
See application file for complete search history.

(56) References Cited

U.S. PATENT DOCUMENTS 6,659,580 B2 * 12/2003 Horikoshi .............. B41J 2/0451
                                                        347/14

FOREIGN PATENT DOCUMENTS

| JP | 2000-094662 A | 4/2000 |
| JP | 2003-175592 A | 6/2003 |

* cited by examiner

*Primary Examiner* — Geoffrey Mruk
(74) *Attorney, Agent, or Firm* — Canon U.S.A., Inc. IP Division

(57) ABSTRACT

Replacement processing is executed when the number of times of permission for a pixel corresponding to an ejection defective nozzle in a mask pattern is larger than a smallest number of times of permission, of the numbers of times of permission for pixels corresponding to ejection normal nozzles.

20 Claims, 32 Drawing Sheets

| O: PRINTING<br>X: NON-PRINTING | | CODE VALUE OF MASK PATTERN | | | |
|---|---|---|---|---|---|
| | | 00 | 01 | 10 | 11 |
| PIXEL VALUE OF IMAGE DATA | 00 | X | X | X | X |
| | 01 | X | O | X | X |
| | 10 | X | O | X | O |
| | 11 | X | O | O | O |

FIG. 6A

| 700 | 701 | 702 | 703 |
|---|---|---|---|
| 704 | 705 | 706 | 707 |
| 708 | 709 | 710 | 711 |
| 712 | 713 | 714 | 715 |

FIG. 6B IMAGE DATA

| 11 | 10 | 01 | 00 |
|---|---|---|---|
| 11 | 10 | 01 | 00 |
| 11 | 10 | 01 | 00 |
| 11 | 10 | 01 | 00 |

MASK PATTERN

FIG. 6C-1 — 505

| 11 | 10 | 01 | 00 |
|---|---|---|---|
| 00 | 11 | 10 | 01 |
| 01 | 00 | 11 | 10 |
| 10 | 01 | 00 | 11 |

FIG. 6C-2 — 506

| 10 | 01 | 00 | 11 |
|---|---|---|---|
| 11 | 10 | 01 | 00 |
| 00 | 11 | 10 | 01 |
| 01 | 00 | 11 | 10 |

FIG. 6C-3 — 507

| 01 | 00 | 11 | 10 |
|---|---|---|---|
| 10 | 01 | 00 | 11 |
| 11 | 10 | 01 | 00 |
| 00 | 11 | 10 | 01 |

FIG. 6C-4 — 508

| 00 | 11 | 10 | 01 |
|---|---|---|---|
| 01 | 00 | 11 | 10 |
| 10 | 01 | 00 | 11 |
| 11 | 10 | 01 | 00 |

PRINT DATA

FIG. 6D-1

| 1 | 1 | 0 | 0 |
|---|---|---|---|
| 0 | 1 | 0 | 0 |
| 1 | 0 | 1 | 0 |
| 1 | 0 | 0 | 0 |

FIG. 6D-2

| 1 | 0 | 0 | 0 |
|---|---|---|---|
| 1 | 1 | 0 | 0 |
| 0 | 1 | 0 | 0 |
| 1 | 0 | 1 | 0 |

FIG. 6D-3

| 1 | 0 | 1 | 0 |
|---|---|---|---|
| 1 | 0 | 0 | 0 |
| 1 | 1 | 0 | 0 |
| 0 | 1 | 0 | 0 |

FIG. 6D-4

| 0 | 1 | 0 | 0 |
|---|---|---|---|
| 1 | 0 | 1 | 0 |
| 1 | 0 | 0 | 0 |
| 1 | 1 | 0 | 0 |

LOGICAL SUM OF PRINT DATA
(NUMBER OF TIMES OF INK EJECTION)

FIG. 6E

| 3 | 2 | 1 | 0 |
|---|---|---|---|
| 3 | 2 | 1 | 0 |
| 3 | 2 | 1 | 0 |
| 3 | 2 | 1 | 0 |

FIG. 7

| O: PRINTING<br>×: NON-PRINTING | | CODE VALUE OF MASK PATTERN | | | |
|---|---|---|---|---|---|
| | | 00 | 01 | 10 | 11 |
| PIXEL VALUE OF IMAGE DATA | 00 | × | × | × | × |
| | 01 | × | × | × | O |
| | 10 | × | × | O | O |
| | 11 | × | O | O | O |

FIG. 8A

| 800 | 801 | 802 | 803 |
|---|---|---|---|
| 804 | 805 | 806 | 807 |
| 808 | 809 | 810 | 811 |
| 812 | 813 | 814 | 815 |

FIG. 8B

IMAGE DATA

| 11 | 10 | 01 | 00 |
|---|---|---|---|
| 11 | 10 | 01 | 00 |
| 11 | 10 | 01 | 00 |
| 11 | 10 | 01 | 00 |

MASK PATTERN

FIG. 8C-1

| 11 | 10 | 11 | 01 |
|---|---|---|---|
| 01 | 11 | 10 | 11 |
| 01 | 10 | 11 | 10 |
| 10 | 01 | 01 | 11 |

| 10 | 01 | 10 | 11 |
|---|---|---|---|
| 11 | 10 | 01 | 01 |
| 10 | 11 | 10 | 01 |
| 01 | 11 | 11 | 10 |

| 01 | 11 | 01 | 10 |
|---|---|---|---|
| 10 | 01 | 11 | 10 |
| 11 | 01 | 01 | 11 |
| 11 | 10 | 10 | 01 |

⎫ 607

PRINT DATA

FIG. 8D-1

| 1 | 1 | 1 | 0 |
|---|---|---|---|
| 1 | 1 | 0 | 0 |
| 1 | 1 | 1 | 0 |
| 1 | 0 | 0 | 0 |

FIG. 8D-2

| 1 | 0 | 0 | 0 |
|---|---|---|---|
| 1 | 1 | 0 | 0 |
| 1 | 1 | 0 | 0 |
| 1 | 1 | 1 | 0 |

FIG. 8D-3

| 1 | 1 | 0 | 0 |
|---|---|---|---|
| 1 | 0 | 1 | 0 |
| 1 | 0 | 0 | 0 |
| 1 | 1 | 0 | 0 |

LOGICAL SUM OF PRINT DATA
(NUMBER OF TIMES OF INK EJECTION)

FIG. 8E

| 3 | 2 | 1 | 0 |
|---|---|---|---|
| 3 | 2 | 1 | 0 |
| 3 | 2 | 1 | 0 |
| 3 | 2 | 1 | 0 |

FIG. 10A

| 2 | 1 | 1 | 0 |
|---|---|---|---|
| 3 | 2 | 1 | 0 |
| 3 | 2 | 1 | 0 |
| 3 | 2 | 1 | 0 |

FIG. 10B

| 2 | 1 | 0 | 0 |
|---|---|---|---|
| 3 | 2 | 1 | 0 |
| 3 | 2 | 1 | 0 |
| 3 | 2 | 1 | 0 |

FIG. 12A

| 700 | 701 | 702 | 703 |
|---|---|---|---|
| 704 | 705 | 706 | 707 |
| 708 | 709 | 710 | 711 |
| 712 | 713 | 714 | 715 |

FIG. 12B

IMAGE DATA

| 11 | 10 | 01 | 00 |
|---|---|---|---|
| 11 | 10 | 01 | 00 |
| 11 | 10 | 01 | 00 |
| 11 | 10 | 01 | 00 |

MASK PATTERN BEFORE NON-EJECTION COMPLEMENT

FIG. 12C-1

| 11 | 10 | 01 | 00 |
|---|---|---|---|
| 00 | 11 | 10 | 01 |
| 01 | 00 | 11 | 10 |
| 10 | 01 | 00 | 11 |

| 10 | 01 | 00 | 11 |
|---|---|---|---|
| 11 | 10 | 01 | 00 |
| 00 | 11 | 10 | 01 |
| 01 | 00 | 11 | 10 |

| 01 | 00 | 11 | 10 |
|---|---|---|---|
| 10 | 01 | 00 | 11 |
| 11 | 10 | 01 | 00 |
| 00 | 11 | 10 | 01 |

| 00 | 11 | 10 | 01 |
|---|---|---|---|
| 01 | 00 | 11 | 10 |
| 10 | 01 | 00 | 11 |
| 11 | 10 | 01 | 00 |

} 508

MASK PATTERN AFTER NON-EJECTION COMPLEMENT

*FIG. 12C'-1*

| 11 | 10 | 01 | 00 |
|---|---|---|---|
| 00 | 11 | 10 | 01 |
| 01 | 00 | 11 | 10 |
| 10 | 01 | 00 | 11 |

| 10 | 01 | 01 | 11 |
|---|---|---|---|
| 11 | 10 | 01 | 00 |
| 00 | 11 | 10 | 01 |
| 01 | 00 | 11 | 10 |

| 01 | 10 | 11 | 10 |
|---|---|---|---|
| 10 | 01 | 00 | 11 |
| 11 | 10 | 01 | 00 |
| 00 | 11 | 10 | 01 |

| 11 | 11 | 10 | 01 |
|---|---|---|---|
| 01 | 00 | 11 | 10 |
| 10 | 01 | 00 | 11 |
| 11 | 10 | 01 | 00 |

} 508'

PRINT DATA

*FIG. 12D-1*

| 1 | 1 | 0 | 0 |
|---|---|---|---|
| 0 | 1 | 0 | 0 |
| 1 | 0 | 1 | 0 |
| 1 | 0 | 0 | 0 |

*FIG. 12D-2*

| 1 | 0 | 0 | 0 |
|---|---|---|---|
| 1 | 1 | 0 | 0 |
| 0 | 1 | 0 | 0 |
| 1 | 0 | 1 | 0 |

*FIG. 12D-3*

| 1 | 1 | 1 | 0 |
|---|---|---|---|
| 1 | 0 | 0 | 0 |
| 1 | 1 | 0 | 0 |
| 0 | 1 | 0 | 0 |

*FIG. 12D-4*

| 1 | 1 | 0 | 0 |
|---|---|---|---|
| 1 | 0 | 1 | 0 |
| 1 | 0 | 0 | 0 |
| 1 | 1 | 0 | 0 |

LOGICAL SUM OF PRINT DATA

*FIG. 12E*

| 4 | 3 | 1 | 0 |
|---|---|---|---|
| 3 | 2 | 1 | 0 |
| 3 | 2 | 1 | 0 |
| 3 | 2 | 1 | 0 |

NUMBER OF TIMES OF INK EJECTION

*FIG. 12F*

| 3 | 2 | 1 | 0 |
|---|---|---|---|
| 3 | 2 | 1 | 0 |
| 3 | 2 | 1 | 0 |
| 3 | 2 | 1 | 0 |

FIG. 13A

| 800 | 801 | 802 | 803 |
|---|---|---|---|
| 804 | 805 | 806 | 807 |
| 808 | 809 | 810 | 811 |
| 812 | 813 | 814 | 815 |

IMAGE DATA

FIG. 13B

| 11 | 10 | 01 | 00 |
|---|---|---|---|
| 11 | 10 | 01 | 00 |
| 11 | 10 | 01 | 00 |
| 11 | 10 | 01 | 00 |

MASK PATTERN BEFORE NON-EJECTION COMPLEMENT

FIG. 13C-1

| 11 | 10 | 11 | 01 |
|---|---|---|---|
| 01 | 11 | 10 | 11 |
| 01 | 10 | 11 | 10 |
| 10 | 01 | 01 | 11 |

| 10 | 01 | 10 | 11 |
|---|---|---|---|
| 11 | 10 | 01 | 01 |
| 10 | 11 | 10 | 01 |
| 01 | 11 | 11 | 10 |

| 01 | 11 | 01 | 10 |
|---|---|---|---|
| 10 | 01 | 11 | 10 |
| 11 | 01 | 01 | 11 |
| 11 | 10 | 10 | 01 |

⎬ 607

FIG. 13C'-1
MASK PATTERN AFTER NON-EJECTION COMPLEMENT

| 11 | 10 | 11 | 01 |
|----|----|----|----|
| 01 | 11 | 10 | 11 |
| 01 | 10 | 11 | 10 |
| 10 | 01 | 01 | 11 |

} 605'

FIG. 13D-1
PRINT DATA

| 1 | 1 | 1 | 0 |
|---|---|---|---|
| 1 | 1 | 0 | 0 |
| 1 | 1 | 1 | 0 |
| 1 | 0 | 0 | 0 |

FIG. 13C'-2

| 10 | 10 | 10 | 11 |
|----|----|----|----|
| 11 | 10 | 01 | 01 |
| 10 | 11 | 10 | 01 |
| 01 | 11 | 11 | 10 |

| 1 | 1 | 0 | 0 |
|---|---|---|---|
| 1 | 1 | 0 | 0 |
| 1 | 1 | 0 | 0 |
| 1 | 1 | 1 | 0 |

FIG. 13C'-3

| 11 | 11 | 11 | 10 |
|----|----|----|----|
| 10 | 01 | 11 | 10 |
| 11 | 01 | 01 | 11 |
| 11 | 10 | 10 | 01 |

| 1 | 1 | 1 | 0 |
|---|---|---|---|
| 1 | 0 | 1 | 0 |
| 1 | 0 | 0 | 0 |
| 1 | 1 | 0 | 0 |

FIG. 13E
LOGICAL SUM OF PRINT DATA

| 3 | 3 | 2 | 0 |
|---|---|---|---|
| 3 | 2 | 1 | 0 |
| 3 | 2 | 1 | 0 |
| 3 | 2 | 1 | 0 |

FIG. 13F
NUMBER OF TIMES OF INK EJECTION

| 2 | 2 | 1 | 0 |
|---|---|---|---|
| 3 | 2 | 1 | 0 |
| 3 | 2 | 1 | 0 |
| 3 | 2 | 1 | 0 |

FIG. 14

| NUMBER OF PASS | CODE VALUE OF COMPLEMENTARY SOURCE PIXEL | CODE VALUE OF COMPLEMENTARY DESTINATION CANDIDATE PIXEL | CODE VALUE OF COMPLEMENTARY DESTINATION PIXEL | CODE VALUE AFTER COMPLEMENT | PIXEL VALUE OF IMAGE DATA | NUMBER OF TIMES OF INK EJECTION BEFORE COMPLEMENT | NUMBER OF TIMES OF INK EJECTION AFTER COMPLEMENT |
|---|---|---|---|---|---|---|---|
| 4 | 00 | 01,10,11 | 01 | 01,10,11 | 00 | 0 | 0 |
| | | | | | 01 | 1 | 1 |
| | | | | | 10 | 2 | 2 |
| | | | | | 11 | 3 | 3 |
| | 01 | 00,10,11 | 00 | 01,10,11 | 00 | 0 | 0 |
| | | | | | 01 | 1 | 1 |
| | | | | | 10 | 2 | 2 |
| | | | | | 11 | 2 | 3 |
| | 10 | 00,01,11 | 00 | 01,10,11 | 00 | 0 | 0 |
| | | | | | 01 | 1 | 1 |
| | | | | | 10 | 1 | 2 |
| | | | | | 11 | 2 | 3 |
| | 11 | 00,01,10 | 00 | 01,10,11 | 00 | 0 | 0 |
| | | | | | 01 | 1 | 1 |
| | | | | | 10 | 1 | 2 |
| | | | | | 11 | 2 | 3 |
| 3 | 01 | 10,11 | 01 | 10,11 | 00 | 0 | 0 |
| | | | | | 01 | 1 | 1 |
| | | | | | 10 | 2 | 2 |
| | | | | | 11 | 2 | 2 |
| | 10 | 01,11 | 01 | 10,11 | 00 | 0 | 0 |
| | | | | | 01 | 1 | 1 |
| | | | | | 10 | 1 | 2 |
| | | | | | 11 | 2 | 2 |
| | 11 | 01,10 | 01 | 10,11 | 00 | 0 | 0 |
| | | | | | 01 | 1 | 1 |
| | | | | | 10 | 1 | 2 |
| | | | | | 11 | 2 | 2 |

FIG. 15

| NUMBER OF PASS | CODE VALUE OF COMPLEMENTARY SOURCE PIXEL | CODE VALUE OF COMPLEMENTARY DESTINATION CANDIDATE PIXEL | CODE VALUE OF COMPLEMENTARY DESTINATION PIXEL | CODE VALUE AFTER COMPLEMENT | PIXEL VALUE OF IMAGE DATA | NUMBER OF TIMES OF INK EJECTION BEFORE COMPLEMENT | NUMBER OF TIMES OF INK EJECTION AFTER COMPLEMENT |
|---|---|---|---|---|---|---|---|
| 4 | 00 | 01,10,11 | — | 01,10,11 | 00 | 0 | 0 |
|   |    |          |   |          | 01 | 1 | 1 |
|   |    |          |   |          | 10 | 2 | 2 |
|   |    |          |   |          | 11 | 3 | 3 |
|   | 01 | 00,10,11 | 00 | 01,10,11 | 00 | 0 | 0 |
|   |    |          |    |          | 01 | 1 | 1 |
|   |    |          |    |          | 10 | 2 | 2 |
|   |    |          |    |          | 11 | 2 | 3 |
|   | 10 | 00,01,11 | 00 | 01,10,11 | 00 | 0 | 0 |
|   |    |          |    |          | 01 | 1 | 1 |
|   |    |          |    |          | 10 | 1 | 2 |
|   |    |          |    |          | 11 | 2 | 3 |
|   | 11 | 00,01,10 | 00 | 01,10,11 | 00 | 0 | 0 |
|   |    |          |    |          | 01 | 0 | 1 |
|   |    |          |    |          | 10 | 1 | 2 |
|   |    |          |    |          | 11 | 2 | 3 |
| 3 | 01 | 10,11    | —  | 10,11    | 00 | 0 | 0 |
|   |    |          |    |          | 01 | 1 | 1 |
|   |    |          |    |          | 10 | 2 | 2 |
|   |    |          |    |          | 11 | 2 | 2 |
|   | 10 | 01,11    | —  | 01,11    | 00 | 0 | 0 |
|   |    |          |    |          | 01 | 1 | 1 |
|   |    |          |    |          | 10 | 1 | 1 |
|   |    |          |    |          | 11 | 2 | 2 |
|   | 11 | 01,10    | —  | 01,10    | 00 | 0 | 0 |
|   |    |          |    |          | 01 | 0 | 0 |
|   |    |          |    |          | 10 | 1 | 1 |
|   |    |          |    |          | 11 | 2 | 2 |

FIG. 17A

| 700 | 701 | 702 | 703 |
|---|---|---|---|
| 704 | 705 | 706 | 707 |
| 708 | 709 | 710 | 711 |
| 712 | 713 | 714 | 715 |

FIG. 17B

IMAGE DATA

| 11 | 10 | 01 | 00 |
|---|---|---|---|
| 11 | 10 | 01 | 00 |
| 11 | 10 | 01 | 00 |
| 11 | 10 | 01 | 00 |

MASK PATTERN BEFORE NON-EJECTION COMPLEMENT

FIG. 17C-1

| 11 | 10 | 01 | 00 |
|---|---|---|---|
| 00 | 11 | 10 | 01 |
| 01 | 00 | 11 | 10 |
| 10 | 01 | 00 | 11 |

| 10 | 01 | 00 | 11 |
|---|---|---|---|
| 11 | 10 | 01 | 00 |
| 00 | 11 | 10 | 01 |
| 01 | 00 | 11 | 10 |

| 01 | 00 | 11 | 10 |
|---|---|---|---|
| 10 | 01 | 00 | 11 |
| 11 | 10 | 01 | 00 |
| 00 | 11 | 10 | 01 |

| 00 | 11 | 10 | 01 |
|---|---|---|---|
| 01 | 00 | 11 | 10 |
| 10 | 01 | 00 | 11 |
| 11 | 10 | 01 | 00 |

⎫ 508

MASK PATTERN AFTER
NON-EJECTION COMPLEMENT

FIG. 17C'-1

| 11 | 10 | 01 | 00 |
|----|----|----|----|
| 00 | 11 | 10 | 01 |
| 01 | 00 | 11 | 10 |
| 10 | 01 | 00 | 11 |

} 505"

FIG. 17D-1  PRINT DATA

| 1 | 1 | 0 | 0 |
|---|---|---|---|
| 0 | 1 | 0 | 0 |
| 1 | 0 | 1 | 0 |
| 1 | 0 | 0 | 0 |

FIG. 17C'-2

| 10 | 10 | 10 | 11 |
|----|----|----|----|
| 11 | 10 | 01 | 00 |
| 00 | 11 | 10 | 01 |
| 01 | 00 | 11 | 10 |

| 1 | 1 | 0 | 0 |
|---|---|---|---|
| 1 | 1 | 0 | 0 |
| 0 | 1 | 0 | 0 |
| 1 | 0 | 1 | 0 |

FIG. 17C'-3

| 11 | 11 | 11 | 10 |
|----|----|----|----|
| 10 | 01 | 00 | 11 |
| 11 | 10 | 01 | 00 |
| 00 | 11 | 10 | 01 |

| 1 | 1 | 1 | 0 |
|---|---|---|---|
| 1 | 0 | 0 | 0 |
| 1 | 1 | 0 | 0 |
| 0 | 1 | 0 | 0 |

FIG. 17C'-4

| 00 | 11 | 10 | 01 |
|----|----|----|----|
| 01 | 00 | 11 | 10 |
| 10 | 01 | 00 | 11 |
| 11 | 10 | 01 | 00 |

| 0 | 1 | 0 | 0 |
|---|---|---|---|
| 1 | 0 | 1 | 0 |
| 1 | 0 | 0 | 0 |
| 1 | 1 | 0 | 0 |

FIG. 17E  LOGICAL SUM OF PRINT DATA

| 3 | 4 | 1 | 0 |
|---|---|---|---|
| 3 | 2 | 1 | 0 |
| 3 | 2 | 1 | 0 |
| 3 | 2 | 1 | 0 |

FIG. 17F  NUMBER OF TIMES OF INK EJECTION

| 2 | 2 | 1 | 0 |
|---|---|---|---|
| 3 | 2 | 1 | 0 |
| 3 | 2 | 1 | 0 |
| 3 | 2 | 1 | 0 |

FIG. 18

| NUMBER OF PASS | CODE VALUE OF COMPLEMENTARY SOURCE CANDIDATE PIXEL | CODE VALUE OF COMPLEMENTARY DESTINATION CANDIDATE PIXEL | CODE VALUE OF COMPLEMENTARY SOURCE PIXEL OF FIRST TIME | CODE VALUE OF COMPLEMENTARY DESTINATION PIXEL OF FIRST TIME | CODE VALUE OF COMPLEMENTARY SOURCE PIXEL OF SECOND TIME | CODE VALUE OF COMPLEMENTARY DESTINATION PIXEL OF SECOND TIME | CODE VALUE AFTER COMPLEMENT | PIXEL VALUE OF IMAGE DATA | NUMBER OF TIMES OF INK EJECTION BEFORE COMPLEMENT | NUMBER OF TIMES OF INK EJECTION AFTER COMPLEMENT |
|---|---|---|---|---|---|---|---|---|---|---|
| 4 | | | | | | | | 00 | 0 | 0 |
| | 00,01 | 10,11 | 01 | 10 | 00 | 11 | 10,11 | 01 | 1 | 1 |
| | | | | | | | | 10 | 2 | 2 |
| | | | | | | | | 11 | 2 | 2 |
| | | | | | | | | 00 | 0 | 0 |
| | 00,10 | 01,11 | 10 | 01 | 00 | 11 | 10,11 | 01 | 1 | 1 |
| | | | | | | | | 10 | 1 | 2 |
| | | | | | | | | 11 | 2 | 2 |
| | | | | | | | | 00 | 0 | 0 |
| | 00,11 | 01,10 | 11 | 01 | 00 | 10 | 10,11 | 01 | 0 | 1 |
| | | | | | | | | 10 | 1 | 2 |
| | | | | | | | | 11 | 2 | 2 |
| | | | | | | | | 00 | 0 | 0 |
| | 01,10 | 00,11 | 10 | 00 | 01 | 11 | 10,11 | 01 | 1 | 1 |
| | | | | | | | | 10 | 1 | 2 |
| | | | | | | | | 11 | 1 | 2 |
| | | | | | | | | 00 | 0 | 0 |
| | 01,11 | 00,10 | 11 | 00 | 01 | 10 | 10,11 | 01 | 1 | 1 |
| | | | | | | | | 10 | 1 | 2 |
| | | | | | | | | 11 | 0 | 2 |
| | | | | | | | | 00 | 0 | 0 |
| | 10,11 | 00,01 | 11 | 00 | 10 | 01 | 10,11 | 01 | 0 | 1 |
| | | | | | | | | 10 | 0 | 2 |
| | | | | | | | | 11 | 1 | 2 |

FIG. 19

| NUMBER OF PASS | CODE VALUE OF COMPLEMENTARY SOURCE CANDIDATE PIXEL | CODE VALUE OF COMPLEMENTARY DESTINATION CANDIDATE PIXEL | CODE VALUE OF COMPLEMENTARY SOURCE PIXEL OF FIRST TIME | CODE VALUE OF COMPLEMENTARY DESTINATION PIXEL OF FIRST TIME | CODE VALUE OF COMPLEMENTARY SOURCE PIXEL OF SECOND TIME | CODE VALUE OF COMPLEMENTARY DESTINATION PIXEL OF SECOND TIME | CODE VALUE AFTER COMPLEMENT | PIXEL VALUE OF IMAGE DATA | NUMBER OF TIMES OF INK EJECTION BEFORE COMPLEMENT | NUMBER OF TIMES OF INK EJECTION AFTER COMPLEMENT |
|---|---|---|---|---|---|---|---|---|---|---|
| 4 | | | | | | | | 00 | 0 | 0 |
| | 00,01 | 10,11 | 00 | 10 | 01 | 11 | 10,11 | 01 | 1 | 1 |
| | | | | | | | | 10 | 2 | 2 |
| | | | | | | | | 11 | 2 | 2 |
| | | | | | | | | 00 | 0 | 0 |
| | 00,10 | 01,11 | 00 | 01 | 10 | 11 | 01,11 | 01 | 1 | 1 |
| | | | | | | | | 10 | 1 | 1 |
| | | | | | | | | 11 | 2 | 2 |
| | | | | | | | | 00 | 0 | 0 |
| | 00,11 | 01,10 | 00 | 01 | 11 | 10 | 01,11 | 01 | 0 | 1 |
| | | | | | | | | 10 | 1 | 1 |
| | | | | | | | | 11 | 2 | 2 |
| | | | | | | | | 00 | 0 | 0 |
| | 01,10 | 00,11 | 01 | 00 | 10 | 11 | 01,11 | 01 | 1 | 1 |
| | | | | | | | | 10 | 1 | 1 |
| | | | | | | | | 11 | 1 | 2 |
| | | | | | | | | 00 | 0 | 0 |
| | 01,11 | 00,10 | 01 | 00 | 11 | 10 | 01,11 | 01 | 0 | 1 |
| | | | | | | | | 10 | 1 | 1 |
| | | | | | | | | 11 | 1 | 2 |
| | | | | | | | | 00 | 0 | 0 |
| | 10,11 | 00,01 | 10 | 00 | 11 | 01 | 10,11 | 01 | 0 | 1 |
| | | | | | | | | 10 | 2 | 2 |
| | | | | | | | | 11 | 1 | 2 |

FIG. 20

| NUMBER OF PASS | CODE VALUE OF COMPLEMENTARY SOURCE CANDIDATE PIXEL | CODE VALUE OF COMPLEMENTARY DESTINATION CANDIDATE PIXEL OF FIRST TIME | CODE VALUE OF COMPLEMENTARY SOURCE PIXEL OF FIRST TIME | CODE VALUE OF COMPLEMENTARY DESTINATION PIXEL OF FIRST TIME | CODE VALUE OF COMPLEMENTARY DESTINATION CANDIDATE PIXEL OF SECOND TIME | CODE VALUE OF COMPLEMENTARY SOURCE PIXEL OF SECOND TIME | CODE VALUE OF COMPLEMENTARY DESTINATION PIXEL OF SECOND TIME | CODE VALUE AFTER COMPLEMENT | PIXEL VALUE OF IMAGE DATA | NUMBER OF TIMES OF INK EJECTION BEFORE COMPLEMENT | NUMBER OF TIMES OF INK EJECTION AFTER COMPLEMENT |
|---|---|---|---|---|---|---|---|---|---|---|---|
| 4 | 00,01 | 10,11 | 00 | 10 | 10,11 | 01 | 10 | 10,11 | 00/01/10/11 | 0/1/2/0 | 0/1/2/2 |
| | | | 01 | | 10,11 | 00 | 10 | 10,11 | 00/01/10/11 | 0/1/2/0 | 0/1/2/2 |
| | 00,10 | 01,11 | 00 | 01 | 01,11 | 10 | 01 | 10,11 | 00/01/10/11 | 0/1/2/0 | 0/1/2/2 |
| | | | 10 | | 10,11 | 00 | 10 | 10,11 | 00/01/10/11 | 0/1/2/0 | 0/1/2/2 |
| | 00,11 | 01,10 | 00 | 01 | 01,10 | 11 | 01 | 10,11 | 00/01/10/11 | 0/1/2/1 | 0/1/2/2 |
| | | | 11 | | 10,11 | 00 | 10 | 10,11 | 00/01/10/11 | 0/1/2/0 | 0/1/2/2 |
| | 01,10 | 00,11 | 01 | 00 | 01,11 | 10 | 01 | 10,11 | 00/01/10/11 | 0/1/2/1 | 0/1/2/2 |
| | | | 10 | | 10,11 | 01 | 10 | 10,11 | 00/01/10/11 | 0/1/2/1 | 0/1/2/2 |
| | 01,11 | 00,10 | 01 | 00 | 01,10 | 11 | 01 | 10,11 | 00/01/10/11 | 0/0/1/1 | 0/1/2/2 |
| | | | 11 | | 10,11 | 01 | 10 | 10,11 | 00/01/10/11 | 0/0/1/1 | 0/1/2/2 |
| | 10,11 | 00,01 | 10 | 00 | 01,11 | 10 | 01 | 10,11 | 00/01/10/11 | 0/0/1/0 | 0/1/2/2 |
| | | | 11 | | 01,11 | 10 | 01 | 10,11 | 00/01/10/11 | 0/0/1/0 | 0/1/2/2 |

FIG. 22A

| 700 | 701 | 702 | 703 |
|---|---|---|---|
| 704 | 705 | 706 | 707 |
| 708 | 709 | 710 | 711 |
| 712 | 713 | 714 | 715 |

FIG. 22B  IMAGE DATA

| 11 | 10 | 01 | 00 |
|---|---|---|---|
| 11 | 10 | 01 | 00 |
| 11 | 10 | 01 | 00 |
| 11 | 10 | 01 | 00 |

MASK PATTERN BEFORE NON-EJECTION COMPLEMENT

FIG. 22C-1

| 11 | 10 | 01 | 00 |
|---|---|---|---|
| 00 | 11 | 10 | 01 |
| 01 | 00 | 11 | 10 |
| 10 | 01 | 00 | 11 |

| 10 | 01 | 00 | 11 |
|---|---|---|---|
| 11 | 10 | 01 | 00 |
| 00 | 11 | 10 | 01 |
| 01 | 00 | 11 | 10 |

| 01 | 00 | 11 | 10 |
|---|---|---|---|
| 10 | 01 | 00 | 11 |
| 11 | 10 | 01 | 00 |
| 00 | 11 | 10 | 01 |

| 00 | 11 | 10 | 01 |
|---|---|---|---|
| 01 | 00 | 11 | 10 |
| 10 | 01 | 00 | 11 |
| 11 | 10 | 01 | 00 |

⎬ 507

FIG. 22C'-1 MASK PATTERN AFTER NON-EJECTION COMPLEMENT

| 00 | 00 | 00 | 00 |
|----|----|----|----|
| 00 | 11 | 10 | 01 |
| 01 | 00 | 11 | 10 |
| 10 | 01 | 00 | 11 |

⎬ 505'

FIG. 22D-1 PRINT DATA

| 0 | 0 | 0 | 0 |
|---|---|---|---|
| 0 | 1 | 0 | 0 |
| 1 | 0 | 1 | 0 |
| 1 | 0 | 0 | 0 |

FIG. 22C'-2

| 10 | 01 | 01 | 11 |
|----|----|----|----|
| 11 | 10 | 01 | 00 |
| 00 | 11 | 10 | 01 |
| 01 | 00 | 11 | 10 |

| 1 | 0 | 0 | 0 |
|---|---|---|---|
| 1 | 1 | 0 | 0 |
| 0 | 1 | 0 | 0 |
| 1 | 0 | 1 | 0 |

FIG. 22C'-3

| 01 | 10 | 11 | 10 |
|----|----|----|----|
| 10 | 01 | 00 | 11 |
| 11 | 10 | 01 | 00 |
| 00 | 11 | 10 | 01 |

| 1 | 1 | 1 | 0 |
|---|---|---|---|
| 1 | 0 | 0 | 0 |
| 1 | 1 | 0 | 0 |
| 0 | 1 | 0 | 0 |

FIG. 22C'-4

| 11 | 11 | 10 | 01 |
|----|----|----|----|
| 01 | 00 | 11 | 10 |
| 10 | 01 | 00 | 11 |
| 11 | 10 | 01 | 00 |

| 1 | 1 | 0 | 0 |
|---|---|---|---|
| 1 | 0 | 1 | 0 |
| 1 | 0 | 0 | 0 |
| 1 | 1 | 0 | 0 |

FIG. 22E LOGICAL SUM OF PRINT DATA

| 3 | 3 | 1 | 0 |
|---|---|---|---|
| 3 | 2 | 1 | 0 |
| 3 | 2 | 1 | 0 |
| 3 | 2 | 1 | 0 |

FIG. 22F NUMBER OF TIMES OF INK EJECTION

| 3 | 2 | 1 | 0 |
|---|---|---|---|
| 3 | 2 | 1 | 0 |
| 3 | 2 | 1 | 0 |
| 3 | 2 | 1 | 0 |

FIG. 24

| ○: PRINTING<br>×: NON-PRINTING | | CODE VALUE OF MASK PATTERN | |
|---|---|---|---|
| | | 0 | 1 |
| PIXEL VALUE OF IMAGE DATA | 00 | × | × |
| | 01 | × | ○ |
| | 10 | ○ | ○ |

FIG. 25

| NUMBER OF PASS | CODE VALUE OF COMPLEMENTARY SOURCE PIXEL | CODE VALUE OF COMPLEMENTARY DESTINATION PIXEL | CODE VALUE AFTER COMPLEMENT | PIXEL VALUE OF IMAGE DATA | NUMBER OF TIMES OF INK EJECTION BEFORE COMPLEMENT | NUMBER OF TIMES OF INK EJECTION AFTER COMPLEMENT |
|---|---|---|---|---|---|---|
| 2 | 0 | 1 | 1 | 00 | 0 | 0 |
|   |   |   |   | 01 | 1 | 1 |
|   |   |   |   | 10 | 1 | 1 |
|   | 1 | 0 | 1 | 00 | 0 | 0 |
|   |   |   |   | 01 | 0 | 1 |
|   |   |   |   | 10 | 1 | 1 |

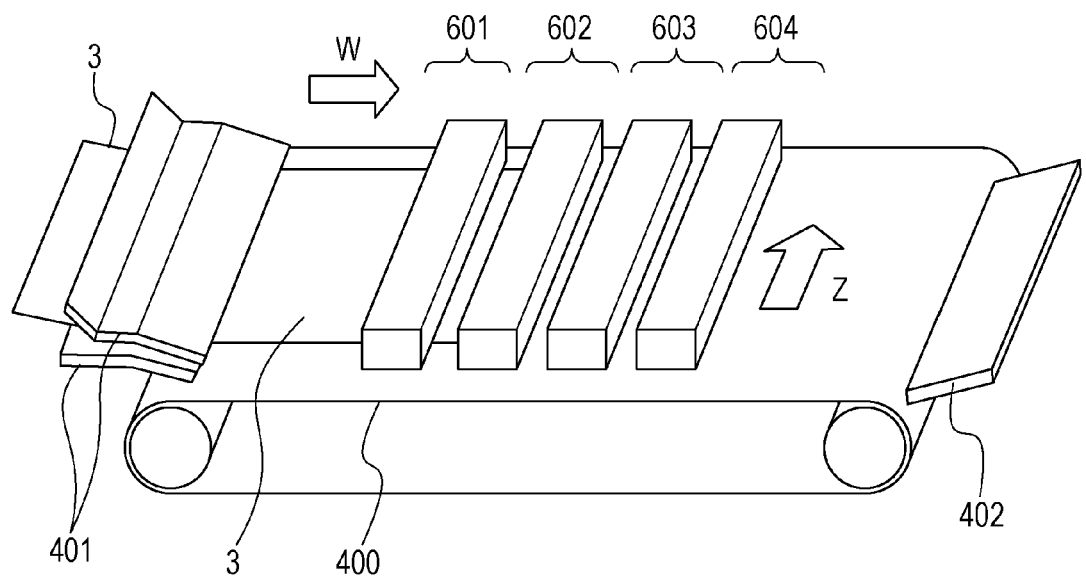

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

Image printing apparatuses that print an image by repetitively performing print scanning that ejects inks while relatively moving a printing head having a plurality of ejection ports with respect to a unit area of a printing medium, the ejection ports ejecting inks being arrayed, and sub scanning that conveys the printing medium are known. In such image printing apparatuses, so-called multipass printing method is known, which forms an image by performing a plurality of times of print scanning for the unit area. In a conventional multipass printing method, print data to be used in printing in a plurality of times of scanning is generated by dividing the image data into a plurality of times of scanning, using image data having one-bit information for determining ejection or non-ejection of ink for each pixel, and a plurality of mask patterns including one-bit information for determining permission or non-permission of ejection of ink for each pixel and corresponding to the plurality of times of scanning.

In an image printing apparatus that performs the above-described multipass printing method, when ejection failure of ink has occurred in a certain ejection port of the plurality of ejection ports, degradation of image quality of an image to be obtained is known. In contrast, Japanese Patent Application Laid-Open No. 2000-094662 describes replacement of information of a pixel in a mask pattern corresponding to the ejection port in which the ejection failure has occurred with information of a pixel in a mask pattern corresponding to another ejection port that can eject the ink to the same pixel region. Accordingly, even if the ejection failure is caused in the ejection port, complement printing can be performed through a different ejection port. Therefore, the degradation of the image quality can be suppressed.

Further, in recent years, generation of print data using image data having multiple-bit information for determining the number of times of ejection of ink for each pixel, and a mask pattern having multiple-bit information for determining the number of times of permission of ejection of ink for each pixel is known. By generating the print data as described above, the ink can be ejected to one pixel region a plurality of times. Japanese Patent Application Laid-Open No. 2003-175592 discloses complement printing for an ejection port in which the ejection failure has occurred, using image data having two-bit information and a mask pattern. In more detail, when the ejection failure has occurred in a certain ejection port, a pixel having the number of times of permission of ejection of ink being zero times is determined from pixels in a mask pattern corresponding to other ejection ports that can eject the ink to the same pixel region as the certain ejection port. Then, the complement printing is performed by replacing the information of the number of times of permission of ejection of ink being zero times in the pixel using information of a pixel in a mask pattern corresponding to the ejection port in which the ejection failure has occurred.

However, according to the technology described in Japanese Patent Application Laid-Open No. 2003-175592, in a form of ejecting the ink to one pixel region a plurality of times using the image data having the multiple-bit information and the mask pattern, favorably complement printing may not be able to be performed in a case where the ejection failure of an ejection port has occurred.

For example, in a print mode having a small scan amount for a unit area, or the like, there is a case of using a mask pattern that permits at least once ejection of ink for all of a plurality of pixels in mask patterns corresponding to a plurality of ejection ports that can eject an ink to the same pixel region. If the ejection failure is caused in a certain ejection port, no information of the number of times of permission of ejection of ink being zero times exists in the pixels in the mask patterns corresponding to the ejection ports that can eject an ink to the same pixel region, the replacement described in Japanese Patent Application Laid-Open No. 2000-094662 may not be able to be executed.

Further, even in a case of using a mask pattern in which the information of the number of times of permission of ejection of ink being zero times is determined for x pixels, of the plurality of pixels in the mask patterns corresponding to the plurality of ejection ports that can eject an ink to the same pixel region, favorably complement printing may not be able to be performed. In more detail, when the ejection failure is caused in y ejection ports, which is larger than X, of the plurality of ejection ports, replacement destinations of information in pixels corresponding to (y−x) ejection ports in which the ejection failure has been caused do not exist. Therefore, the replacement described in Japanese Patent Application Laid-Open No. 2000-094662 cannot be executed.

SUMMARY OF THE INVENTION

The present invention has been made in view of the above. Embodiments of the invention include generating print data to be used in printing, which enables favorably complement printing when ejection failure of an ejection port is caused even in a case of performing printing to eject an ink to one pixel region a plurality of times.

An example of the present invention is an image processing apparatus that generates print data using a printing head having an ejection port array in which a plurality of ejection ports for ejecting inks is arrayed in a predetermined direction, the print data using the printing head in each of K ($K \geq 3$) times of relative scanning to a unit area on a printing medium in a crossing direction intersecting with the predetermined direction, and the print data determining ejection or non-ejection of ink to each of pixel-equivalent pixel regions in the unit area, the image processing apparatus including: a first acquiring unit configured to acquire image data in which information indicating the number of times of ejection of ink from zero to N ($2 \leq N \leq K$) times for each of the plurality of pixel regions is determined for each pixel; a storage unit configured to store a first mask pattern in which information indicating the number of times of permission of ejection of ink from 0 to M ($2 \leq M \leq K$) times for each of the plurality of pixel regions is determined for each pixel; a specifying unit configured to specify the first ejection port in which ejection failure of ink exists, of the plurality of ejection ports; a first selecting unit configured to select the information indicating the number of times of permission in the K pixels, of the information determined by the first mask pattern stored in the storage unit, the K pixels corresponding to K different ejection ports including at least the first ejection port specified by the specifying unit and capable of ejecting the inks to a same position to each other in the K times of scanning, and the K pixels being positioned in a same position to each other in the crossing direction; a second acquiring unit configured to acquire the information indicating the number of times of permission in a pixel corresponding to the first ejection port specified by the specifying unit, of the information selected by the first selecting unit; a third acquiring unit configured to acquire the information indicating the number of times of permission in a pixel corresponding to the second ejection port not specified by the specifying unit, of the information selected by the first selecting unit; a second selecting unit configured to select the first information having a smallest number of times of permission indicated by the information, from the information acquired by the third acquiring unit; a first generating unit configured to generate a second mask pattern by replacing the first information selected by the second selecting unit using the information acquired by the second acquiring unit when the number of times of permission indicated by the information acquired by the second acquiring unit is larger than the number of times of permission indicated by the first information selected by the second selecting unit; and second generating unit configured to generate the print data based on the image data acquired by the first acquiring unit, and the second mask pattern generated by the first generating unit.

Further features of the present invention will become apparent from the following description of exemplary embodiments (with reference to the attached drawings).

BRIEF DESCRIPTION OF THE DRAWINGS

FIGS. 6A to 6E are diagrams illustrating a processing process of a mask pattern and image data in an embodiment.

FIG. 7 is a diagram illustrating a decoding table in an embodiment.

FIGS. 8A to 8E are diagrams illustrating a processing process of a mask pattern and image data in an embodiment.

FIGS. 10A and 10B are schematic views for describing image quality degradation of when ejection failure of ink is caused.

FIGS. 12A to 12F are diagrams for describing a processing process of non-ejection complement in an embodiment.

FIGS. 13A to 13F are diagrams for describing a processing process of non-ejection complement in an embodiment.

FIG. 14 is a diagram for describing a result of execution of non-ejection complementary processing in an embodiment.

FIG. 15 is a diagram for describing a result of execution of non-ejection complementary processing in a reference example.

FIGS. 17A to 17F are diagrams for describing a processing process of non-ejection complement in an embodiment.

FIG. 18 is a diagram for describing a result of execution of non-ejection complementary processing in an embodiment.

FIG. 19 is a diagram for describing a result of execution of non-ejection complementary processing in a comparative example.

FIG. 20 is a diagram for describing a result of execution of non-ejection complementary processing in an embodiment.

FIGS. 22A to 22F are diagrams for describing a processing process of non-ejection complement in an embodiment.

FIG. 24 is a diagram illustrating a decoding table in an embodiment.

FIG. 25 is a diagram for describing a result of execution of non-ejection complementary processing in an embodiment.

FIG. 26 is a perspective view of an image printing apparatus applied in an embodiment.

FIG. 27 is a diagram illustrating a decoding table in an embodiment.

DESCRIPTION OF THE EMBODIMENTS

Hereinafter, a first embodiment of the present invention will be described in detail with reference to the drawings.

First Embodiment

Figure 1:
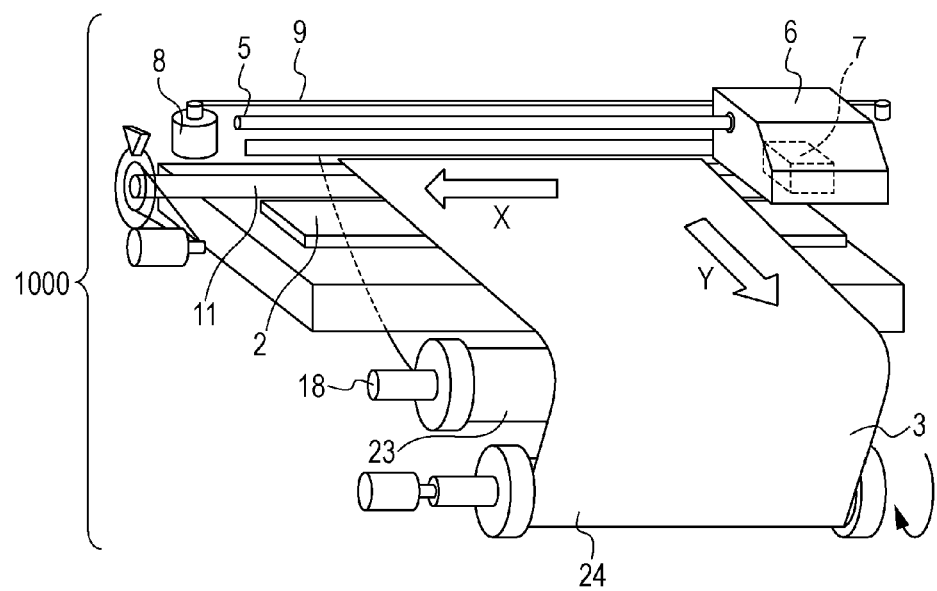
FIG. 1 is a perspective view of an image printing apparatus applied in an embodiment.
Figure 2:
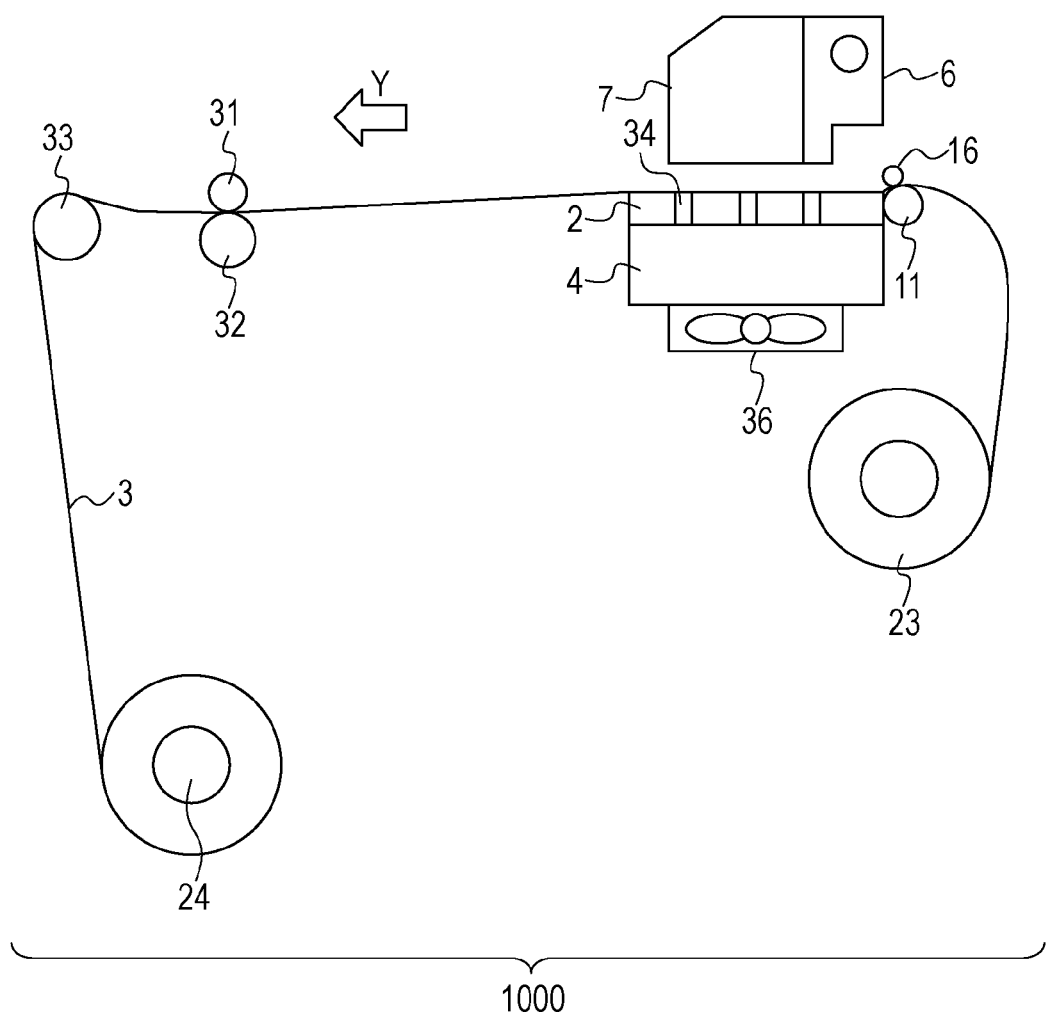
FIG. 2 is a sectional view of an internal configuration of an image printing apparatus applied in an embodiment.

FIG. 1 is a perspective view partially illustrating a configuration of an inside of an image printing apparatus 1000 according to the first embodiment of the present invention. Further, FIG. 2 is a sectional view partially illustrating a configuration of an inside of the image printing apparatus 1000 according to the first embodiment of the present invention.

A platen 2 is arranged inside the image printing apparatus 1000, and a large number of suction holes 34 are formed in the platen 2 to adsorb a printing medium 3 and not to allow the printing medium 3 to rise up. These suction holes 34 are linked with a duct, and a suction fan 36 is arranged below the duct and operated, so that the printing medium 3 is adsorbed to the platen 2.

A carriage 6 is configured to be supported by a main rail 5 installed extending in a sheet width direction, and is reciprocally moved in an X direction (crossing direction). The carriage 6 mounts a printing head 7 in an ink jet system described below. Note that various printing systems are applicable to the printing head 7, such as a thermal jet system using a heating element, and a piezo system using a piezoelectric transducer. A carriage motor 8 is drive source for moving the carriage 6 in the X direction, and rotational driving force thereof is transmitted to the carriage 6 with a belt 9.

The printing medium 3 is fed by being wound from a medium 23 rolled in a roll manner. The printing medium 3 is conveyed in a Y direction (conveying direction) intersecting with the X direction on the platen 2. A tip of the printing medium 3 is pinched by a pinch roller 16 and a conveying roller 11, and the conveying roller 11 is driven, so that conveyance is performed. Further, the printing medium 3 is pinched by a roller 31 and a discharge roller 32 at a downstream of the platen 2 in the Y direction, and is wound around a winding roller 24 through a turn roller 33.

Figure 3:
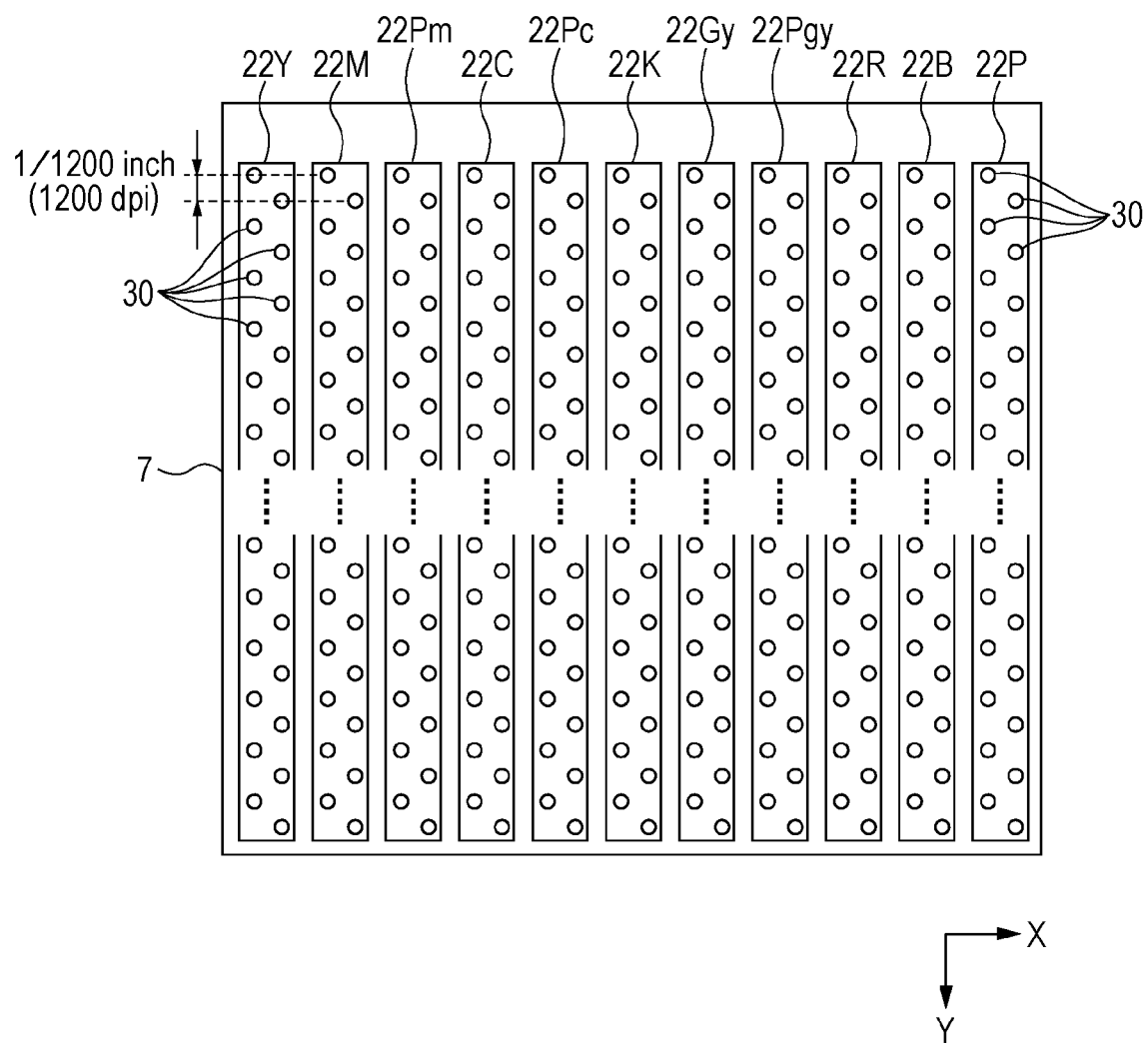
FIG. 3 is a schematic view of a printing head applied in an embodiment.

FIG. 3 illustrates a printing head used in the present embodiment.

The printing head 7 is configured such that eleven ejection port arrays 22Y, 22M, 22Pm, 22C, 22Pc, 22Bk, 22Gy, 22Pgy, 22R, 22B, and 22P (hereinafter, one of these ejection port arrays is also referred to as ejection port array 22) are arranged side by side in this order in the X direction, the eleven ejection port arrays being able to respectively discharge inks of yellow (Y), magenta (M), photo magenta (Pm), cyan (C), photo cyan (Pc), black (Bk), gray (Gy), photo gray (Pgy), red (R), and blue (B), and processing liquids (P) having purposes other than coloring, such as protection of a printing surface and improvement of gloss. These ejection port arrays 22 are configured such that 1280 ejection ports (hereinafter, also referred to as nozzles) 30 that eject respective inks are arrayed in the Y direction (predetermined direction) with density of 1200 dpi. Note that the ejection ports 30 in mutually adjacent positions in the Y direction are arranged in mutually shifted positions in the X direction. Here, an ejection amount of ink ejected through one ejection port 30 at a time in the present embodiment is about 4.5 ng.

These ejection port arrays 22 are connected to ink tanks (not illustrated) that respectively store corresponding inks, and supply the inks. Note that the printing head 7 and the ink tanks used in the present embodiment may be integrally configured, or may be separately configured.

Figure 4:
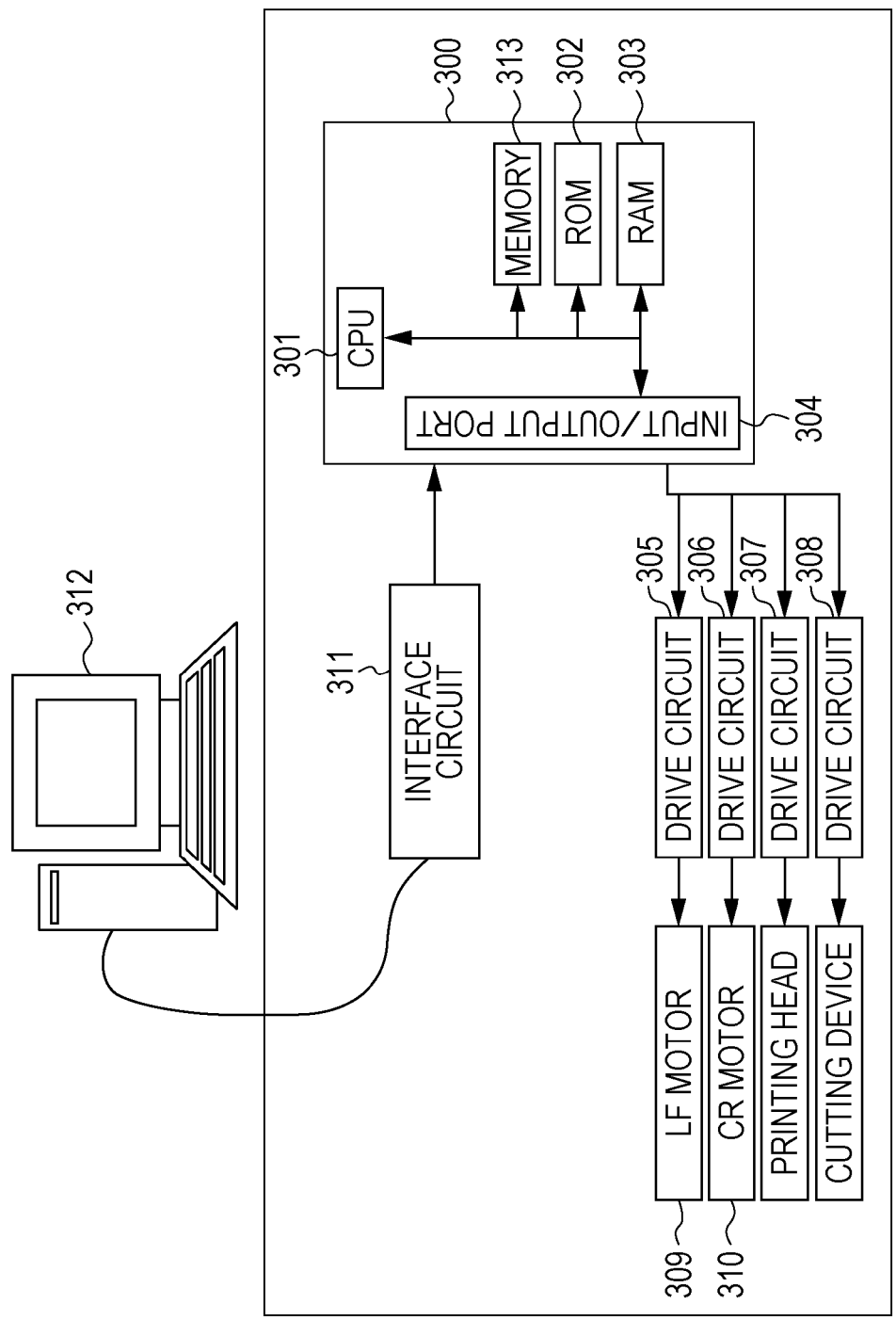
FIG. 4 is a schematic view illustrating a print control system in an embodiment.

FIG. 4 is a block diagram illustrating a schematic configuration of a control system in the present embodiment. A main control unit 300 includes a CPU 301 that executes processing operations such as calculation, selection, determination, and control, a ROM 302 that stores control program and the like to be executed by the CPU 301, a RAM 303 used as a buffer or the like of print data, an input/output port 304, and the like. In a memory 313, image data and mask patterns described below, ejection defective nozzle data, and the like are stored. Then, a line feed motor (LF motor) 309, a carriage motor (CR motor) 310, drive circuits 305, 306, 307, and 308 that are actuators in the printing head 7 and the cutting unit, and the like are connected to the input/output port 304. Further, the main control unit 300 is connected to a PC 312 that is a host computer through the interface circuit 311.

In the present embodiment, an image is formed according to a multipass printing method that performs printing in a unit area by a plurality of times (K times) of scanning. Further, in the present embodiment, as the multipass printing method, at least two methods including a four-pass printing method that performs printing by four times of scanning to the unit area on a printing medium, and a three-pass printing method that performs printing by three times of scanning to a unit area on a printing medium are executable. Hereinafter, the multipass printing method will be described in detail using the four-pass printing method as an example.

Figure 5:
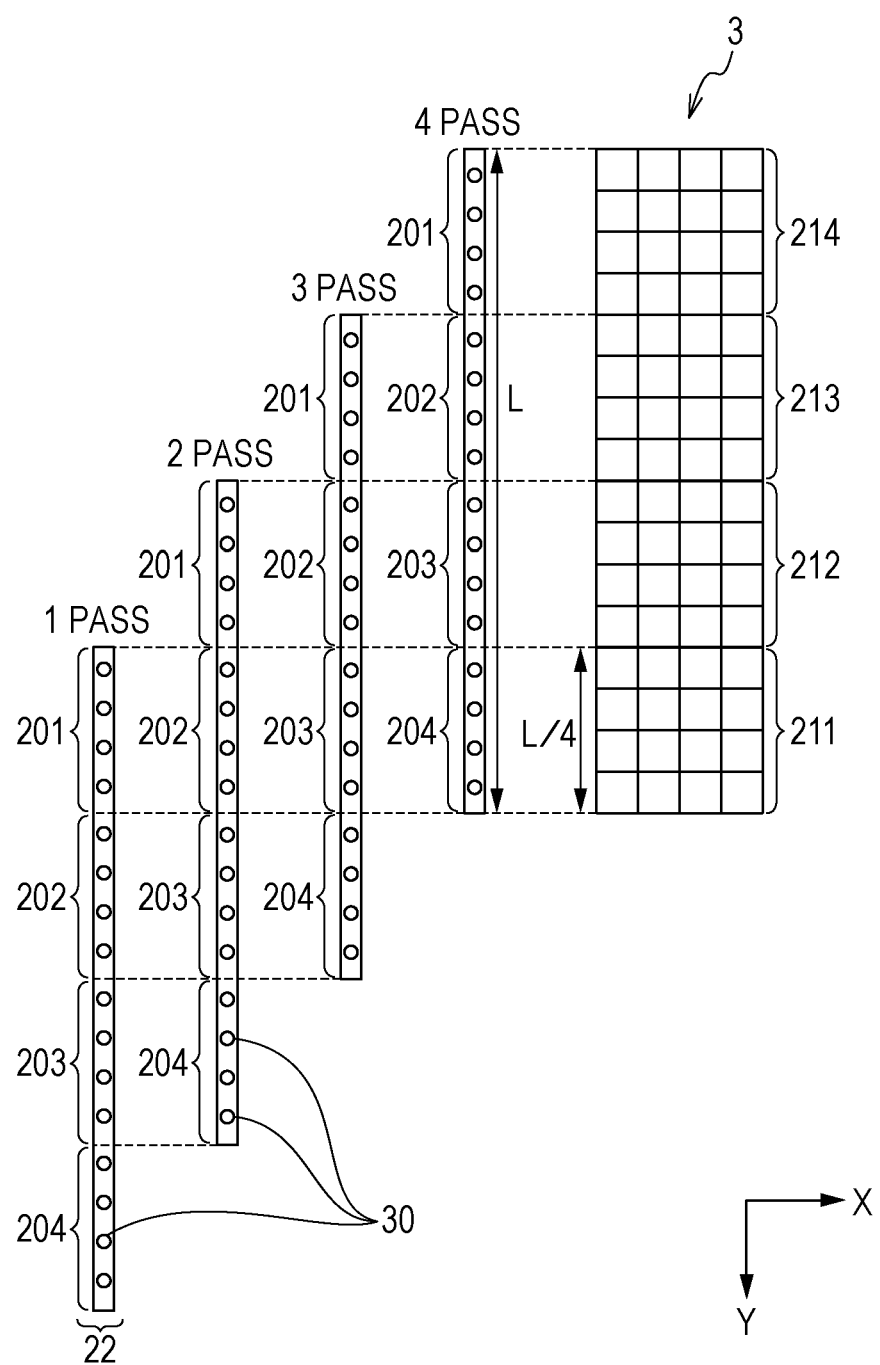
FIG. 5 is a diagram for describing a typical multipass printing method.

FIG. 5 is a diagram for describing a typical multipass printing method performed when printing is performed in a unit area on a printing medium by four times of print scanning. In the following description, a case of using an ejection port array made of sixteen ejection ports 30, and ejecting inks through four ejection ports to one unit area in each scanning will be described, for simplification.

The ejection ports 30 that eject the inks and are provided in an ejection port array 22 are divided into four ejection port groups 201, 202, 203, and 204 along a sub scanning direction.

In the print scanning of the first time (1 pass), the ink is ejected through the ejection port group 201 to a unit area 211 on the printing medium 3.

Next, the printing medium 3 is relatively conveyed with respect to the printing head 7 from an upstream side to a downstream side in the Y direction by a distance of L/4. Here, for simplification, a case of conveying the printing head 7 with respect to the printing medium 3 from the downstream side to the upstream side in the Y direction is illustrated. However, a relative positional relationship between the printing medium 3 and the printing head 7 after conveyance is the same as the case of conveying the printing medium 3 toward the downstream side in the Y direction.

Following that the print scanning of the second time is performed. In the print scanning of the second time (2 pass), the ink is ejected through the ejection port group 202 to a unit area 211 on the printing medium, and the ink is ejected through the ejection port group 201 to a unit area 212 on the printing medium.

Hereinafter, the print scanning with the printing head 7 and the relative conveyance of the printing medium 3 are alternately repeated. As a result, after the print scanning of the fourth time (4 pass) is performed, the inks have been ejected to the unit area 211 of the printing medium 3 through the ejection port groups 201 to 204 once each.

Note that, here, the four-pass printing method has been described. However, the three-pass printing method can also be performed by similar processes.

In the present embodiment, in the above multipass printing method, one-bit print data to be used in printing in each scanning is generated from image data using image data having a-bit (a≥2) information, a mask pattern having b-bit (b≥2) information, a decoding table that defines ejection or non-ejection of ink according to a combination of values indicated by the multi-bit information in the image data and the mask patterns. Note that, in the following description, a case in which both the image data and the mask patterns are configured from two-bit information will be described.

(Four-Pass Printing Method)

FIGS. 6A to 6E are diagrams for describing a process of generating print data using image data and mask patterns both having multiple-bit information in the four-pass printing method. Further, FIG. 7 is a diagram illustrating a decoding table used in generating the print data illustrated in FIGS. 6A to 6E in the four-pass printing method.

FIG. 6A is a diagram schematically illustrating sixteen pixels 700 to 715 in a certain unit area. Here, for simplification, description will be given using a unit area made of pixel regions equivalent to sixteen pixels. However, the number of pixel regions that configure the unit area can be appropriately set to a different value.

FIG. 6B is a diagram illustrating an example of image data corresponding to the unit area. Here, the image data having a-bit information can reproduce the number of times of ejection of ink up to $2^a$ ways. Here, the image data is configured from two-bit information, as described above. Therefore, the number of times of ejection of ink can be expressed in up to four ($=2^2$) ways that is the square of 2.

Further, in the present embodiment, a maximum value of the number of times of ejection of ink reproduced by the image data having a-bit information is $(2^a)-1$ times. In the present embodiment, a=2, and thus the maximum value of the number of times of ejection of ink to be expressed is 3 ($=(2^2)-1$) times that is a value obtained by subtracting 1 from the square of 2.

To be specific, when a value (hereinafter, also referred to as pixel value) indicated by two-bit information that configures image data corresponding to a certain pixel is "00", the ink is not ejected to the pixel even once. Further, when the pixel value is "01", the ink is ejected to the corresponding pixel once. Further, when the pixel value is "10", the ink is ejected to the corresponding pixel twice. Further, when the pixel value is "11", the ink is ejected to the corresponding pixel three times. As described above, in the image data in the present embodiment, one of the number of times of ejection from zero to three times is determined for each pixel.

As for the image data illustrated in FIG. 6B, for example, the pixel values in the pixels 703, 707, 711, and 715 are "00". Therefore, the ink is not ejected to the pixel regions corresponding to the pixels 703, 707, 711, and 715 even once. Further, for example, the pixel values in the pixels 700, 704, 708, and 712 are "11". Therefore, the ink is ejected to the pixel regions corresponding to the pixels 700, 704, 708, and 712 three times.

FIGS. 6C-1 to 6C-4 are diagrams corresponding to the scanning of the first to fourth time, and illustrating mask patterns for being applied to the image data illustrated in FIG. 6B. That is, a mask pattern 505 corresponding to the scanning of the first time illustrated in FIG. 6C-1 is applied to the image data illustrated in FIG. 6B, so that the print data used in the scanning of the first time is generated. Similarly, mask patterns 506, 507, and 508 illustrated in FIGS. 6C-2, 6C-3, and 6C-4 are applied to the image data illustrated in FIG. 6B, so that the print data to be respectively used in the scanning of the second, third, and fourth times is generated.

Here, any of the four (=2^b) ways of values of "00", "01", "10", and "11" is allocated to each pixel in the mask patterns illustrated in FIGS. 6C-1 to 6C-4 as the value (hereinafter, also referred to as code value) indicated by the two-bit information.

Here, as can be seen by reference to the decoding table illustrated in FIG. 7, when the code value is "00", the ink is not ejected even if the pixel value in the corresponding pixel is any of "00", "01", "10", and "11". That is, the code value of "00" in the mask pattern corresponds to no ejection of ink being permitted at all (the number of times of permission of ejection of ink is zero times). In the following description, the pixel in the mask pattern to which the code value of "00" is allocated is also referred to as non-print permitting pixel.

Meanwhile, as can be seen by reference to the decoding table illustrated in FIG. 7, when the code value is "01", the ink is not ejected when the pixel value in the corresponding pixel is "00", "01", or "10", but the ink is ejected when the pixel value is "11". In other words, the code value of "01" corresponds to the ejection of ink being permitted for the four ways of pixel values ("00", "01", "10", and "11") only once (the number of times of permission of ejection of ink is once).

Further, when the code value is "10", the ink is not ejected when the pixel value in the corresponding pixel is "00" or "01", but the ink is ejected when the pixel value is "10" or "11". That is, the code value of "10" corresponds to the ejection of ink being permitted for the four ways of pixel values twice (the number of times of permission of ejection of ink is twice).

Further, when the code value is "11", the ink is not ejected when the pixel value in the corresponding pixel is "00", but the ink is ejected when the pixel value is "01", "10", or "11". That is, the code value of "11" corresponds to the ejection of ink being permitted for the four ways of pixel values three times (the number of times of permission of ejection of ink is three times). Note that the pixel in the mask pattern to which any of the three (=2^b−1) ways of code values of "01", "10", and "11" is allocated is also referred to as print permitting pixel in the following description.

As described above, in the mask patterns in the present embodiment, any of the numbers of times of permission from zero to three times is determined for each pixel.

Here, the mask patterns having multiple-bit information to be used in the four-pass printing method in the present embodiment are set based on (condition 1) and (condition 2) below.

(Condition 1)

Here, ((2^b)−1) print permitting pixels are arranged in a plurality of pixels in the same positions in a plurality of mask patterns. These ((2^b)−1) print permitting pixels permit the ejection of ink by different numbers from each other. To be specific, since b=2 in the present embodiment, any of the code values "01", "10", and "11" is allocated to each of three (=2^2−1) pixels of the four pixels in the same positions in the four mask patterns respectively illustrated in FIGS. 6C-1 to 6C-4 (print permitting pixels), and the code value of "00" is allocated to the remaining one (=4−3) pixel (non-print permitting pixel).

For example, to the pixel 700, the code value of "01" is allocated in the mask pattern illustrated in FIG. 6C-3, the code value of "10" is allocated in the mask pattern illustrated in FIG. 6C-2, and the code value of "11" is allocated in the mask pattern illustrated in FIG. 6C-1. Then, the code value of "00" is allocated in the remaining mask pattern illustrated in FIG. 6C-4. In other words, the pixel 700 is the print permitting pixel in the mask patterns illustrated in FIGS. 6C-1, 6C-2, and 6C-3, and is the non-print permitting pixel in the mask pattern illustrated in FIG. 6C-4.

Further, to the pixel 701, the code value of "01" is allocated in the mask pattern illustrated in FIG. 6C-2, the code value of "10" is allocated in the mask pattern illustrated in FIG. 6C-1, and the code value of "11" is allocated in the mask pattern illustrated in FIG. 6C-4. Then, the code value of "00" is allocated in the remaining mask pattern illustrated in FIG. 6C-3. In other words, the pixel 701 is the print permitting pixel in the mask patterns illustrated in FIGS. 6C-1, 6C-2, and 6C-4, and is the non-print permitting pixel in the mask pattern illustrated in FIG. 6C-3.

With such a configuration, even if the pixel value in a certain pixel is any of "00", "01", "10", and "11", the print data for ejecting an ink to the pixel region corresponding to the pixel by the number of times of ejection of ink corresponding to the pixel value can be generated.

(Condition 2)

Further, the print permitting pixels corresponding to the code value of "01" are arranged in the mask patterns illustrated in FIGS. 6C-1 to 6C-4 such that the numbers of the print permitting pixels become nearly the same number to each other. To be specific, the code value of "01" is allocated to the four pixels 702, 707, 708, and 713 in the mask pattern illustrated in FIG. 6C-1. Further, the code value of "01" is allocated to the four pixels 701, 706, 711, and 712 in the mask pattern illustrated in FIG. 6C-2. Further, the code value of "01" is allocated to the four pixels 700, 705, 710, and 715 in the mask pattern illustrated in FIG. 6C-3. Further, the code value of "01" is allocated to the four pixels 703, 704, 709, and 714 in the mask pattern illustrated in FIG. 6C-4. That is, the four print permitting pixels corresponding to the code value of "01" are arranged in each of the four mask patterns respectively illustrated in FIGS. 6C-1 to 6C-4.

Similarly, the pint permitting pixels corresponding to the code value of "10" are arranged in the mask patterns respectively illustrated in FIGS. 6C-1 to 6C-4 such that the numbers of the print permitting pixels become the same number to one another. Further, the print permitting pixels corresponding to the code value of "11" are also arranged in the mask patterns respectively illustrated in FIGS. 6C-1 to 6C-4 such that the numbers of the print permitting pixels become the same value to one another.

Here, a case in which the same number of the print permitting pixels respectively corresponding to the code values "01", "10", and "11" are arranged in the respective mask patterns has been described. However, in reality, nearly the same number may just be arranged to each other.

Accordingly, printing rates in the four times of scanning can be nearly equal to one another, in distributing the image data into the four times of scanning and generating the print data using the mask patterns respectively illustrated in FIGS. 6C-1 to 6C-4.

FIGS. 6D-1 to 6D-4 are diagrams illustrating print data generated by applying the mask patterns respectively illustrated in FIGS. 6C-1 to 6C-4 to the image data illustrated in FIG. 6B.

For example, in the pixel 700 in the print data corresponding to the scanning of the first time illustrated in FIG. 6D-1, the pixel value of the image data is "11", and the code value of the mask pattern is "11". Therefore, as can be seen by reference to the decoding table illustrated in FIG. 7, ejection ("1") of ink is determined in the pixel 700. Further, in the pixel 701, the pixel value of the image data is "10", and the code value of the mask pattern is "10". Therefore, ejection ("1") of ink is determined. Further, in the pixel 704, the pixel value of the image data is "11", and the code value of the mask pattern is "00". Therefore, non-ejection ("0") of ink is determined.

The ink is ejected in the scanning of the first to fourth times according to the print data generated as described above and illustrated in FIGS. 6D-1 to 6D-4. For example, in the scanning of the first time, as can be seen from the print data illustrated in FIG. 6D-1, the ink is ejected to the pixel regions on the printing medium, the pixel regions corresponding to the pixels 700, 701, 705, 708, 710, and 712.

FIG. 6E is a diagram illustrating logical sums of the print data respectively illustrated in FIGS. 6D-1 to 6D-4. The ink is ejected according to the print data respectively illustrated in FIGS. 6D-1 to 6D-4, so that the ink is ejected to the pixel regions corresponding to the respective pixels by the numbers of times illustrated in FIG. 6E.

For example, in the pixel 700, the ejection of ink is determined in the print data corresponding to the scanning of the first, second, and third times illustrated in FIGS. 6D-1, 6D-2, and 6D-3. Therefore, as illustrated in FIG. 6E, the ink is ejected to the pixel region corresponding to the pixel 700 three times in total.

Further, in the pixel 701, the ejection of ink is determined in the print data corresponding to the scanning of the first and fourth times illustrated in FIGS. 6D-1 and 6D-4. Therefore, as illustrated in FIG. 6E, the ink is ejected to the pixel region corresponding to the pixel 701 twice in total.

When comparing the print data illustrated in FIG. 6E and the image data illustrated in FIG. 6B, it can be seen that the print data is generated to eject the ink by the number of times of ejection corresponding to the pixel value of the image data in each of the pixels. For example, in the pixels 700, 705, 708, and 712, the pixel values of the image data illustrated in FIG. 6B are "11", and the numbers of times of ejection of ink indicated by the logical sums of the generated print data are three times.

According to the above configuration, in the four-pass printing method, the one-bit print data to be used in the four times of scanning can be generated based on the image data and the mask patterns having multiple-bit information.

(Three-Pass Printing Method)

FIGS. 8A to 8E are diagrams for describing a process of generating print data using image data and mask patterns having multiple-bit information in the three-pass printing method. Further, in the processing of generating the print data in the three-pass printing method in the present embodiment, the decoding table illustrated in FIG. 7 is used, similarly to the four-pass printing method. Note that description of similar portions to the process of generating the print data in the above-described four-pass printing method is omitted.

FIG. 8A is a diagram schematically illustrating sixteen pixels 800 to 815 in a certain unit area. Note that, here, description will be given using a unit area made of pixel regions equivalent to sixteen pixels, similarly to the four-pass printing method, for simplification. However, the number of pixel regions that configure the unit area can be appropriately set to a different value, and the unit area does not necessarily have the same size as the unit area in the four-pass printing method.

FIG. 8B is a diagram illustrating an example of image data corresponding to the unit area. Note that, as can be seen from FIG. 8B, a process of processing image data similar to the image data illustrated in FIG. 6B will be described as an example.

FIGS. 8C-1 to 8C-3 are diagrams respectively correspond to scanning of the first to third times, and illustrating mask patterns 605 to 607 for being applied to the image data illustrated in FIG. 8B.

Here, the mask patterns having multiple-bit information to be used in the three-pass printing method in the present embodiment are set based on (condition 1') and (condition 2') below.

(Condition 1')

Similarly to the (condition 1) in the four-pass printing method, the $((2^b)-1)$ print permitting pixels are arranged in a plurality of pixels in the same positions in a plurality of mask patterns, and the $((2^b)-1)$ print permitting pixels permit ejection of ink by mutually different numbers. To be specific, any of the code values of "01", "10", and "11" is allocated to each of three $(=2^2-1)$ pixels in the same position in the three mask patterns illustrated in FIGS. 8C-1 to 8C-3 (print permitting pixels). Meanwhile, unlike the mask patterns used in the four-pass printing method illustrated in FIGS. 6C-1 to 6C-4, the code value of "00" is not allocated to the pixels in the mask patterns illustrated in FIGS. 8C-1 to 8C-3. In other words, the code value of "00" is allocated to zero $(=3-3)$ pixels in the same positions in the three mask patterns. That is, the non-print permitting pixel does not exist in the mask patterns illustrated in FIGS. 8C-1 to 8C-3.

For example, to the pixel 800, the code value of "01" is allocated in the mask pattern illustrated in FIG. 8C-3, the code value of "10" is allocated in the mask pattern illustrated in FIG. 8C-2, and the code value of "11" is allocated in the mask pattern illustrated in FIG. 8C-1.

Further, to the pixel 806, the code value of "01" is allocated in the mask pattern illustrated in FIG. 8C-2, the code value of "10" is allocated in the mask pattern illustrated in FIG. 8C-1, and the code value of "11" is allocated in the mask pattern illustrated in FIG. 8C-3.

With such a configuration, even if the pixel value in a certain pixel is any of "00", "01", "10", and "11", the print data for ejecting an ink to a pixel region corresponding to the pixel by the number of times of ejection of ink corresponding to the pixel value can be generated.

(Condition 2')

Further, the print permitting pixels corresponding to the code value of "01" are arranged in the mask patterns respectively illustrated in FIGS. 8C-1 to 8C-3 such that the numbers of the print permitting pixels become nearly the same number to each other. To be specific, the code value of "01" is allocated to the six pixels 803, 804, 808, 813, and 814 in the mask pattern illustrated in FIG. 8C-1. Further, the code value of "01" is allocated to the five pixels 801, 806, 807, 811, and 812 in the mask pattern illustrated in FIG. 8C-2. Further, the code value of "01" is allocated to the six pixels 800, 802, 805, 809, 810, and 815 in the mask pattern illustrated in FIG. 8C-3. As described above, nearly the same numbers of the print permitting pixels corresponding to the code value of "01" are arranged in the three mask patterns respectively illustrated in FIGS. 8C-1 to 8C-3.

Similarly, the print permitting pixels corresponding to the code value of "10" are arranged in the mask patterns respectively illustrated in FIGS. 8C-1 to 8C-3 such that the numbers of the print permitting pixels become the same number to one another. Further, the print permitting pixels corresponding to the code value of "11" are arranged in the mask patterns respectively illustrated in FIGS. 8C-1 to 8C-3 such that the numbers of the print permitting pixels become the same number to one another.

Accordingly, printing rates in the three times of scanning can be nearly equal to one another in distributing the image data into the three times of scanning and generating the print data using the mask patterns respectively illustrated in FIGS. 8C-1 to 8C-3.

FIGS. 8D-1 to 8D-3 are diagrams illustrating print data generated by applying the mask patterns respectively illustrated in FIGS. 8C-1 to 8C-3 to the image data illustrated in FIG. 8B.

For example, in the pixel 800 in the print data corresponding to the scanning of the first time illustrated in FIG. 8D-1, the pixel value of the image data is "11", and the code value of the mask pattern is "11". Therefore, as can be seen by reference to the decoding table illustrated in FIG. 7, ejection ("1") of ink is determined in the pixel 800. Further, in the pixel 806, the pixel value of the image data is "01", and the pixel value of the mask pattern is "10". Therefore, non-ejection ("0") of ink is determined.

The ink is ejected in the scanning of the first to third times according to the print data generated as described above and illustrated in FIGS. 8D-1 to 8D-3. For example, in the scanning of the first time, as can be seen from the print data illustrated in FIG. 8D-1, the ink is ejected to the pixel regions on the printing medium, the pixel regions corresponding to the pixels 800, 801, 802, 804, 805, 808, 809, 810, and 812.

FIG. 8E is a diagram illustrating logical sums of the print data illustrated in FIGS. 8D-1 to 8D-3. The ink is ejected according to the print data illustrated in FIGS. 8D-1 to 8D-3, so that the ink is ejected to the pixel regions corresponding to the pixels by the number of times illustrated in FIG. 8E.

For example, in the pixel 800, the ejection of ink is determined in the print data corresponding to the scanning of the first, second, and third times illustrated in FIGS. 8D-1, 8D-2, and 8D-3. Therefore, as illustrated in FIG. 8E, the ink is ejected to the pixel region corresponding to the pixel 800 three times in total.

Further, in the pixel 806, the ejection of ink is determined in the print data corresponding to the scanning of the third time illustrated in FIG. 8D-3. Therefore, as illustrated in FIG. 8E, the ink is ejected to the pixel region corresponding to the pixel 806 once in total.

When comparing the print data illustrated in FIG. 8E and the image data illustrated in FIG. 8B, it can be seen that the print data is generated to eject the ink by the number of times of ejection corresponding to the pixel value of the image data in each of the pixels. For example, in the pixels 800, 805, 808, and 812, the pixel values of the image data illustrated in FIG. 8B are "11", and the numbers of times of ejection of ink indicated by the logical sums of the generated print data is three times.

According to the above configuration, in the three-pass printing method, the one-bit print data to be used in the three times of scanning can be generated based on the image data and the mask patterns having multiple-bit information.

The degradation of the image quality in a case where the ejection failure of ink has occurred in one ejection port, in using the image data and the mask patterns having multiple bit-information will be described.

Figure 9:
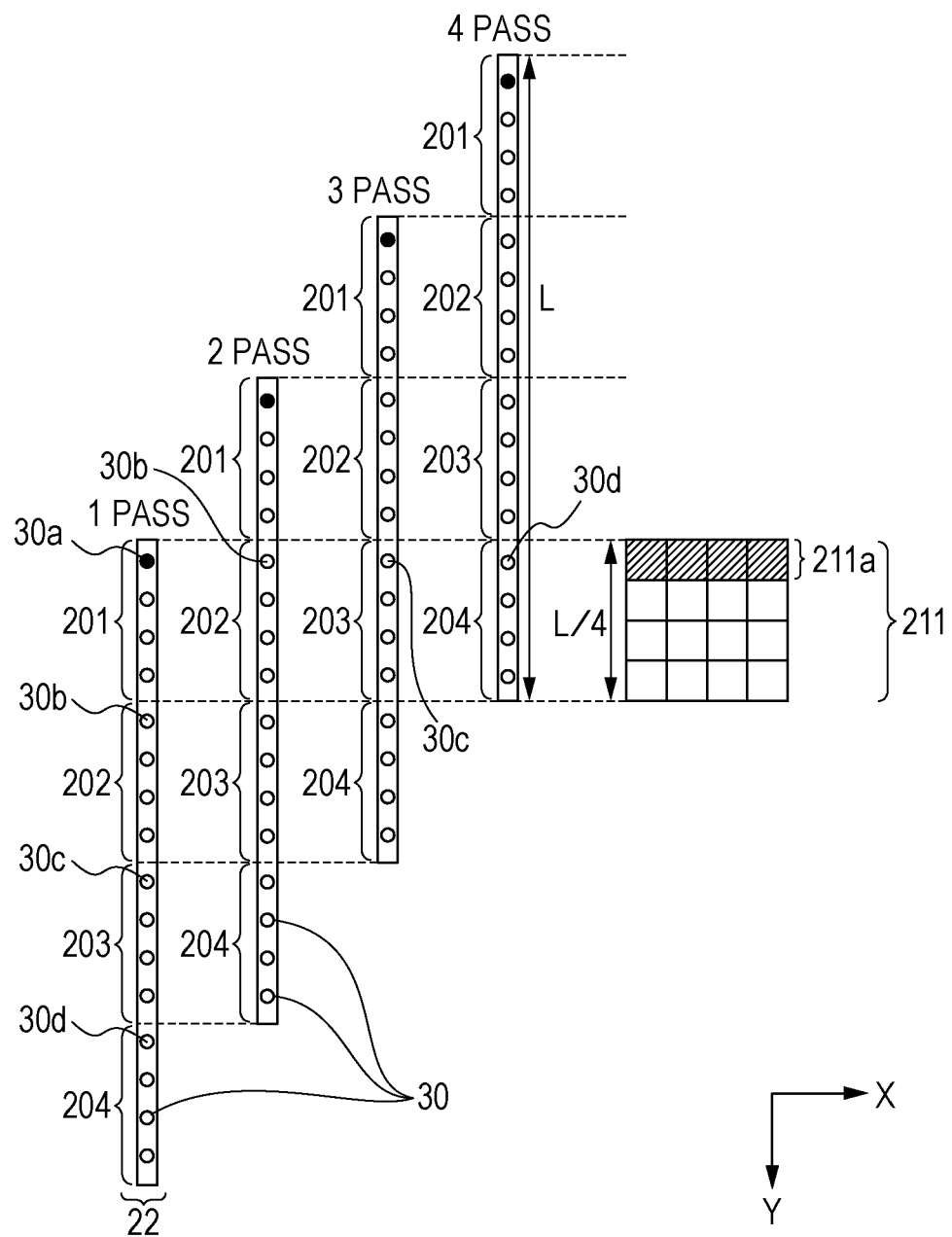
FIG. 9 is a schematic view for describing image quality degradation of when ejection failure of ink is caused.

FIG. 9 is a diagram for describing an effect for the image quality of an image recorded in the unit area 211 when the ejection failure of ink is caused in one ejection port 30a of the sixteen ejection port 30 in the four-pass printing method illustrated in FIGS. 5 to 7. In the following description, the ejection port in which the ejection failure of ink has occurred is also referred to as ejection detective nozzle, for simplification. Further, here, a case in which the ejection failure is caused in the four-pass printing method will be described. However, a similar phenomenon is caused even in the three-pass printing method.

Normally, in a region 211a, the ink can be ejected through ejection ports 30a to 30d four times in total in the scanning of the first to fourth times. However, when the ejection port 30a is the ejection defective nozzle, even if the print data is determined to eject the ink through the ejection port 30a, the ink is not ejected to the region 211a in the scanning of the first time, and the ink is ejected up to three times. Therefore, a desired number of ejection may not be able to be obtained in the region 211a.

FIGS. 10A and 10B are diagrams for describing the degradation of the image quality caused when the ejection defective nozzle is generated. FIG. 10A illustrates a case of performing printing according to the four-pass printing method illustrated in FIGS. 6A to 6E, and FIG. 10B illustrates a case of performing printing according to the three-pass printing method illustrated in FIGS. 8A to 8E. In a case of using the image data and the mask patterns illustrated in FIGS. 6A to 6E in the four-pass printing method, as can be seen from FIG. 6D-1, the print data corresponding to the scanning of the first time, in which the ejection ("1") of ink is determined, is generated in the pixels 700 and 701 in the region 211a. However, the region 211a corresponds to the ejection defective nozzle 30a in the scanning of the first time. Therefore, even if the print data determines the ejection of ink, the ink cannot be ejected in reality. Therefore, the ink is not ejected to the pixel regions corresponding to the pixels 700 and 701 in the scanning of the first time.

Here, as can be seen from FIG. 10A, the pixel regions corresponding to the pixels 704 to 715 in the unit area 211 do not face the ejection defective nozzle 30a in each scanning. Therefore, the ink can be ejected by the number of times similar to the ideal number of times of ejection of ink illustrated in FIG. 6E. Further, although the pixel regions corresponding to the pixels 702 and 703 face the ejection defective nozzle 30a in the scanning of the first time, the non-ejection ("0") of ink is determined in the print data corresponding to the scanning of the first time, as illustrated in FIG. 6D-1. Therefore, the number of times of ejection becomes similar to the ideal number of times of ejection of ink illustrated in FIG. 6E.

Meanwhile, while the ideal number of times of ejection is three times, as illustrated in FIG. 6E, the ink is ejected to the pixel region corresponding to the pixel 700 in the unit area 211 only twice in total. This is because, although the ink is ejected to the pixel region corresponding to the pixel 700 according to the print data illustrated in FIGS. 6D-2 and 6D-3 in the scanning of the second and third times, the ink is not ejected in the scanning of the first time, as described above, and thus a gap is caused from the ideal number of times of ejection.

Similarly, while the ideal number of times of ejection of ink illustrated in FIG. 6E is twice, the ink is ejected to the pixel 701 in the unit area 211 only once in total. This is because, although the ink is ejected to the pixel region corresponding to the pixel 701 according to the print data illustrated in FIG. 6D-4 in the scanning of the fourth time, the ink cannot be ejected in the scanning of the first time.

Further, in a case of using the image data and the mask patterns illustrated in FIGS. 8A to 8E in the three-pass printing method, as can be seen from FIG. 8D-1, the print data in which the ejection ("1") of ink is determined is generated in the pixels 800, 801, and 802 in the region 211*a*. However, similarly to the case of the four-pass printing method, the ink cannot be ejected to the pixel regions corresponding to the pixels 800, 801, and 802 in the scanning of the first time due to the ejection failure of ink.

Here, as can be seen from FIG. 10B, the pixel regions corresponding to the pixels 804 to 815 in the unit area 211 do not face the ejection defective nozzle 30*a* a in each scanning. Therefore, the ink can be ejected by the number of times similar to the ideal number of times of ejection of ink illustrated in FIG. 8E. Further, although the pixel region corresponding to the pixel 803 faces the ejection defective nozzle 30*a* in the scanning of the first time, the non-ejection ("0") of ink is determined in the print data corresponding to the scanning of the first time, as illustrated in FIG. 8D-1. Therefore, the number of times of ejection becomes similar to the ideal number of times of ejection of ink illustrated in FIG. 8E.

Meanwhile, while the ideal number of times of ejection of ink is three times, as illustrated in FIG. 8E, the ink is ejected to the pixel region corresponding to the pixel 800 in the unit area 211 only twice in total. Similarly, while the ideal number of times of ejection of ink is three times, as illustrated in FIG. 8E, the ink is ejected to the pixel region corresponding to the pixel 801 only once in total. Further, although the ideal number of times of ejection of ink is once, as illustrated in FIG. 8E, the ink cannot be ejected to the pixel region corresponding to the pixel 802 even once in total.

As described above, when the ejection failure of ink has occurred, a gap may be caused from the ideal number of times of ejection in both of the four-pass printing method and the three-pass printing method, and the image quality of an image may be degraded.

(Non-Ejection Complementary Processing)

In view of the foregoing, in the present embodiment, when the ejection failure of ink is caused, processing of modifying the code value in the pixel corresponding to the ejection port in which the ejection failure of ink has occurred in the mask pattern (hereinafter, the processing is also referred to as non-ejection complementary processing) is executed. That is, processing of allocating a code value of a complementary source pixel that is the pixel corresponding to the ejection defective nozzle to a complementary destination pixel that is the pixel corresponding to the ejection normal nozzle is performed. Accordingly, even in a case where the ejection failure of ink is caused, the printing can be performed such that the gap from the ideal number of times of ejection becomes small.

Note that the non-ejection complementary processing in the present embodiment is performed before printing to the printing medium is started. However, in a case where the mask pattern to be applied is changed for each region to be printed, the non-ejection complementary processing may be performed in the process of the printing. Further, the non-ejection complementary processing may be performed for the mask pattern corresponding to the region to be printed before the start of the printing, and the corresponding mask pattern for which the non-ejection complementary processing has been executed may be read for each region to be printed.

Figure 11:
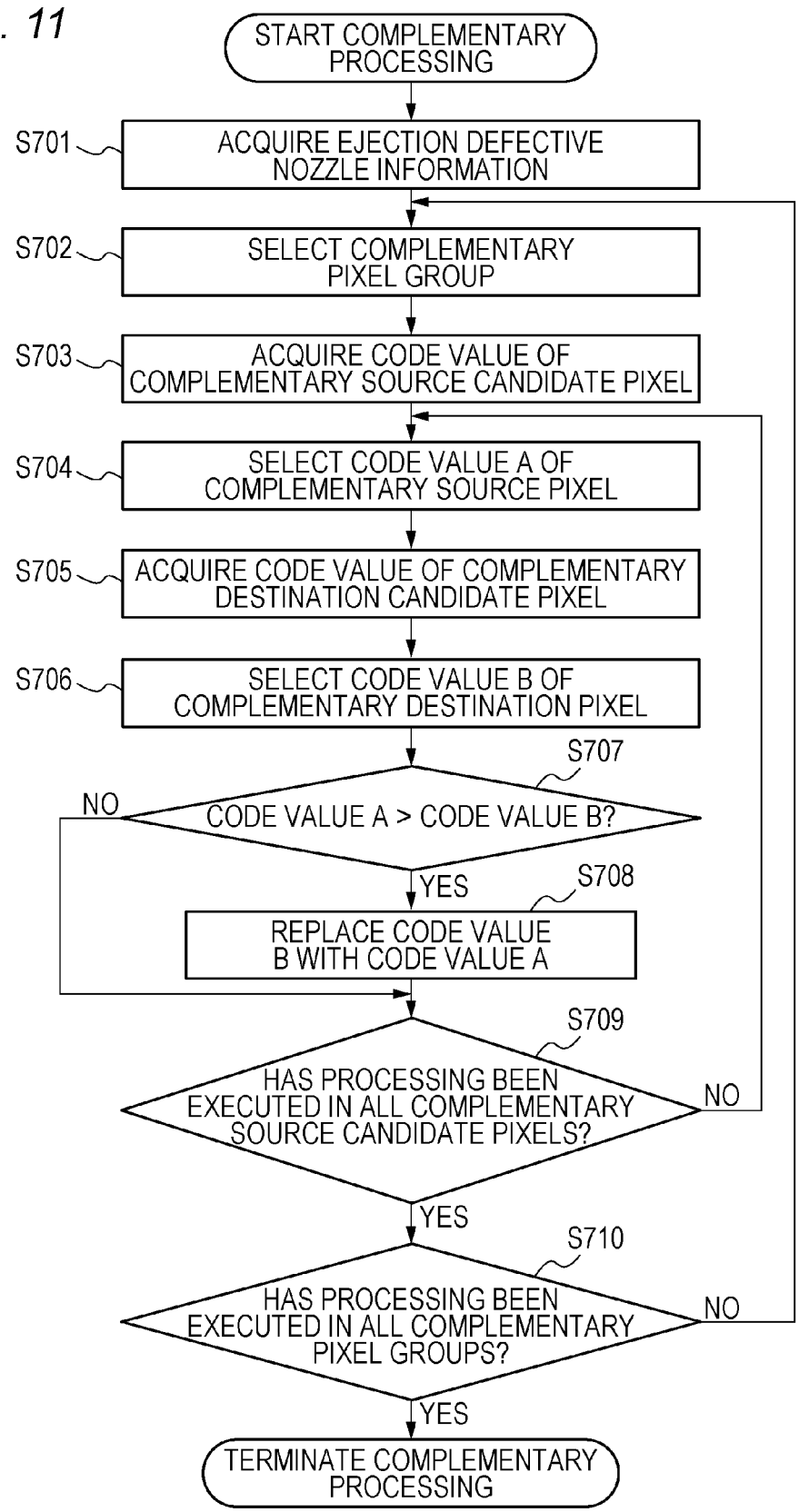
FIG. 11 is a diagram for describing a processing process of non-ejection complement in an embodiment.

FIG. 11 is a flowchart of the non-ejection complementary processing executed by the control program in the present embodiment. The processing illustrated in FIG. 11 is realized by the CPU 301 reading the control program stored in the ROM 302 to the RAM 303, and executing the read program.

In step S701, the ejection defective nozzle data stored in the memory 313 is read, and the information for identifying the ejection port in which the ejection failure of ink exists is acquired. Note that the ejection defective nozzle data can be generated by various methods. For example, the ejection defective nozzle data obtained by printing a test pattern to eject the ink through all the ejection ports before execution of the non-ejection complementary processing, and identifying the ejection defective nozzle based on the test pattern can be used. Further, in the process of using an ink jet printing apparatus 100, the position or the number of the ejection defective nozzles may be changed. To follow such change, the ejection defective nozzle data may be updated based on information detected in a recovery operation, a preliminary ejection operation, and the like in a home position of a printing head 111.

In step S702, about a pixel group made of a plurality of pixels in the same position to each other in the plurality of mask patterns (for example, a pixel group made of the pixels 700 in the respective mask patterns illustrated in FIGS. 6C-1 to 6C-4), any one of complementary pixel groups that include at least one pixel corresponding to the ejection defective nozzle is selected as a pixel group for which the non-ejection complementary processing is first executed. In a case where a plurality of the complementary pixel groups exists, the order to execute the non-ejection complementary processing can be appropriately set. For example, in step S702, one complementary pixel group for which the non-ejection complementary processing is executed may be randomly selected from the plurality of complementary pixel groups.

Next, in step S703, the code value of the complementary source candidate pixel (first candidate pixel) corresponding to the ejection defective nozzle of the complementary pixel group selected in step S702 is acquired. At this time, in a case where only one complementary source candidate pixel corresponding to the ejection defective nozzle exists in the complementary pixel group selected in step S702, one code value is acquired. In a case where a plurality of complementary source candidate pixels corresponding to the ejection defective nozzle exists, the code values in the respective complementary source candidate pixels are acquired.

Next, in step S704, one code value is selected from the code values of the complementary source candidate pixels acquired in step S703, as a code value A of the complementary source pixel (first pixel) to be used in the processing described below. Here, in a case where a plurality of code values has been acquired in step S703, one code value is randomly selected from the plurality of code values in step S704 in the present embodiment, and the code value is determined as the code value A.

Next, in step S705, a code value of the complementary destination candidate pixel (second candidate pixel) corresponding to a nozzle other than the ejection defective nozzle (hereinafter, the nozzle is also referred to as ejection normal nozzle) of the complementary pixel group selected in step S702 is acquired. At this time, in a case where only one complementary destination candidate pixel corresponding to the ejection normal nozzle exists in the complementary pixel group selected in step S702, one code value is acquired. Further, in a case where a plurality of complementary destination candidate pixels corresponding to the ejection normal nozzle exists, the code values in the respective complementary destination candidate pixels are acquired.

Next, in step S706, one code value is selected from the code values of the complementary destination candidate pixels acquired in step S705, as a code value B of the complementary destination pixel (second pixel) describe below is selected. Here, in step S704 in the present embodiment, the code value that indicates the smallest number of times of permission of ejection of ink, of the code values of the complementary destination candidate pixels acquired in step S705, is selected and is used as the code value B of the complementary destination pixel.

As described using the decoding table illustrated in FIG. 7, in the present embodiment, when the code value is "00", even if the pixel value in the corresponding pixel is any of "00", "01", "10", and "11", the ink is not ejected. In other words, the code value of "00" indicates that the number of times of permission of ejection of ink is zero times. Further, when the code value is "01", the ink is ejected only when the corresponding pixel value is "11". That is, the code value of "01" indicates that the number of times of permission of ejection of ink is once. Similarly, the code value of "10" indicates that the number of times of permission of ejection of ink is twice, and the code value of "11" indicates that the number of times of permission of ejection of ink is three times. Therefore, the code values of the mask patterns in the present embodiment are "00", "01", "10", and "11" in increasing order of the number of times of permission of ejection of ink.

Therefore, for example, when the code values of the complementary destination candidate pixel acquired in step S705 are "00" and "11", the code value of "00" is selected as the code value B of the complementary destination pixel in step S706. Further, for example, when the code values of the complementary destination candidate pixel acquired in step S705 are "01", "10", "11", the code value of "01" is selected as the code value B of the complementary destination pixel in step S706. Further, for example, when the code value of the complementary destination candidate pixel acquired in step S705 is only "10", the code value of "10" is selected as the code value B of the complementary destination pixel in step S706.

Next, in step S707, comparison of the code value A selected in step S704 and the code value B selected in step S706 is performed. Here, when the number of times of permission of ejection of ink indicated by the code value A is larger than that indicated by the code value B, the processing proceeds to step S708, and the processing of replacing the code value B determined to the complementary destination pixel with the code value A determined to the complementary source pixel is performed. Meanwhile, when the number of times of permission of ejection of ink indicated by the code value A is smaller than that indicated by the code value B, the replacement processing is not executed.

For example, when the code value A selected in step S704 is "11" and the code value B selected in step S706 is "00", the number of times of permission (three times) indicated by the code value A is larger than the number of times of permission (zero times) indicated by the code value B. Therefore, the code value B of "00" of the complementary destination pixel is replaced with the code value of "11" of the complementary source pixel in step S708. Further, when the code value A is "10" and the code value B is "01", the number of times of permission (twice) indicated by the code value A is larger than the number of times of permission (once) indicated by the code value B. Therefore, the code value B of "01" of the complementary destination pixel is replaced with the code value of "10" of the complementary source pixel. Further, when the code value A is "01" and the code value B is "11", the number of times of permission (once) indicated by the code value A is smaller than the number of times of permission (three times) indicated by the code value B. Therefore, the replacement processing is not performed, and the original "11" is determined without change as the code value of the complementary destination pixel.

Next, in step S709, whether a complementary source candidate pixel for which the processing in steps S704 to S708 has not yet been executed exists in the complementary pixel group selected in step S702 is determined. When it is determined that the processing in steps S704 to S708 has been executed for all the complementary source candidate pixels, the processing proceeds to step S710.

Meanwhile, when it is determined that remaining complementary source candidate pixels for which the processing in steps S704 to S708 has not yet been performed exist, the processing returns to step S704, and processing similar to the processing in steps S704 to S708 is executed for the remaining complementary source candidate pixels. Here, in the present embodiment, a complementary destination pixel for which replacement has been executed even once in step S708 in one complementary pixel group is excluded from the complementary destination candidate pixels in step S705 in the subsequent processing.

Then, in step S710, whether the processing in steps S703 to S709 has been executed for all the complementary pixel groups that include at least one pixel corresponding to the ejection defective nozzle is determined. When it is determined that the complementary pixel groups for which the processing in steps S703 to S709 has not yet been executed remain, the processing returns to S702, and the processing in steps S703 to S709 is executed for all the remaining complementary pixel groups. Meanwhile, when it is determined that the processing in steps S703 to S709 has been executed for all the complementary pixel groups, the non-ejection complementary processing is terminated, and a finally obtained mask pattern is updated as a mask pattern to be used for generation of print data.

(Non-Ejection Complementary Processing in Four-Pass Printing Method)

A process in executing the non-ejection complementary processing (S701 to S710) illustrated in FIG. 11 in the four-pass printing method will be described in detail, using a case in which the ejection defective nozzle 30a illustrated in FIG. 9 occurs as an example.

FIGS. 12A to 12F are diagram schematically illustrating a state of data in an execution process of the non-ejection complementary processing.

FIGS. 12A and 12B are similar to FIGS. 6A and 6B, respectively. Further, FIGS. 12C-1 to 12C-4 are also similar to FIGS. 6C-1 to 6C-4, respectively, and are diagrams illustrating mask patterns 505 to 508 corresponding to the scanning of the first to fourth times in the four-pass printing method in the present embodiment. Further, FIGS. 12C'-1 to 12C'-4 are diagrams respectively illustrating mask patterns 505' to 508' corresponding to the scanning of the first to fourth times, which are generated by executing the non-ejection complementary processing in the present embodiment for the mask patterns illustrated in FIGS. 12C-1 to 12C-4.

Here, in a case where the ejection defective nozzle 30a illustrated in FIG. 9 is caused, pixels 700, 701, 702, and 703 in the mask pattern 505 corresponding to the scanning of the first time become pixels corresponding to the ejection defective nozzle 30a. Therefore, in step S702, one complementary pixel group of a first complementary pixel group made of four pixels 700, a second complementary pixel group made of four pixels 701, a third complementary pixel group made of four pixels 702, and a fourth complementary pixel group made of four pixels 703, in the four mask patterns 505 to 508, is selected. Here, as an example, a case in which the first complementary pixel group made of four pixels 700 in the mask patterns 505 to 508 is selected will be described.

In the first complementary pixel group, the pixel 700 corresponding to the ejection defective nozzle is included only in the mask pattern 505 corresponding to the scanning of the first time. Therefore, in step S703, the code value "11" of the pixel 700 in the mask pattern 505 corresponding to the scanning of the first time is acquired as the code value of the complementary source candidate pixel. Since there is only one complementary source candidate pixel, in step S704, the code value "11" of the pixel 700 in the mask pattern 505 corresponding to the scanning of the first time is selected as the code value A.

Further, in the first complementary pixel group, the pixel 700 corresponding to the ejection normal nozzle is included in the mask patterns 506, 507, and 508 corresponding to the scanning of the second, third, and fourth times. Therefore, in step S705, three code values including the code value "10" of the pixel 700 in the mask pattern 506 corresponding to the scanning of the second time, the code value "01" of the pixel 700 in the mask pattern 507 corresponding to the scanning of the third time, and the code value "00" of the pixel 700 in the mask pattern 508 corresponding to the scanning of the fourth time are acquired as the code values of the complementary destination candidate pixels. In step S706, the code value "00" of the pixel 700 in the mask pattern 508 corresponding to the scanning of the fourth time, which indicates the smallest number of times of permission of ejection of ink in the three code value, is selected as the code value B.

Then, in step S707, it is determined that the number of times of permission (three times) indicated by the code value "11" of the pixel 700 in the mask pattern 505 as the code value A is larger than the number of times of permission (zero times) indicated by the code value "00" of the pixel 700 in the mask pattern 508 as the code value B. Therefore, as illustrated in FIG. 12C'-4, in step S708, the code value "00" of the pixel 700 in the mask pattern 508 is replaced with the code value "11".

As described above, since there is only one complementary source candidate pixel in the first complementary pixel group, it is determined that the non-ejection complementary processing has been performed for all the complementary source candidate pixels in the first complementary pixel group by the above-described processing in step S709. Then, in step S710, since the non-ejection complementary processing has not yet been executed in the remaining second, third, and fourth complementary pixel groups, the processing returns to step S704.

Next, a case in which the second complementary pixel group made of four pixels 701 in the mask patterns 505 to 508 is selected from the remaining second, third, and fourth complementary pixel groups in step 704 will be described.

In the second complementary pixel group, the pixel 701 corresponding to the ejection defective nozzle is included only in the mask pattern 505 corresponding to the scanning of the first time. Therefore, in step S703, the code value "10" of the pixel 701 in the mask pattern 505 corresponding to the scanning of the first time is acquired as the code value of the complementary source candidate pixel. Since there is only one complementary source candidate pixel, in step S704, the code value "10" of the pixel 701 in the mask pattern 505 corresponding to the scanning of the first time is selected as the code value A.

Further, in the second complementary pixel group, the pixel 701 corresponding to the ejection normal nozzle is included in the mask patterns 506, 507, and 508 corresponding to the scanning of the second, third, and fourth times. Therefore, in step S705, three code values including the code value "01" of the pixel 701 in the mask pattern 506 corresponding to the scanning of the second time, the code value "00" of the pixel 701 in the mask pattern 507 corresponding to the scanning of the third time, and the code value "11" of the pixel 701 in the mask pattern 508 corresponding to the scanning of the fourth time are acquired as the code values of the complementary destination candidate pixels. In step S706, the code value "00" of the pixel 701 in the mask pattern 507 corresponding to the scanning of the third time, which indicates the smallest number of times of permission of ejection of ink in the three code values, is selected as the code value B.

Then, in step S707, it is determined that the number of times of permission (twice) indicated by the code value "10" of the pixel 701 in the mask pattern 505 as the code value A is larger than the number of times of permission (zero times) indicated by the code value "00" of the pixel 701 in the mask pattern 507 as the code value B. Therefore, as illustrated in FIG. 12C'-3, in step S708, the code value "00" of the pixel 701 in the mask pattern 507 is replaced with the code value "10".

As described above, since there is only one complementary source candidate pixel in the second complementary pixel group, it is determined that the non-ejection complementary processing has been performed for all the complementary source candidate pixels in the second complementary pixel group by the above-described processing in step S709. Then, in step S710, since the non-ejection complementary processing has not yet been executed in the remaining third and fourth complementary pixel groups, the processing returns to step S704.

Next, a case in which the third complementary pixel group made of four pixels 702 in the mask patterns 505 to 508 is selected from the remaining third and fourth complementary pixel groups in step 704 will be described.

In the third complementary pixel group, the pixel 702 corresponding to the ejection defective nozzle is included only in the mask pattern 505 corresponding to the scanning of the first time. Therefore, in step S703, the code value "01" of the pixel 702 in the mask pattern 505 corresponding to the scanning of the first time is acquired as the code value of the complementary source candidate pixel. Since there is only one complementary source candidate pixel, in step S704, the code value "01" of the pixel 702 in the mask pattern 505 corresponding to the scanning of the first time is selected as the code value A.

Further, in the third complementary pixel group, the pixel 702 corresponding to the ejection normal nozzle is included in the mask patterns 506, 507, and 508 corresponding to the scanning of the second, third, and fourth times. Therefore, in step S705, three code values including the code value "00" of the pixel 702 in the mask pattern 506 corresponding to the scanning of the second time, the code value "11" of the pixel 702 in the mask pattern 507 corresponding to the scanning of the third time, and the code value "10" of the pixel 702 in the mask pattern 508 corresponding to the scanning of the fourth time are acquired as the code values of the complementary destination candidate pixels. In step S706, the code value "00" of the pixel 702 in the mask pattern 506 corresponding to the scanning of the second time, which indicates the smallest number of times of permission of ejection of ink in the three code values, is selected as the code value B.

Then, in step S707, it is determined that the number of times of permission (once) indicated by the code value "01" of the pixel 702 in the mask pattern 505 as the code value A is larger than the number of times of permission (zero times) indicated by the code value "00" of the pixel 702 in the mask pattern 506 as the code value B. Therefore, as illustrated in FIG. 12C'-2, in step S708, the code value "00" of the pixel 702 in the mask pattern 506 is replaced with the code value "01".

As described above, since there is only one complementary source candidate pixel in the third complementary pixel group, it is determined that the non-ejection complementary processing has been performed for all the complementary source candidate pixels in the third complementary pixel group by the above-described processing in step S709. Then, in step S710, since the non-ejection complementary processing has not yet been executed in the remaining fourth complementary pixel group, the processing returns to step S704.

Next, a case in which the fourth complementary pixel group made of four pixels 703 in the mask patterns 505 to 508 is selected in step 704 will be described.

In the fourth complementary pixel group, the pixel 703 corresponding to the ejection defective nozzle is included only in the mask pattern 505 corresponding to the scanning of the first time. Therefore, in step S703, the code value "00" of the pixel 703 in the mask pattern 505 corresponding to the scanning of the first time is acquired as the code value of the complementary source candidate pixel. Since there is only one complementary source candidate pixel, in step S704, the code value "00" of the pixel 703 in the mask pattern 505 corresponding to the scanning of the first time is selected as the code value A.

Further, in the fourth complementary pixel group, the pixel 703 corresponding to the ejection normal nozzle is included in the mask patterns 506, 507, and 508 corresponding to the scanning of the second, third, and fourth times. Therefore, in step S705, three code values including the code value "11" of the pixel 703 in the mask pattern 506 corresponding to the scanning of the second time, the code value "10" of the pixel 703 in the mask pattern 507 corresponding to the scanning of the third time, and the code value "01" of the pixel 703 in the mask pattern 508 corresponding to the scanning of the fourth time are acquired as the code values of the complementary destination candidate pixels. In step S706, the code value "01" of the pixel 703 in the mask pattern 508 corresponding to the scanning of the fourth time, which indicates the smallest number of times of permission of ejection of ink in the three code values, is selected as the code value B.

Then, in step S707, it is determined that the number of times of permission (zero times) indicated by the code value "00" of the pixel 703 in the mask pattern 505 as the code value A is smaller than the number of times of permission (once) indicated by the code value "01" of the pixel 703 in the mask pattern 508 as the code value B. Therefore, the replacement processing in step S708 is not executed. Therefore, as illustrated in FIG. 12C'-4, the code value of the pixel 703 in the mask pattern 508 remains in "01".

As described above, since there is only one complementary source candidate pixel in the fourth complementary pixel group, it is determined that the non-ejection complementary processing has been performed for all the complementary source candidate pixels in the fourth complementary pixel group by the above-described processing in step S709. Then, in step S710, it is determined that the non-ejection complementary processing has been executed in all the complementary pixel groups, and the non-ejection complementary processing is terminated.

As can be seen from FIGS. 12C'-1 to 12C'-4, by executing the non-ejection complementary processing, the code values of the three pixels including the pixel 702 in the mask pattern corresponding to the scanning of the second time, the pixel 701 in the mask pattern corresponding to the scanning of the third time, and the pixel 700 in the mask pattern corresponding to the scanning of the fourth time are replaced.

FIGS. 12D-1 to 12D-4 are diagrams illustrating print data generated by applying the mask patterns after the non-ejection complementary processing respectively illustrated in FIGS. 12C'-1 to 12C'-4 to the image data illustrated in FIG. 12B.

By use of the mask pattern after the non-ejection complementary processing in the present embodiment is executed, when compared with the print data illustrated in FIGS. 6D-1 to 6D-4, it can be seen that the ejection ("1") of ink is determined in the pixel 701 of the print data corresponding to the scanning of the third time illustrated in FIG. 12D-3 and the pixel 700 of the print data corresponding to the scanning of the fourth time illustrated in FIG. 12D-4, in the print data illustrated in FIGS. 12D-1 to 12D-4, in addition to the pixels in which the ejection ("1") of ink is determined in the print data illustrated in FIGS. 6D-1 to 6D-4.

Therefore, as illustrated in FIG. 12E, the logical sum of the print data illustrated in FIGS. 12D-1 to 12D-4 becomes larger than the logical sum of the print data illustrated in FIG. 6E by 1 in the pixels 700 and 701.

Here, while the ejection ("1") of ink is determined in the pixels 700 and 701 in the print data corresponding to the scanning of the first time illustrated in FIG. 12D-1, in reality, these pixels correspond to the ejection defective nozzle. Therefore, the ink is not ejected. Therefore, when the ink is ejected according to the print data illustrated in FIGS. 12D-1 to 12D-4, the actual numbers of times of ejection of ink for the pixels can be the same numbers as the numbers of times of ejection of ink illustrated in FIG. 6E of a case where the ejection failure of ink does not occur, as illustrated in FIG. 12F. As described above, by performing the non-ejection complementary processing according to the present embodiment, the degradation of the image quality as illustrated in FIG. 10A in a case where the ejection failure of ink occurs can be suppressed.

(Non-Ejection Complementary Processing in Three-Pass Printing Method)

Next, a process of when the non-ejection complementary processing illustrated in FIG. 11 is executed in the three-pass printing method will be described below in detail.

FIGS. 13A to 13F are diagrams schematically illustrating an execution process of the non-ejection complementary processing.

FIGS. 13A and 13B are similar to FIGS. 8A and 8B, respectively. Further, FIGS. 13C-1 to 13C-3 are also similar to FIGS. 8C-1 to 8C-3, respectively, and are diagrams illustrating mask patterns 605 to 607 corresponding to the scanning of the first to third times in the three-pass printing method in the present embodiment. Further, FIGS. 13C'-1 to 13C'-3 are diagrams respectively illustrating mask patterns 605' to 607' corresponding to the scanning of the first to third times, which are generated by executing the non-ejection complementary processing in the present embodiment for the mask patterns illustrated in FIGS. 13C-1 to 13C-3.

Here, in a case where the ejection defective nozzle 30a as illustrated in FIG. 9 is caused, pixels 800, 801, 802, and 803 in the mask pattern 605 corresponding to the scanning of the first time become pixels corresponding to the ejection defective nozzle 30a. Therefore, in step S702, one complementary pixel group of a first complementary pixel group made of three pixels 800, a second complementary pixel group made of three pixels 801, a third complementary pixel group made of three pixels 802, a fourth complementary pixel group made of three pixels 803, of three mask patterns 605 to 607, is selected. Here, as an example, a case in which the first complementary pixel group made of three pixels 800 of the mask patterns 605 to 607 is selected will be described.

In the first complementary pixel group, the pixel 800 corresponding to the ejection defective nozzle is included only in the mask pattern 605 corresponding to the scanning of the first time. Therefore, in step S703, the code value "11" of the pixel 800 in the mask pattern 605 corresponding to the scanning of the first time is acquired as the code value of the complementary source candidate pixel. Since there is only one complementary source candidate pixel, in step S704, the code value "11" of the pixel 800 in the mask pattern 605 corresponding to the scanning of the first time is selected as the code value A.

Further, in the first complementary pixel group, the pixel 800 corresponding to the ejection normal nozzle is included in the mask patterns 606 and 607 corresponding to the scanning of the second and third times. Therefore, in step S705, two code values including the code value "10" of the pixel 800 in the mask pattern 606 corresponding to the scanning of the second time, and the code value "01" of the pixel 800 in the mask pattern 607 corresponding to the scanning of the third time are acquired as the code values of the complementary destination candidate pixels. In step S706, the code value "01" of the pixel 800 in the mask pattern 607 corresponding to the scanning of the third time, which indicates the smallest number of times of permission of ejection of ink of the two code values, is selected as the code value B.

Then, in step S707, it is determined that the number of times of permission (three times) indicated by the code value "11" of the pixel 800 in the mask pattern 605 as the code value A is larger than the number of times of permission (once) indicated by the code value "01" of the pixel 800 in the mask pattern 607 as the code value B. Therefore, as illustrated in FIG. 13C'-3, the code value "00" of the pixel 800 in the mask pattern 607 is replaced with the code value "11" in step S708.

As described above, since there is only one complementary source candidate pixel in the first complementary pixel group, it is determined that the non-ejection complementary processing has been performed for all the complementary source candidate pixels in the first complementary pixel group by the above-described processing in step S709. Then, in step S710, since the non-ejection complementary processing has not yet been executed in the remaining second, third, and fourth complementary pixel groups, the processing returns to step S704.

Next, a case in which the second complementary pixel group made of three pixels 801 in the mask patterns 605 and 608 is selected from the second, third, and fourth complementary pixel groups in step S704 will be described.

In the second complementary pixel group, the pixel 801 corresponding to the ejection defective nozzle is included only in the mask pattern 605 corresponding to the scanning of the first time. Therefore, in step S703, the code value "10" of the pixel 801 in the mask pattern 605 corresponding to the scanning of the first time is acquired as the code value of the complementary source candidate pixel. Since there is only one complementary source candidate pixel, in step S704, the code value "10" of the pixel 801 in the mask pattern 605 corresponding to the scanning of the first time is selected as the code value A.

Further, in the second complementary pixel group, the pixel 801 corresponding to the ejection normal nozzle is included in the mask patterns 606 and 607 corresponding to the scanning of the second and third times. Therefore, in step S705, two code values including the code value "01" of the pixel 801 in the mask pattern 606 corresponding to the scanning of the second time, and the code value "11" of the pixel 801 in the mask pattern 607 corresponding to the scanning of the third time are acquired as the code values of the complementary destination candidate pixels. In step S706, the code value "01" of the pixel 701 in the mask pattern 606 corresponding to the scanning of the second time, which indicates the smallest number of times of permission of ejection of ink in the two code values, is selected as the code value B.

Then, in step S707, it is determined that the number of times of permission (twice) indicated by the code value "10" of the pixel 801 in the mask pattern 605 as the code value A is larger than the number of times of permission (once) indicated by the code value "01" of the pixel 801 in the mask pattern 606 as the code value B. Therefore, as illustrated in FIG. 13C'-2, the code value "01" of the pixel 801 in the mask pattern 606 is replaced with the code value "10" in step S708.

As described above, since there is only one complementary source candidate pixels in the second complementary pixel group, it is determined that the non-ejection complementary processing has been performed for all the complementary source candidate pixels in the second complementary pixel group by the above-described processing in step S709. Then, in step S710, since the non-ejection complementary processing has not yet been executed in the remaining third and fourth complementary pixel groups, the processing returns to step S704.

Next, a case in which the third complementary pixel group made of three pixels 802 in the mask patterns 605 to 607 of the remaining third and fourth complementary pixel groups is selected in step S704 will be described.

In the third complementary pixel group, the pixel 802 corresponding to the ejection defective nozzle is included only in the mask pattern 605 corresponding to the scanning of the first time. Therefore, in step S703, the code value "11" of the pixel 802 in the mask pattern 605 corresponding to the scanning of the first time is acquired as the code value of the complementary source candidate pixel. Since there is only one complementary source candidate pixel, in step S704, the code value "11" of the pixel 802 in the mask pattern 605 corresponding to the scanning of the first time is selected as the code value A.

Further, in the third complementary pixel group, the pixel 802 corresponding to the ejection normal nozzle is included in the mask patterns 606 and 607 corresponding to the scanning of the second and third times. Therefore, in step S705, two code values including the code value "10" of the pixel 802 in the mask pattern 606 corresponding to the scanning of the second time, and the code value "01" of the pixel 802 in the mask pattern 607 corresponding to the scanning of the third time are acquired as the code values of the complementary destination candidate pixels. In step S706, the code value "01" of the pixel 802 in the mask pattern 607 corresponding to the scanning of the third time, which indicates the smallest number of times of permission of ejection of ink in the two code values, is selected as the code value B.

Then, in step S707, it is determined that the number of times of permission (three times) indicated by the code value "11" of the pixel 802 in the mask pattern 605 as the code value A is larger than the number of times of permission (once) indicated by the code value "01" of the pixel 802 in the mask pattern 607 as the code value B. Therefore, as illustrated in FIG. 12C'-3, the code value "01" of the pixel 802 in the mask pattern 606 is replaced with the code value "11" in step S708.

As described above, in the third complementary pixel group, since there is only one complementary source candidate pixel, it is determined that the non-ejection complementary processing has been performed for all the complementary source candidate pixels in the third complementary pixel group by the above-described processing in step S709. Then, in step S710, since the non-ejection complementary processing has not yet been executed in the remaining fourth complementary pixel group, the processing returns to step S704.

Next, a case in which the fourth complementary pixel group made of three pixels 803 in the mask patterns 605 to 607 is selected in step 704 will be described.

In the fourth complementary pixel group, the pixel 803 corresponding to the ejection defective nozzle is included only in the mask pattern 605 corresponding to the scanning of the first time. Therefore, in step S703, the code value "01" of the pixel 803 in the mask pattern 605 corresponding to the scanning of the first time is acquired as the code value of the complementary source candidate pixel. Since there is only one complementary source candidate pixel, in step S704, the code value "01" of the pixel 803 in the mask pattern 605 corresponding to the scanning of the first time is selected as the code value A.

Further, in the fourth complementary pixel group, the pixel 803 corresponding to the ejection normal nozzle is included in the mask patterns 606 and 607 corresponding to the scanning of the second and third times. Therefore, in step S705, two code values including the code value "11" of the pixel 803 in the mask pattern 606 corresponding to the scanning of the second time, and the code value "10" of the pixel 803 in the mask pattern 607 corresponding to the scanning of the third time are acquired as the code values of the complementary destination candidate pixels. In step S706, the code value "10" of the pixel 803 in the mask pattern 607 corresponding to the scanning of the third time, which indicates the smallest number of times of permission of ejection of ink in the two code values, is selected as the code value B.

Then, in step S707, it is determined that the number of times of permission (once) indicated by the code value "01" of the pixel 803 in the mask pattern 605 as the code value A is smaller than the number of times of permission (twice) indicated by the code value "10" of the pixel 803 in the mask pattern 607 as the code value B. Therefore, the replacement processing in step S708 is not executed. Therefore, as illustrated in FIG. 13C'-3, the code value of the pixel 803 in the mask pattern 607 remains in "10".

As described above, since there is only one complementary source candidate pixel in the fourth complementary pixel group, it is determined that the non-ejection complementary processing has been performed for all the complementary source candidate pixels in the fourth complementary pixel group by the above-described processing in step S709. Then, it is determined that the non-ejection complementary processing has been executed in all the complementary pixel groups in step S710, and the non-ejection complementary processing is terminated.

As can be seen from FIGS. 13C'-1 to 13C'-3, by executing the non-ejection complementary processing in the present embodiment, the code values of three pixels including the pixel 801 in the mask pattern corresponding to the scanning of the second time and the pixels 800 and 802 in the mask pattern corresponding to the scanning of the third time are replaced.

FIGS. 13D-1 to 13D-3 are diagrams illustrating print data generated by applying the mask patterns after the non-ejection complementary processing respectively illustrated in FIGS. 13C'-1 to 13C'-3 to the image data illustrated in FIG. 13B.

By use of the mask patterns after the non-ejection complementary processing in the present embodiment is executed, when compared with the print data illustrated in FIGS. 8D-1 to 8D-3, it can be seen that the ejection ("1") of ink is determined in the pixel 801 of the print data corresponding to the scanning of the second time illustrated in FIGS. 13D-2 and the pixel 802 of the print data corresponding to the scanning of the third time illustrated in FIG. 13D-3, in the print data illustrated in FIGS. 13D-1 to 13D-3, in addition to the pixels in which the ejection ("1") of ink is determined in the print data in FIGS. 8D-1 to 8D-3.

Therefore, the logical sum (FIG. 13E) of the print data illustrated in FIGS. 13D-1 to 13D-3 is larger than the logical sum of the print data illustrated in FIG. 8E by 1 in the pixels 801 and 802.

Here, while the ejection ("1") of ink is determined in the pixels 800, 801, and 802 in the print data corresponding to the scanning of the first time illustrated in FIG. 13D-1, in reality, these pixels correspond to the ejection defective nozzle. Therefore, the ink is not ejected. Therefore, when the ink is ejected according to the print data illustrated in FIGS. 13D-1 to 13D-3, the actual numbers of times of ejection of ink for the pixels other than the pixel 800 can be the same numbers as the numbers of times of ejection of ink of a case where the ejection failure of ink illustrated in FIG. 8E does not occur, as illustrated in FIG. 13F.

As described above, while the number of times of ejection is supposed to be the number of times of ejection as illustrated in FIG. 10B when the ejection failure of ink occurs, the degradation of the image quality can be suppressed to some extent by performing the non-ejection complementary processing of the present embodiment.

FIG. 14 is a diagram for describing the code values finally allocated to the pixels corresponding to the ejection normal nozzles in the mask patterns after the non-ejection complementary processing of the present embodiment, and an effect of suppression of the degradation of the image quality by use of the mask patterns after the non-ejection complementary processing, in a case where the code values of the complementary source pixels are the respective values in the four-pass printing method and in the three-pass printing method, respectively. Note that FIG. 14 exemplarily illustrates a case in which the ejection defective nozzle is caused only in one pixel in a plurality of mask patterns (there is one complementary source candidate pixel).

Here, the first line of FIG. 14 illustrates the four-pass printing method or the three-pass printing method. The second line illustrates the code value A of the complementary source pixel of the mask pattern corresponding to the ejection defective nozzle. The third line illustrates the code values of the complementary destination candidate pixels of the mask patterns corresponding to the ejection normal nozzles. The fourth line illustrates the code value B of the complementary destination pixel selected from the complementary destination candidate pixels. The fifth line illustrates the code values finally allocated to the complementary destination pixels after comparison of the numbers of times of permission indicated by the code value A and the code value B is performed, and the non-ejection complementary processing is executed. That is, the code values of the complementary source pixels are illustrated if the replacement processing is executed, and the code values of the complementary destination pixels are illustrated if the replacement processing is not executed. The sixth line illustrates the pixel values of the image data. The seventh line illustrates the numbers of time of ejection of ink for pixels when the ink is ejected based on the print data generated using the mask patterns before the non-ejection complementary processing is performed. The eighth line illustrates the numbers of times of ejection of ink for the pixels of when the ink is ejected based on the print data generated using the mask patterns after the non-ejection complementary processing is performed.

In the four-pass printing method, when the code value of the complementary source pixel is "00", the code values allocated to the pixels corresponding to the ejection normal nozzle in the mask patterns before the non-ejection complementary processing are "01", "10", and "11". Therefore, when the mask patterns before the non-ejection complementary processing are used, an ideal number of times of ejection of ink can be expressed even if the pixel value of the image data is any of "00", "01", "10", and "11". Meanwhile, the code values allocated to the pixels corresponding to the ejection normal nozzles in the mask patterns after the non-ejection complementary processing are also "01", "10", and "11". Therefore, even if the mask patterns after the non-ejection complementary processing are used, an ideal number of times of ejection of ink can be expressed where the pixel value of the image data is any of "00", "01", "10", and "11".

In the four-pass printing method, when the code value of the complementary source pixel is "01", the code values allocated to the pixels corresponding to the ejection normal nozzles in the mask patterns before the non-ejection complementary processing are "00", "10", and "11". Therefore, when the mask patterns before the non-ejection complementary processing are used, ideal numbers of times of ejection of ink can be expressed where the pixel values of the image data are "00", "01", and "10". However, when the pixel value of the image data is "11", an ideal number of times of ejection of ink cannot be expressed. Meanwhile, the code values allocated to the pixels corresponding to the ejection normal nozzles in the mask patterns after the non-ejection complementary processing are "01", "10", and "11". Therefore, when the mask patterns after the non-ejection complementary processing are used, an ideal number of times of ejection of ink can be expressed where the pixel value of the image data is any of "00", "01", "10", and "11".

In the four-pass printing method, when the code value of the complementary source pixel is "10", the code values allocated to the pixels corresponding to the ejection normal nozzles in the mask patterns before the non-ejection complementary processing are "00", "01", and "11". Therefore, when the mask patterns before the non-ejection complementary processing are used, ideal numbers of times of ejection of ink can be expressed where the pixel values of the image data are "00" and "01". However, ideal numbers of times of ejection of ink cannot be expressed where the pixel values of the image data are "10" and "11". Meanwhile, the code values allocated to the pixels corresponding to the ejection normal nozzles in the mask patterns after the non-ejection complementary processing are "01", "10", and "11". Therefore, when the mask patterns after the non-ejection complementary processing are used, an ideal number of times of ejection of ink can be expressed where the pixel value of the image data is any of the "00", "01", "10", and "11".

In the four-pass printing method, when the code value of the complementary source pixel is "11", the code values allocated to the pixels corresponding to the ejection normal nozzles in the mask patterns before the non-ejection complementary processing are "00", "01", and "10". Therefore, when the mask patterns before the non-ejection complementary processing are used, an ideal number of times of ejection of ink can be expressed where the pixel value of the image data is "00". However, when the pixel values of the image data are "01", "10", and "11", ideal numbers of times of ejection of ink cannot be expressed. Meanwhile, the code values allocated to the pixels corresponding to the ejection normal nozzles in the mask patterns after the non-ejection complementary processing are "01", "10", and "11". Therefore, when the mask patterns after the non-ejection complementary processing are used, an ideal number of times of ejection of ink can be expressed where the pixel value of the image data is any of "00", "01", "10", and "11".

In the three-pass printing method, when the code value of the complementary source pixel is "01", the code values allocated to the pixels corresponding to the ejection normal nozzles in the mask patterns before the non-ejection complementary processing are "10" and "11". Therefore, when the mask patterns before the non-ejection complementary processing are used, ideal numbers of times of ejection can be expressed where the pixel values of the image data are "00", "01", and "10" although an ideal number of times of ejection of ink cannot be expressed where the pixel value of the image data is "11". Meanwhile, the code values allocated to the pixels corresponding to the ejection normal nozzles in the mask patterns after the non-ejection complementary processing are also "10" and "11". Therefore, even if the mask patterns after the non-ejection complementary processing are used, ideal numbers of times of ejection of ink can be expressed where the pixel values of the image data are "00", "01", and "10" although an ideal number of times of ejection of ink cannot be expressed where the pixel value of the image data is "11".

In the three-pass printing method, when the code value of the complementary source pixel is "10", the code values allocated to the pixels corresponding to the ejection normal nozzles in the mask patterns before the non-ejection complementary processing are "01" and "11". Therefore, when the mask patterns before the non-ejection complementary processing are used, ideal numbers of times of ejection of ink can be expressed where the pixel values of the image data are "00" and "01". However, ideal numbers of times of ejection of ink cannot be expressed where the pixel values of the image data are "10" and "11". Meanwhile, the code values allocated to the pixels corresponding to the ejection normal nozzles in the mask patterns after the non-ejection complementary processing are "10" and "11". Therefore, even if the mask patterns after the non-ejection complementary processing are used, ideal numbers of times of ejection of ink can be expressed where the pixel values of the image data are "00" and "01". However, an ideal number of times of ejection of ink cannot be expressed where the pixel value of the image data is "11". Note that an ideal number of times of ejection of ink can be expressed where the pixel value of the image data is "10", compared with the case before the non-ejection complementary processing.

In the three-pass printing method, when the code value of the complementary source pixel is "11", the code values allocated to the pixels corresponding to the ejection normal nozzles in the mask patterns before the non-ejection complementary processing are "01" and "10". Therefore, when the mask patterns before the non-ejection complementary processing are used, an ideal number of times of ejection of ink can be expressed where the pixel value of the image data is "00". However, ideal numbers of times of ejection of ink cannot be expressed where the pixel values of the image data are "01", "10", and "11". Meanwhile, the code values allocated to the pixels corresponding to the ejection normal nozzles in the mask patterns after the non-ejection complementary processing are "10" and "11". Therefore, even if the mask patterns after the non-ejection complementary processing are used, an ideal number of times of ejection of ink cannot be expressed where the pixel value of the image data is "11" while an ideal number of times of ejection of ink can be expressed where the pixel value of the image data is "00". Note that an ideal number of times of ejection of ink can be expressed where the pixel values of the image data are "01" and "10", compared with the case before the non-ejection complementary processing.

Comparative Example

Next, differences of a comparative example from the present embodiment in a case where non-ejection complementary processing according to the comparative example is executed when an ejection defective nozzle that can eject an ink to a certain pixel region occurs will be described below in detail. In the comparative example, the non-ejection complementary processing is performed by finding a pixel with a code value of "00" in a mask pattern corresponding to an ejection normal nozzle that can eject an ink to the pixel region corresponding to the ejection defective nozzle in the different scanning, and replacing a code value of a pixel corresponding to the pixel region in a mask pattern corresponding to the ejection defective nozzle with the code value "00" of the pixel corresponding to the pixel region in the mask pattern corresponding to the ejection normal nozzle.

Note that, as mask patterns before the non-ejection complementary processing, mask patterns similar to those before the non-ejection complementary processing described in the first embodiment are used.

FIG. 15 is a diagram for describing code values finally allocated to pixels corresponding to ejection normal nozzles in mask patterns after the non-ejection complementary processing of the comparative example, and the degree of suppression of degradation of image quality by use of mask patterns after the non-ejection complementary processing, in a case where code values of complementary source pixels are the respective values in a four-pass printing method and in a three-pass printing method, respectively.

According to the comparative example, for example, when the code value of the complementary source pixel is "11" in a three-pass printing method, the code values allocated to the pixels corresponding to the ejection normal nozzles in the mask patterns before the non-ejection complementary processing are "01" and "10". Therefore, when the mask patterns before the non-ejection complementary processing are used, an ideal number of times of ejection of ink can be expressed where the pixel value of the image data is "00". However, an ideal number of times ejection of ink cannot be expressed where the pixel values of the image data are "01", "10", and "11".

Here, even if the non-ejection complementary processing is performed, no code value of "00" is allocated to the pixels corresponding to the ejection normal nozzles. Therefore, according to the comparative example, the code value of the complementary destination pixel cannot be acquired. Accordingly, even if the non-ejection complementary processing is performed, the code values allocated to the pixels corresponding to the ejection normal nozzles in the mask patterns remain in "01" and "11". Therefore, even if the mask patterns after the non-ejection complementary processing are used, ideal number of times of ejection of ink cannot be expressed where the pixel values of the image data are "01", "10", and "11".

As describe above, it can be seen that, in the present embodiment, the non-ejection complementary processing with less degradation of image quality is executable than the comparative example.

As described above, by executing the non-ejection complementary processing according to the present embodiment, favorable complement printing can be performed when ejection failure of an ejection port is caused even if the image data and the mask pattern having multiple-bit information are used.

Second Embodiment

In the first embodiment, a form in which the favorable non-ejection complementary processing is executed when the ejection defective nozzle corresponds to only one pixel in the plurality of mask patterns (there is one complementary source candidate pixel) has been described.

In contrast, in the present embodiment, a form in which favorable non-ejection complementary processing is executed even when ejection defective nozzles correspond to a plurality of pixels in a plurality of mask patterns (there is a plurality of complementary source candidate pixels) will be described.

Note that description of similar portions to the first embodiment described above is omitted.

Degradation of image quality of when ejection failure of ink occurs in a plurality of ejection ports when using image data and mask patterns having multiple-bit information will be described in detail.

Figures 16A, 16B:
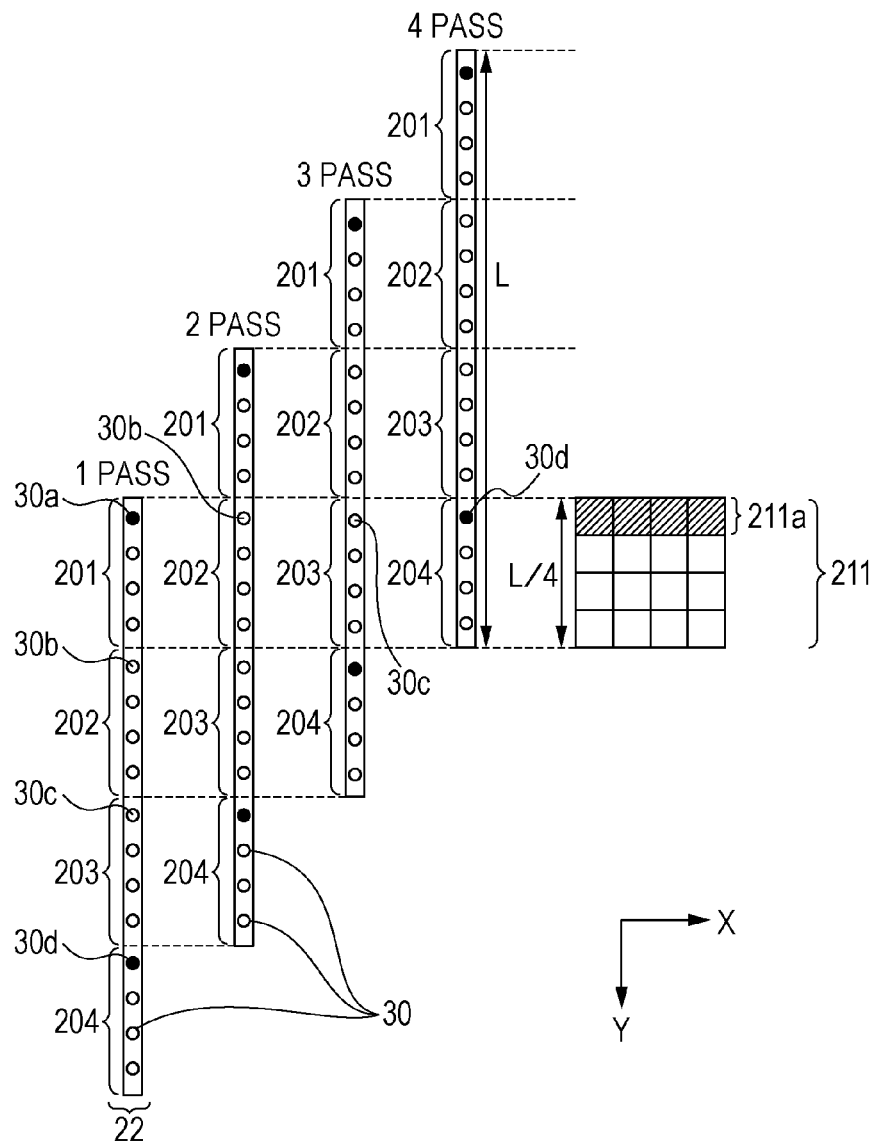
FIGS. 16A and 16B are schematic views for describing image quality degradation of when ejection failure of ink is caused.

FIGS. 16A and 16B are diagrams for describing an effect for the image quality of an image printed on a unit area 211 when the ejection failure of ink is caused in two ejection ports 30a and 30d of sixteen ejection ports 30 in the four-pass printing method illustrated in FIGS. 5 to 7. Here, a case where the ejection failure is caused in the four-pass printing method will be described. However, a similar phenomenon is caused even in the three-pass printing method.

As illustrated in FIG. 16A, normally, in a region 211a, the ink can be ejected through ejection ports 30a to 30d four times in total in scanning of the first to fourth times. However, when the ejection ports 30a and 30d become the ejection defective nozzles, and when print data is determined to eject the ink through the ejection ports 30a and 30d, the ink is not ejected to the region 211a in the scanning of the first and forth times, and the ink is ejected up to two times. Therefore, the image quality may be more degraded than a case where the ejection failure is caused in one ejection port.

FIG. 16B is a diagram for describing degradation of the image quality caused when the ejection defective nozzles illustrated in FIG. 16A occur when printing is performed according to the four-pass printing method illustrated in FIGS. 6A to 6E.

When the image data and the mask patterns illustrated in FIGS. 6A to 6E are used in the four-pass printing method, as can be seen from FIG. 6D-1, print data corresponding to the scanning of the first time, in which ejection ("1") of ink is determined in pixels 700 and 701 in the region 211a is generated. However, the region 211a corresponds to the ejection defective nozzle 30a in the scanning of the first time, and thus even if the print data determines the ejection of ink, the ink cannot be ejected in reality. Therefore, the ink cannot be ejected to pixel regions corresponding to the pixels 700 and 701 in the scanning of the first time.

Similarly, as can be seen from FIG. 6D-4, print data corresponding to the scanning of the fourth time, in which the ejection ("1") of ink is determined in the pixel 701 in the region 211a is generated. However, the region 211a corresponds to the ejection defective nozzle 30d in the scanning of the fourth time, and thus even if the print data determines the ejection of ink, the ink cannot be ejected in reality. Therefore, the ink cannot be ejected to the pixel region corresponding to the pixel 701 in the scanning of the fourth time.

Accordingly, the ink is ejected to the pixel region corresponding to the pixel 700 in the unit area 211 twice in total, while an ideal number of times of ejection of ink is three times, as illustrated in FIG. 6E. Further, the ink cannot be ejected to the pixel 701 in the unit area 211 even once, while an ideal number of times of ejection of ink illustrated in FIG. 6E is twice. In this way, when the ejection failure of ink is caused in the plurality of ejection ports, the image quality may be more significantly degraded than the case where the ejection failure is caused in one ejection port illustrated in FIG. 10A.

In view of the foregoing, in the present embodiment, processing in step S704 in the non-ejection complementary processing illustrated in FIG. 11 is differentiated from that of the first embodiment.

In step S704 in the non-ejection complementary processing illustrated in FIG. 11 in the first embodiment, when a plurality of code values has been acquired as the code values of the complementary source candidate pixels corresponding to the ejection defective nozzle in step S703, one code value is randomly selected from the plurality of code values as the code value A of the complementary source pixel.

In contrast, the present embodiment, when a plurality of code values has been acquired as code values of complementary source candidate pixels in step S703, a code value indicating a largest number of times of permission of ejection of ink is selected. Then, when the processing of step S703 is executed again through steps S705 to S709, a code value indicating the next largest number of times of permission of ejection of ink to the previously selected code value is selected. In this way, in the present embodiment, when a plurality of complementary source candidate pixels exists, replacement processing is executed in order from the pixel to which the code value having a larger number of times of permission of ejection of ink is allocated.

A process of when the non-ejection complementary processing in the present embodiment is executed in the four-pass printing method will be described in detail, using the case where the ejection defective nozzles 30a and 30d occur, as illustrated in FIG. 16A, as an example.

FIGS. 17A to 17F are diagrams schematically illustrating an execution process of the non-ejection complementary processing.

FIGS. 17A and 17B are similar to FIGS. 6A and 6B, respectively. Further, FIGS. 17C-1 to 17C-4 are also similar to FIGS. 6C-1 to 16C-4, respectively, and are diagrams illustrating mask patterns 505 to 508 corresponding to the scanning of the first to fourth times in the four-pass printing method in the present embodiment. Further, FIGS. 17C'-1 to 17C'-4 are diagrams respectively illustrating mask patterns 505" to 508" corresponding to the scanning of the first to fourth times, which are generated by executing the non-ejection complementary processing in the present embodiment for the mask patterns illustrated in FIGS. 17C-1 to 17C-4.

Here, when the ejection defective nozzles 30a and 30d illustrated in FIG. 16A are caused, pixels 700, 701, 702, and 703 in a mask pattern 505 corresponding to the scanning of the first time, and pixels 700, 701, 702, and 703 in a mask pattern 508 corresponding to the scanning of the fourth time become pixels corresponding to the ejection defective nozzles 30a and 30d. Therefore, in step S702, one complementary pixel group of a first complementary pixel group made of four pixels 700, a second complementary pixel group made of four pixels 701, a third complementary pixel group made of four pixels 702, and a fourth complementary pixel group made of four pixels 703, in four mask patterns 505 to 508, is selected. Here, as an example, a case in which the first complementary pixel group made of four pixels 700 in the mask patterns 505 to 508 is selected will be described.

In the first complementary pixel group, the pixels 700 corresponding to the ejection defective nozzles are included in the mask patterns 505 and 508 corresponding to the scanning of the first and fourth times. Therefore, two code values including the code value "11" of the pixel 700 in the mask pattern 505 corresponding to the scanning of the first time and the code value "00" of the pixel 700 in the mask pattern 508 corresponding to the scanning of the fourth time are acquired as the code values of the complementary source candidate pixels in step S703.

In step S704, the code value "11" of the pixel 700 in the mask pattern 505 corresponding to the scanning of the first time, which has a larger number of times of permission of ejection of ink, of the two code values "11" and "01" acquired in step S703, is selected as the code value A of the complementary source pixel.

Further, in the first complementary pixel group, the pixels 700 corresponding to the ejection normal nozzles are included in mask patterns 506 and 507 corresponding to the scanning of the second and third times. Therefore, in step S705, two code values including the code value "10" of the pixel 700 in the mask pattern 506 corresponding to the scanning of the second time, and the code value "01" of the pixel 700 in the mask pattern 507 corresponding to the scanning of the third time are acquired as the code values of the complementary destination candidate pixels. In step S706, the code value "01" of the pixel 700 in the mask pattern 507 corresponding to the scanning of the third time, which indicates the smallest number of times of permission of ejection of ink, of the two code values, is selected as the code value B of the complementary destination pixel.

Then, in step S707, it is determined that the number of times of permission (three times) indicated by the code value "11" of the pixel 700 in the mask pattern 505 as the code value A is larger than the number of times of permission (once) indicated by the code value "01" of the pixel 700 in the mask pattern 507 as the code value B. Therefore, as illustrated in FIG. 17C"-3, the code value "01" of the pixel 700 in the mask pattern 507 is replaced with the code value "11" in step S708.

In this stage, the non-ejection complementary processing has not yet been executed in the pixel 700 in the mask pattern 508 corresponding to the scanning of the fourth time, of the complementary source candidate pixels. Therefore, in step S709, the processing returns to step S704.

Then, in step S704, the code value "00" of the pixel 700 in the mask pattern 508 corresponding to the scanning of the fourth time, which is the complementary source candidate pixel for which the non-ejection complementary processing has not yet been performed, of the code values "11" and "00" of the pixels 700 in the mask patterns 505 and 508 corresponding to the scanning of the first and fourth times and acquired in step S703, is selected as the code value A of the complementary source pixel.

Further, in step S706, the code value "10" of the pixel 700 in the mask pattern 506 corresponding to the scanning of the second time, which is the complementary destination candidate pixel for which the replacement in step S708 has not yet been executed, of the code values "10" and "01" of the pixels 700 in the mask patterns 506 and 507 corresponding to the scanning of the second and third times and acquired in step S705, is selected as the code value B of the complementary destination pixel.

Then, in step S707, it is determined that the number of times of permission (zero times) indicated by the code value "00" of the pixel 700 in the mask pattern 508 as the code value A is smaller than the number of times of permission (twice) indicated by the code value "10" of the pixel 700 in the mask pattern 506 as the code value B. Therefore, replacement processing in step S708 is not executed. Therefore, as illustrated in FIG. 17C"-2, the code value of the pixel 700 in the mask pattern 506 remains in "10".

Following that, in step S709, it is determined that the non-ejection complementary processing has been performed for all the complementary source candidate pixels in the first complementary pixel group by the above-described processing. Then, since the non-ejection complementary processing has not yet been executed in the remaining second, third, and fourth complementary pixel groups, in step S701, the processing returns to step S704.

Next, a case in which the second complementary pixel group made of four pixels 701 in the mask patterns 505 to 508 is selected from the remaining second, third, and fourth complementary pixel groups in step S704 will be described.

In the second complementary pixel group, the pixels 701 corresponding to the ejection defective nozzles are included in the mask patterns 505 and 508 corresponding to the scanning of the first and fourth times. Therefore, in step S703, two code values including the code value "10" of the pixel 701 in the mask pattern 505 corresponding to the scanning of the first time, and the code value "11" of the pixel 701 in the mask pattern 508 corresponding to the scanning of the fourth time are acquired as the code values of the complementary source candidate pixels.

In step S704, the code value "11" of the pixel 701 in the mask pattern 508 corresponding to the scanning of the fourth time, which has a larger number of times of permission of ejection of ink, of the two code values "10" and "11" acquired in step S703, is selected as the code value A of the complementary source pixel.

Further, in the second complementary pixel group, the pixels 701 corresponding to the ejection normal nozzles are included in the mask patterns 506 and 507 corresponding to the scanning of the second and third times. Therefore, in step S705, two code values including the code value "01" of the pixel 701 in the mask pattern 506 corresponding to the scanning of the second time, and the code value "00" of the pixel 701 in the mask pattern 507 corresponding to the scanning of the third time are acquired as the code values of the complementary destination candidate pixels. In step S706, the code value "00" of the pixel 701 in the mask pattern 507 corresponding to the scanning of the third time, which indicates the smallest number of times of permission of ejection of ink, of the two code values, is selected as the code value B of the complementary destination pixel.

Then, in step S707, it is determined that the number of times of permission (three times) indicated by the code value "11" of the pixel 701 in the mask pattern 508 as the code value A is larger than the number of times of permission (zero times) indicated by the code value "00" of the pixel 701 in the mask pattern 507 as the code value B. Therefore, as illustrated in FIG. 17C"-3, in step S708, the code value "00" of the pixel 701 in the mask pattern 507 is replaced with the code value "11".

In this stage, the non-ejection complementary processing has not yet been executed in the pixel 701 in the mask pattern 505 corresponding to the scanning of the first time, of the complementary source candidate pixels. Therefore, in step S709, the processing returns to step S704.

Then, in step S704, the code value "10" of the pixel 701 in the mask pattern 505 corresponding to the scanning of the first time, which is the complementary source candidate pixel for which the non-ejection complementary processing has not yet been performed, of the code values "10" and "11" of the pixels 701 in the mask patterns 505 and 508 corresponding to the scanning of the first and fourth times and acquired in step S703, is selected as the code value A of the complementary source pixel.

Further, in step S706, the code value "01" of the pixel 701 in the mask pattern 506 corresponding to the scanning of the second time, which is the complementary destination candidate pixel for which replacement in step S708 has not yet been executed, of the code values "01" and "00" of the pixels 701 in the mask patterns 506 and 507 corresponding to the scanning of the second and third times and acquired in step S705, is selected as the code value B of the complementary destination pixel.

Then, in step S707, it is determined that the number of times of permission (twice) indicated by the code value "10" of the pixel 701 in the mask pattern 505 as the code value A is larger than the number of times of permission (once) indicated by the code value "01" of the pixel 701 in the mask pattern 506 as the code value B. Therefore, as illustrated in FIG. 17C"-2, in step S708, the code value "01" of the pixel 701 in the mask pattern 506 is replaced with the code vale "10".

Following that, in step S709, it is determined that the non-ejection complementary processing has been performed for all the complementary source candidate pixels in the second complementary pixel group by the above-described processing. Then, since the non-ejection complementary processing has not yet been executed in the remaining third and fourth complementary pixel groups, in step S710, the processing returns to step S704.

Next, a case in which the third complementary pixel group made of four pixels 702 in the mask patterns 505 to 508 is selected from the remaining third and fourth complementary pixel groups in step 704 will be described.

In the third complementary pixel group, the pixels 702 corresponding to the ejection defective nozzles are included in the mask patterns 505 and 508 corresponding to the scanning of the first and fourth times. Therefore, in step S703, two code values including the code value "01" of the pixel 702 in the mask pattern 505 corresponding to the scanning of the first time, and the code value "10" of the pixel 702 in the mask pattern 508 corresponding to the scanning of the fourth time are acquired as the code values of the complementary source candidate pixels.

In step S704, the code value "10" of the pixel 702 in the mask pattern 508 corresponding to the scanning of the fourth time, which has a larger number of times of permission of ejection of ink, of the two code values "01" and "10" acquired in step S703, is selected as the code value A of the complementary source pixel.

Further, in the third complementary pixel group, the pixels 702 corresponding to the ejection normal nozzles are included in the mask patterns 506 and 507 corresponding to the scanning of the second and third times. Therefore, in step S705, two code values including the code value "00" of the pixel 702 in the mask pattern 506 corresponding to the scanning of the second time, and the code value "11" of the pixel 702 in the mask pattern 507 corresponding to the scanning of the third time are acquired as the code values of the complementary destination candidate pixels. In step S706, the code value "00" of the pixel 702 in the mask pattern 506 corresponding to the scanning of the second time, which indicates the smallest number of times of permission of ejection of ink, of the two code values, is selected as the code value B of the complementary destination pixel.

Then, in step S707, it is determined that the number of times of permission (twice) indicated by the code value "10" of the pixel 702 in the mask pattern 508 as the code value A is larger than the number of times of permission (zero times) indicated by the code value "00" of the pixel 702 in the mask pattern 506 as the code value B. Therefore, as illustrated in FIG. 17C"-2, in step S708, the code value "00" of the pixel 702 in the mask pattern 506 is replaced with the code value "10".

In this stage, the non-ejection complementary processing has not yet been executed in the pixel 702 in the mask pattern 505 corresponding to the scanning of the first time, of the complementary source candidate pixels. Therefore, in step S709, the processing returns to step S704.

Then, in step S704, the code value "01" of the pixel 702 in the mask pattern 505 corresponding to the scanning of the first time, which is the complementary source candidate pixel for which the non-ejection complementary processing has not yet been performed, of the code values "01" and "10" of the pixels 702 in the mask patterns 505 and 508 corresponding to the scanning of the first and fourth times and acquired in step S703, is selected as the code value A of the complementary source pixel.

Further, in step S706, the code value "11" of the pixel 702 in the mask pattern 507 corresponding to the scanning of the third time, which is the complementary destination candidate pixel for which replacement in step S708 has not yet been executed, of the code values "00" and "11" of the pixels 702 in the mask patterns 506 and 507 corresponding to the scanning of the second and third times and acquired in step S705, is selected as the code value B of the complementary destination pixel.

Then, in step S707, it is determined that the number of times of permission (once) indicated by the code value "01" of the pixel 702 in the mask pattern 505 as the code value A is smaller than the number of times of permission (three times) indicated by the code value "11" of the pixel 702 in the mask pattern 507 as the code value B. Therefore, the replacement processing in step S708 is not executed. Therefore, as illustrated in FIG. 17C"-2, the code value of the pixel 702 in the mask pattern 507 remains in "11".

Following that, in step S709, it is determined that the non-ejection complementary processing has been performed for all the complementary source candidate pixels in the third complementary pixel group by the above-described processing. Then, since the non-ejection complementary processing has not yet been performed in the remaining fourth complementary pixel group, in step S710, the processing returns to step S704.

Next, a case in which the fourth complementary pixel group made of four pixels 703 in the mask patterns 505 and 508 is selected in step 704.

In the fourth complementary pixel group, the pixels 703 corresponding to the ejection defective nozzles are included in the mask patterns 505 and 508 corresponding to the scanning of the first and fourth times. Therefore, in step S703, two code values including the code value "00" of the pixel 703 in the mask pattern 505 corresponding to the scanning of the first time, and the code value "01" of the pixel 703 in the mask pattern 508 corresponding to the scanning of the fourth time are acquired as the code values of the complementary source candidate pixels.

In step S704, the code value "01" of the pixel 703 in the mask pattern 508 corresponding to the scanning of the fourth time, which has a larger number of times of permission of ejection of ink, of the two code values "00" and "01" and acquired in step S703, is selected as the code value A of the complementary source pixel.

Further, in the third complementary pixel group, the pixels 703 corresponding to the ejection normal nozzles are included in the mask patterns 506 and 507 corresponding to the scanning of the second and third times. Therefore, in step S705, two code values including the code value "11" of the pixel 703 in the mask pattern 506 corresponding to the scanning of the second time, and the code value "10" of the pixel 703 in the mask pattern 507 corresponding to the scanning of the third time are acquired as the code values of the complementary destination candidate pixel. In step S706, the code value "01" of the pixel 703 in the mask pattern 507 corresponding to the scanning of the third time, which indicates the smallest number of times of permission of ejection of ink, of the two code values, is selected as the code value B of the complementary destination pixel.

Then, in step S707, it is determined that the number of times of permission (once) indicated by the code value "01" of the pixel 703 in the mask pattern 508 as the code value A is smaller than the number of times of permission (twice) indicated by the code value "10" of the pixel 703 in the mask pattern 507 as the code value B. Therefore, the replacement processing in step S708 is not executed. Therefore, as illustrated in FIG. 17C"-3, the code value of the pixel 703 in the mask pattern 507 is remains in "10".

In this stage, the non-ejection complementary processing has not yet been executed in the pixel 703 in the mask pattern 505 corresponding to the scanning of the first time, of the complementary source candidate pixels. Therefore, in step S709, the processing returns to step S704.

Then, in step S704, the code value "00" of the pixel 703 in the mask pattern 505 corresponding to the scanning of the first time, which is the complementary source candidate pixel for which the non-ejection complementary processing has not yet been performed, of the code values "00" and "01" of the pixels 703 in the mask patterns 505 and 508 corresponding to the scanning of the first and fourth times and acquired in step S703, is selected as the code value A of the complementary source pixel.

Further, in step S706, the code value "11" of the pixel 703 in the mask pattern 506 corresponding to the scanning of the second time, which is the complementary destination candidate pixel for which replacement in step S708 has not yet been executed, of the code values "11" and "10" of the pixels 703 in the mask patterns 506 and 507 corresponding to the scanning of the second and third times and acquired in step S705, is selected as the code value B of the complementary destination pixel.

Then, in step S707, it is determined that the number of times of permission (zero times) indicated by the code value "00" of the pixel 703 in the mask pattern 505 as the code value A is smaller than the number of times of permission (three times) indicated by the code value "11" of the pixel 703 in the mask pattern 506 as the code value B. Therefore, the replacement processing in step S708 is not executed. Therefore, as illustrated in FIG. 17C"-2, the code value of the pixel 703 in the mask pattern 506 remains in "11".

As described above, since there is only one complementary source candidate pixel in the fourth complementary pixel group, it is determined that the non-ejection complementary processing has been performed for all the complementary source candidate pixels in the fourth complementary pixel group by the above-described processing in step S709. Then, in step S710, it is determined that the non-ejection complementary processing has been executed in all the complementary pixel groups, and the non-ejection complementary processing is terminated.

As can be seen from FIGS. 17C'-1 to 17C'-4, by executing the non-ejection complementary processing in the present embodiment, the code values of the four pixels including the pixels 701 and 702 in the mask pattern corresponding to the scanning of the second time, and the pixels 700 and 701 in the mask pattern corresponding to the scanning of the third time are replaced.

FIGS. 17D-1 to 17D-4 are diagrams illustrating print data generated by applying the mask patterns after the non-ejection complementary processing respectively illustrated in FIGS. 17C"-1 to 17C"-4 to the image data illustrated in FIG. 17B.

By use of the mask patterns after the non-ejection complementary processing in the present embodiment is executed, when compared with the print data illustrated in FIGS. 6D-1 to 6D-4, it can be seen that, in the print data illustrated in FIGS. 17D-1 to 17D-4, ejection ("1") of ink is determined in the pixel 701 of the print data corresponding to the scanning of the second time illustrated in FIG. 17D-2 and the pixel 701 of the print data corresponding to the scanning of the third time illustrated in FIG. 17D-3, in addition to the pixels in which the ejection ("1") of ink is determined in the print data illustrated in FIGS. 6D-1 to 6D-4.

Therefore, as illustrated in FIG. 17E, a logical sum of the print data illustrated in FIGS. 17D-1 to 17D-4 is larger than the logical sum of the print data illustrated in FIG. 6E by 2 in the pixel 701.

Here, while the ejection ("1") of ink is determined in the pixels 700 and 701 in the print data corresponding to the scanning of the first time illustrated in FIG. 17D-1, and in the pixel 701 in the print data corresponding to the scanning of the fourth time illustrated in FIG. 17D-4, in reality, these pixels correspond to the ejection defective nozzles. Therefore, the ink is not ejected.

Therefore, when the ink is ejected according to the print data illustrated in FIGS. 17D-1 to 17D-4, the actual numbers of times of ejection of ink for the pixels other than the pixel 700 can be the same numbers as the numbers of times of ejection of ink of a case where the ejection failure of ink illustrated in FIG. 6E does not occur, as illustrated in FIG. 17F.

As described above, by performing the non-ejection complementary processing according to the present embodiment, the degradation of the image quality as illustrated in FIG. 16B in a case where the ejection failure of ink occurs in a plurality of ejection ports can be suppressed to some extent.

FIG. 18 is a diagram for describing the code values finally allocated to the pixels corresponding to the ejection normal nozzles in the mask patterns after the non-ejection complementary processing of the present embodiment, and an effect of suppression of the degradation of the image quality by use of the mask patterns after the non-ejection complementary processing, in combinations of code values of a plurality of complementary source pixels in the four-pass printing method. Note that FIG. 18 exemplarily illustrates a case in which the ejection defective nozzles are caused in two pixels in a plurality of mask patterns (there are two complementary source candidate pixels).

Here, the first line of FIG. 18 illustrates the method is the four-pass printing method. The second line illustrates the code values A of the two complementary source pixels of the mask patterns corresponding to the two ejection defective nozzles. The third line illustrates the code values of the two complementary destination candidate pixels of the mask patterns corresponding to the two ejection normal nozzles. The fourth line illustrates the code value A of the complementary source pixel selected from the complementary destination candidate pixels in the processing in step S704 of the first time. The fifth line illustrates the code value B of the complementary destination pixel selected from the complementary destination candidate pixels in the processing in step S706 of the first time. The sixth line illustrates the code value A of the complementary source pixel selected from the complementary source candidate pixels in the processing in step S704 of the second time. The seventh line illustrates the code value B of the complementary destination pixel selected from the complementary destination candidate pixels in the processing in step S706 of the second time. The eighth line illustrates the code values allocated to the mask patterns corresponding to the ejection normal nozzles after execution of the non-ejection complementary processing. The ninth line illustrates the pixel values of the image data. The tenth line illustrates the numbers of times of ejection of ink for the pixels of when the ink is ejected based on the print data generated using the mask patterns before the non-ejection complementary processing is performed. The eleventh line illustrates the numbers of times of ejection of ink for the pixels of when the ink is ejected based on the print data generated using the mask patterns after the non-ejection complementary processing is performed.

When the code values of the complementary source candidate pixels are "00" and "01", the code values allocated to the pixels corresponding to the ejection normal nozzles in the mask patterns before the non-ejection complementary processing are "10" and "11". Therefore, when the mask patterns before the non-ejection complementary processing are used, ideal numbers of times of ejection of ink can be expressed when the pixel values of the image data are "00", "01", and "10", although an ideal number of times of ejection cannot be expressed when the pixel value of the image data is "11". Meanwhile, the code values allocated to the pixels corresponding to the ejection normal nozzles in the mask patterns after the non-ejection complementary processing are also "10" and "11". Therefore, when the mask patterns after the non-ejection complementary processing are used, similarly to the case of using the mask patterns before the non-ejection complementary processing, ideal numbers of times of ejection can be expressed when the pixel values of the image data are "00", "01", and "10", although an ideal number of times of ejection of ink cannot be expressed when the pixel value of the image data is "11".

When the code values of the complementary source candidate pixels are "00" and "10", the code values allocated to the pixels corresponding to the ejection normal nozzles in the mask patterns before the non-ejection complementary processing are "01" and "11". Therefore, when the mask patterns before the non-ejection complementary processing are used, ideal numbers of times of ejection of ink can be expressed when the pixel values of the image data are "00" and "01". However, ideal numbers of times of ejection of ink cannot be expressed when the pixel values of the image data are "10" and "11". Meanwhile, the code values allocated to the pixels corresponding to the ejection normal nozzles in the mask patterns after the non-ejection complementary processing are "10" and "11". Therefore, even when the mask patterns after the non-ejection complementary processing are used, an ideal number of times of ejection of ink cannot be expressed when the pixel value of the image data is "11", although ideal numbers of times of ejection of ink can be expressed when the pixel values of image data are "00" and "01". Note that, when the pixel value of the image data is "10", compared with the case before the non-ejection complementary processing, an ideal number of times of ejection of ink can be expressed.

When the code values of the complementary source candidate pixels are "00" and "11", the code values allocated to the pixels corresponding to the ejection normal nozzles in the mask patterns before the non-ejection complementary processing are "01" and "10". Therefore, when the mask patterns before the non-ejection complementary processing are used, an ideal number of times of ejection can be expressed when the pixel value of the image data is "00". However, ideal numbers of times of ejection cannot be expressed when the pixel values of the image data are "01", "10", and "11". Meanwhile, the code values allocated to the pixels corresponding to the ejection normal nozzles in the mask patterns after the non-ejection processing are "10" and "11". Therefore, even if the mask patterns after the non-ejection complementary processing are used, an ideal number of times of ejection of ink cannot be expressed when the pixel value of the image data is "11", although an ideal number of times of ejection can be expressed when the pixel value of the image data is "00". Note that ideal numbers of times of ejection of ink can be expressed when the pixel values of the image data are "01" and "10", compared with the case before the non-ejection complementary processing.

When the code values of the complementary source candidate pixels are "01" and "10", the code values allocated to the pixels corresponding to the ejection normal nozzles in the mask patterns before the non-ejection complementary processing are "00" and "11". Therefore, when the mask patterns before the non-ejection complementary processing are used, ideal numbers of times of ejection can be expressed when the pixel values of the image data are "00" and "01". However, an ideal number of times of ejection cannot be expressed when the pixel value of the image data is "10". Further, when the pixel value of the image data is "11", the number of times of ejection is largely shifted from an ideal number of times of ejection of ink. Meanwhile, the code values allocated to the pixels corresponding to the ejection normal nozzles in the mask patterns after the non-ejection complementary processing are "10" and "11". Therefore, even if the mask patterns after the non-ejection complementary processing are used, ideal numbers of times of ejection of ink can be expressed when the pixel values of the image data are "00" and "01". Further, an ideal number of times of ejection can be expressed even when the pixel value of the image data is "10". Further, the gap between the number of times of ejection of ink expressed when the pixel value of the image data is "11" and an ideal number of times of ejection of ink can be made smaller than that before the non-ejection complementary processing.

When the code values of the complementary source candidate pixels are "01" and "11", the code values allocated to the pixels corresponding to the ejection normal nozzles in the mask patterns before the non-ejection complementary processing are "00" and "10". Therefore, when the mask patterns before the non-ejection complementary processing are used, an ideal number of times of ejection of ink can be expressed when the pixel value of the image data is "00". However, ideal numbers of times of ejection of ink cannot be expressed when the pixel values of the image data are "01" and "10". Further, the number of times of ejection is largely shifted from an ideal number of times of ejection of ink when the pixel value of the image data is "11". Meanwhile, the code values allocated to the pixels corresponding to the ejection normal nozzles in the mask patterns after the non-ejection complementary processing are "10" and "11". Therefore, even when the mask patterns after the non-ejection complementary processing are used, an ideal number of times of ejection of ink can be expressed when the pixel value of the image data is "00". Further, ideal numbers of times of ejection can be expressed even when the pixel values of the image data are "01" and "10". Further, the gap between the number of times of ejection of ink expressed when the pixel value of the image data is "11" and an ideal number of times of ejection of ink can be made smaller than that before the non-ejection complementary processing.

When the code values of the complementary source candidate pixels are "10" and "11", the code values allocated to the pixels corresponding to the ejection normal nozzles in the mask patterns before the non-ejection complementary processing are "00" and "01". Therefore, when the mask patterns before the non-ejection complementary processing are used, an ideal number of times of ejection of ink can be expressed when the pixel value of the image data is "00". However, an ideal number of times of ejection cannot be expressed when the pixel value of the image data is "01". Further, the number of times of ejection is largely shifted from ideal numbers of times of ejection of ink when the pixel values of the image data are "10" and "11". Meanwhile, the code values allocated to the pixels corresponding to the ejection normal nozzles in the mask patterns after the non-ejection complementary processing are "10" and "11". Therefore, even when the mask patterns after the non-ejection complementary processing are used, an ideal number of times of ejection of ink can be expressed when the pixel value of the image data is "00". Further, an ideal number of times of ejection of ink can be expressed even when the pixel values of the image data are "01" and "10". Further, the gap between the number of times of ejection of ink expressed when the pixel value of the image data is "11" and an ideal number of times of ejection of ink can be made smaller than that before the non-ejection complementary processing.

Comparative Example

Next, differences of a comparative example from the second embodiment will be described in detail, where a form of selecting the complementary source pixel in order from the pixel to which the code value with a smaller number of times of permission of ejection of ink is allocated in step S704, when a plurality of complementary source candidate pixels exists, is used as the comparative example.

FIG. 19 is a diagram for describing the code values finally allocated to the pixels corresponding to the ejection normal nozzles in the mask patterns after the non-ejection complementary processing of the comparative example, and the degree of suppression of the degradation of the image quality by use of the mask patterns after the non-ejection complementary processing, in combinations of code values of a plurality of complementary source pixels in the four-pass printing method.

According to the comparative example, for example, when the code values of the complementary source candidate pixels are "00" and "10", in the processing in step S704 of the first time, the code value "00" with a small number of times of permission of ejection of ink is selected as the code value A of the complementary source pixel. Then, in the processing in step S706 of the first time, the code value "01" with a smaller number of times of permission of ejection of ink, of the code values "01" and "11" of the complementary destination candidate pixels, is selected as the code value B of the complementary destination pixel. Therefore, in the non-ejection complementary processing of the first time, the code value B of the complementary destination pixel is not replaced in step S708.

Next, the code value "10" of the remaining complementary source candidate pixel is selected as the code value A of the complementary source pixel in the processing in step S704 of the second time. Then, the code value "11" of the remaining complementary destination candidate pixel is selected as the code value B of the complementary destination pixel in the processing in step S706 of the second time. Therefore, the code value B of the complementary destination pixel is not replaced in the step S708 of the non-ejection complementary processing of the second time.

Therefore, according to the non-ejection complementary processing of the comparative example, when the code values of the complementary source candidate pixels are "00" and "10", the code values allocated to the pixels corresponding to the ejection normal nozzles are "01" and "11".

Similarly, in any case of when the code values of the complementary source candidate pixels are "00" and "11", when the code values are "01" and "10", and when the code values are "01" and "11", the code values allocated to the pixels corresponding to the ejection normal nozzles are "01" and "11" according to the non-ejection complementary processing of the comparative example.

As can be seen from FIG. 19, when the code values allocated to the pixels corresponding to the ejection normal nozzles are "01" and "11", an ideal number of times of ejection of ink cannot be expressed when the pixel value of the image data is "10".

Meanwhile, as illustrated in FIG. 18, according to the second embodiment, even when the code values of the complementary source candidate pixels are "00", "10", and the like, the non-ejection complementary processing can be performed such that the code values allocated to the pixels corresponding to the ejection normal nozzles can be "10" and "11". Therefore, an ideal number of times of ejection of ink can be expressed even when the pixel value of the image data is "10".

As described above, in the second embodiment, it can be seen that the non-ejection complementary processing with less degradation of the image quality than the comparative example is executable.

As described above, by executing the non-ejection complementary processing according to the second embodiment, favorable complement printing can be performed even in a case where the ejection failure is caused in a plurality of ejection ports when the image data and the mask patterns having multiple-bit information are used.

Third Embodiment

In the second embodiment, a form of performing the favorable non-ejection complementary processing even when the ejection defective nozzles correspond to a plurality of pixels, by selecting the complementary source pixel in order from the pixel to which the code value with a larger number of times of permission of ejection of ink is allocated in step S704, in a case where a plurality of complementary source candidate pixels exists, has been described.

In contrast, in the present embodiment, a form of performing favorable non-ejection complementary processing even when ejection defective nozzles correspond to a plurality of pixels by another method will be described.

Note that description of similar portions to the above-described first and second embodiments is omitted.

In the present embodiment, when a plurality of code values has been acquired as code values of complementary source candidate pixels corresponding to ejection defective nozzles in step S703, one code value is randomly selected from the plurality of code values, as a code value A of a complementary source pixel, in step S704. Meanwhile, in the present embodiment, even if replacement has been executed for a complementary destination pixel once in step S708 in one complementary pixel group, the complementary destination pixel is not excluded from complementary destination candidate pixels in step S705 in subsequent processing and is used as a complementary candidate pixel again after the replacement.

FIG. 20 is a diagram for describing code values finally allocated to pixels corresponding to ejection normal nozzles in mask patterns after the non-ejection complementary processing of the present embodiment, and an effect of suppression of degradation of image quality by use of the mask patterns after the non-ejection complementary processing, in combinations of code values of a plurality of complementary source pixels in a four-pass printing method. Note that FIG. 20 exemplarily illustrates a case in which the ejection defective nozzles are caused in two pixels in a plurality of mask patterns (there are two complementary source candidate pixels).

Here, the first line of FIG. 20 illustrates the method is the four-pass printing method. The second line illustrates code values of two complementary source candidate pixels of mask patterns corresponding to two ejection defective nozzles. The third line illustrates code values of two complementary destination candidate pixels of mask patterns corresponding to two ejection normal nozzles. The fourth line illustrates the code value A of a complementary source pixel selected from the complementary source candidate pixels in processing in step S704 of the first time. As described above, in the present embodiment, since one code value is randomly selected from the code values of two complementary destination candidate pixels in step 704 as the code value A of the complementary destination pixel, FIG. 20 illustrates which code value is selected. Here, the fifth line illustrates a code value B of the complementary destination pixel selected from the complementary destination candidate pixels in processing in step S706 of the first time. The sixth line illustrates the code values of the two complementary destination candidate pixels updated in processing in step S706 of the first time and acquired in step S705 of the second time. The seventh line illustrates the code value A of the complementary source pixel selected from the complementary source candidate pixels in the processing in step S704 of the second time. The eighth line illustrates the code value B of the complementary destination pixel selected from the complementary destination candidate pixels illustrated in the sixth line in the processing in step S706 of the second time. The ninth line illustrates the code values allocated to the mask patterns corresponding to the ejection normal nozzles after execution of non-ejection complementary processing. The tenth line illustrates the pixel value of the image data. The eleventh line illustrates the numbers of times of ejection of ink for pixels of when the ink is ejected based on the print data generated using the mask patterns before the non-ejection complementary processing is performed. The twelfth line illustrates the numbers of times of ejection of ink for the pixels of when the ink is ejected based on the print data generated using the mask patterns after the non-ejection complementary processing is performed.

When the code values of the complementary source candidate pixels are "00" and "01", the code values allocated to the pixels corresponding to the ejection normal nozzles in the mask patterns before the non-ejection complementary processing are "10" and "11". Here, a case where the code value "00" is selected and a case where the code value "01" is selected as the code value A of the complementary source pixel in step S704 of the first time in the present embodiment will be respectively described.

(i) A case where the code value "00" is selected as the code value A of the complementary source pixel in step S704 of the first time In step S706, the code value "10" having a small number of times of permission of ejection of ink of the two code values "10" and "11" is selected as the code value B of the complementary destination pixel.

The number of times of permission indicated by the code value "00" as the code value A is smaller than the number of times of permission indicated by the code value "10" as the code value B. Therefore, replacement in step S708 is not performed.

Next, the remaining code value "01" is selected as the code value A of the complementary source pixel in step S705 of the second time. Here, in the present embodiment, a pixel once selected as the complementary destination pixel serves as the complementary destination candidate pixel in the subsequent processing regardless of whether the replacement has been performed. Therefore, in step S705 of the second time, the code value "11" that has not been selected in step S706 of the first time, and the code value "10" that has been selected in step S706 of the first time but for which the replacement has not been performed in step S708 are acquired as the code values of the complementary destination candidate pixels. Then, in step S706 of the second time, the code value "10" having a smaller number of times of permission of ejection of ink, of the code values "11" and "10", is selected as the code value B of the complementary source pixel.

Since the number of times of permission indicated by the code value "01" as the code value A is smaller than the number of times of permission indicated by the code value "10" as the code value B. Therefore, the replacement in step S708 is not performed. Therefore, the code values allocated to the pixels corresponding to the ejection normal nozzles in the mask patterns after the non-ejection complementary processing are "10" and "11".

(ii) A case where the code value "01" is selected as the code value A of the complementary source pixel in step S704 of the first time In step S706, the code value "10" having a smaller number of times of permission of ejection of ink of the code values "10" and "11" is selected as the code value B of the complementary destination pixel.

The number of times of permission indicated by the code value "01" as the code value A is smaller than the number of times of permission indicated by the code value "10" as the code value B. Therefore, the replacement in step S708 is not performed.

Next, in step S705 of the second time, the remaining code value "00" is selected as the code value A of the complementary source pixel. Here, in the present embodiment, a pixel once selected as the complementary destination pixel serves as the complementary destination candidate pixel in the subsequent processing regardless of whether the replacement has been performed. Therefore, in step S705 of the second time, the code value "11" that has not been selected in step S706 of the first time, and the code value "10" that has been selected in step S706 of the first time, but for which the replacement has not been performed in step S708 are acquired as the code values of the complementary destination candidate pixels. Then, the code value "10" having a smaller number of times of permission of ejection of ink, of the code values "11" and "10", is selected as the code value B of the complementary source pixel in step S706 of the second time.

The number of times of permission indicated by the code value "00" as the code value A is smaller than the number of times of permission indicated by the code value "10" as the code value B. Therefore, the replacement in step S708 is not performed. Therefore, the code values allocated to the pixels corresponding to the ejection normal nozzles in the mask patterns after the non-ejection complementary processing are also "10" and "11".

Further, when the code values of the complementary source candidate pixel are "00" and "10", the code values allocated to the pixels corresponding to the ejection normal nozzles in the mask patterns before the non-ejection complementary processing are "01" and "11". Here, a case where the code value "00" is selected and a case where the code value "10" is selected as the code value A of the complementary source pixel in step S704 of the first time in the present embodiment will be respectively described.

(i) A case where the code value "00" is selected as the code value A of the complementary source pixel in step S704 of the first time In step S706, the code value "01" having a smaller number of times of permission of ejection of ink, of the code values "01" and "11", is selected as the code value B of the complementary destination pixel.

The number of times of permission indicated by the code value "00" as the code value A is smaller than the number of times of permission indicated by the code value "01" as the code value B. Therefore, the replacement in step S708 is not performed.

Next, the remaining code value "10" is selected as the code value A of the complementary source pixel in step S705 of the second time. Here, in the present embodiment, a pixel once selected as the complementary destination pixel serves as the complementary destination candidate pixel in the subsequent processing regardless of whether the replacement has been performed. Therefore, in step S705 of the second time, the code value "11" that has not been selected in step S706 of the first time, and the code value "01" that has been selected in step S706 of the first time, but for which the replacement has not been performed in step S708 are acquired as the code values of the complementary destination candidate pixels. Then, the code value "01" having a smaller number of times of permission of ejection of ink, of the code values "11" and "01", is selected as the code value B of the complementary source pixel in step S706.

The number of times of permission indicated by the code value "10" as the code value A is larger than the number of times of permission indicated by the code value "01" as the code value B. Therefore, the code value "01" is replaced with the code value "10" in step S708. Therefore, the code values allocated to the pixels corresponding to the ejection normal nozzles in the mask patterns after the non-ejection complementary processing are "10" and "11".

(ii) A case where the code value "10" is selected as the code value A of the complementary source pixel in step S704 of the first time In step S706, the code value "01" having a smaller number of times of permission of ejection of ink, of the code values "01" and "11", is selected as the code value B of the complementary destination pixel. The number of times of permission indicated by the code value "10" as the code value A is larger than the number of times of permission indicated by the code value "01" as the code value B. Therefore, the code value "01" is replaced with the code value "10" in step S708.

Next, the remaining code value "00" is selected as the code value A of the complementary source pixel in step S705 of the second time. Here, in the present embodiment, a pixel once selected as the complementary destination pixel serves as the complementary destination candidate pixel in the subsequent processing regardless of whether the replacement has been performed. Therefore, in step S705 of the second time, the code value "11" that has not been selected in step S706 of the first time, and the code value "10" for which the replacement has been performed in step S708 are acquired as the code values of the complementary destination candidate pixels. Then, the code value "10" having a smaller number of times of permission of ejection of ink, of the code values "11" and "10", is selected as the code value B of the complementary source pixel in step S706.

The number of times of permission indicated by the code value "00" as the code value A is smaller than the number of times of permission indicated by the code value "10" as the code value B. Therefore, the replacement in step S708 is not performed. Therefore, the code values allocated to the pixels corresponding to the ejection normal nozzles in the mask patterns after the non-ejection complementary processing are also "10" and "11".

Further, when the code values of the complementary source candidate pixels are "00" and "11", the code values allocated to the pixels corresponding to the ejection normal nozzles in the mask patterns before the non-ejection complementary processing are "01" and "10". Here, a case where the code value "00" is selected and a case where the code value "11" is selected as the code value A of the complementary source pixel in step S704 of the first time in the present embodiment will be respectively described.

(i) A case where the code value "00" is selected as the code value A of the complementary source pixel in step S704 of the first time In step S706, the code value "01" having a smaller number of times of permission of ejection of ink, of the code values "01" and "10", is selected as the code value B of the complementary destination pixel.

The number of times of permission indicated by the code value "00" as the code value A is smaller than the number of times of permission indicated by the code value "01" as the code value B. Therefore, the replacement in step S708 is not performed.

Next, the remaining code value "11" is selected as the code value A of the complementary source pixel in step S705 of the second time. Here, in the present embodiment, a pixel once selected as the complementary destination pixel serves as the complementary destination candidate pixel in the subsequent processing regardless of whether the replacement has been performed. Therefore, in step S705 of the second time, the code value "10" that has not been selected in step S706 of the first time, and the code value "01" that has been selected in step S706 of the first time, but for which the replacement has not been performed in step S708 are acquired as the code values of the complementary destination candidate pixels. Then, in step S706, the code value "01" having a smaller number of times of permission of ejection of ink, of the code values "10" and "01", is selected as the code value B of the complementary source pixel.

The number of times of permission indicated by the code value "11" as the code value A is larger than the number of times of permission indicated by the code value "01" as the code value B. Therefore, the code value "01" is replaced with the code value "11" in step S708. Therefore, the code values allocated to the pixels corresponding to the ejection normal nozzles in the mask patterns after the non-ejection complementary processing are "10" and "11".

(ii) A case where the code value "11" is selected as the code value A of the complementary source pixel in step S704 of the first time In step S706, the code value "01" having a smaller number of times of permission of ejection of ink, of the code values "01" and "10", is selected as the code value B of the complementary destination pixel. The number of times of permission indicated by the code value "11" as the code value A is larger than the number of times of permission indicated by the code value "01" as the code value B. Therefore, the code value "01" is replaced with the code value "11" in step S708.

Next, the remaining code value "00" is selected as the code value A of the complementary source pixel in step S705 of the second time. Here, in the present embodiment, a pixel once selected as the complementary destination pixel serves as the complementary destination candidate pixel in the subsequent processing regardless of whether the replacement has been performed. Therefore, in step S705 of the second time, the code value "10" that has not been selected in step S706 of the first time, and the code value "11" after the replacement has been performed in step S708 are acquired as the code values of the complementary destination candidate pixels. Then, in step S706, the code value "10" having a smaller number of times of permission of ejection of ink, of the code values "10" and "11", is selected as the code value B of the complementary source pixel.

The number of times of permission indicated by the code value "00" as the code value A is smaller than the number of times of permission indicated by the code value "10" as the code value B. Therefore, the replacement in step S708 is not performed. Therefore, the code values allocated to the pixels corresponding to the ejection normal nozzles in the mask patterns after the non-ejection complementary processing are also "10" and "11".

Further, when the code values of the complementary source candidate pixels are "01" and "10", the code values allocated to the pixels corresponding to the ejection normal nozzles in the mask patterns before the non-ejection complementary processing are "00" and "11". Here, a case where the code value "01" is selected and a case where the code value "10" is selected as the code value A of the complementary source pixel in step S704 of the first time in the present embodiment will be respectively described.

(i) A case where the code value "01" is selected as the code value A of the complementary source pixel in step S704 of the first time In step S706, the code value "00" having a smaller number of times of permission of ejection of ink, of the code values "00" and "11", is selected as the code value B of the complementary destination pixel.

The number of times of permission indicated by the code value "01" as the code value A is larger than the number of times of permission indicated by the code value "00" as the code value B. Therefore, the code value "00" is replaced with the code value "01" in step S708.

Next, in step S705 of the second time, the remaining code value "10" is selected as the code value A of the complementary source pixel. Here, in the present embodiment, a pixel once selected as the complementary destination pixel serves as the complementary destination candidate pixel in the subsequent processing regardless of whether the replacement has been performed. Therefore, in step S705 of the second time, the code value "11" that has not been selected in step S706 of the first time, and the code value "01" after the replacement has been performed in step S708 of the first time are acquired as the code values of the complementary destination candidate pixels. Then, the code value "01" having a smaller number of times of permission of ejection of ink, of the code values "11" and "01", is selected as the code value B of the complementary source pixel in step S706.

The number of times of permission indicated by the code value "10" as the code value A is larger than the number of times of permission indicated by the code value "01" as the code value B. Therefore, the code value "01" is replaced with the code value "10" in step S708. Therefore, the code values allocated to the pixels corresponding to the ejection normal nozzles in the mask patterns after the non-ejection complementary processing are "10" and "11".

(ii) A case where the code value "10" is selected as the code value A of the complementary source pixel in step S704 of the first time In step S706, the code value "01" having a smaller number of times of permission of ejection of ink, of the code values "00" and "11", is selected as the code value B of the complementary destination pixel. The number of times of permission indicated by the code value "10" as the code value A is larger than the number of times of permission indicated by the code value "00" as the code value B. Therefore, the code value "00" is replaced with the code value "10" in step S708.

Next, the remaining code value "01" is selected as the code value A of the complementary source pixel in step S705 of the second time. Here, in the present embodiment, a pixel once selected as the complementary destination pixel serves as the complementary destination candidate pixel in the subsequent processing regardless of whether the replacement has been performed. Therefore, in step S705 of the second time, the code value "11" that has not been selected in step S706 of the first time, and the code value "10" for which the replacement has been performed in step S708 are acquired as the code values of the complementary destination candidate pixels. Then, the code value "10" having a smaller number of times of permission of ejection of ink, of the code values "11" and "10", is selected as the code value B of the complementary source pixel in step S706.

The number of times of permission indicated by the code value "01" as the code value A is smaller than the number of times of permission indicated by the code value "10" as the code value B. Therefore, the replacement in step S708 is not performed. Therefore, the code values allocated to the pixels corresponding to the ejection normal nozzles in the mask patterns after the non-ejection complementary processing are also "10" and "11".

Further, when the code values of the complementary source candidate pixels are "01" and "11", the code values allocated to the pixels corresponding to the ejection normal nozzles in the mask patterns before the non-ejection complementary processing are "00" and "10". Here, a case where the code value "01" is selected and a case where the code value "11" is selected as the code value A of the complementary source pixel in step S704 of the first time of the present embodiment will be respectively described.

(i) A case where the code value "01" is selected as the code value A of the complementary source pixel in step S704 of the first time In step S706, the code value "00" having a smaller number of times of permission of ejection of ink, of the code values "00" and "10", is selected as the code value B of the complementary destination pixel.

The number of times of permission indicated by the code value "01" as the code value A is larger than the number of times of permission indicated by the code value "00" as the code value B. Therefore, the code value "00" is replaced with the code value "01" in step S708.

Next, the remaining code value "11" is selected as the code value A of the complementary source pixel in step S705 of the second time. Here, in the present embodiment, a pixel once selected as the complementary destination pixel serves as the complementary destination candidate pixel in the subsequent processing regardless of whether the replacement has been performed. Therefore, in step S705 of the second time, the code value "10" that has not been selected in step S706 of the first time, and the code value "01" after the replacement has been performed in step S708 of the first time are acquired as the code values of the complementary destination candidate pixels. Then, in step S706, the code value "01" having a smaller number of times of permission of ejection of ink, of the code values "10" and "01", is selected as the code value B of the complementary source pixel.

The number of times of permission indicated by the code value "11" as the code value A is larger than the number of times of permission indicated by the code value "01" as the code value B. Therefore, the code value "01" is replaced with the code value "11" in step S708. Therefore, the code values allocated to the pixels corresponding to the ejection normal nozzles in the mask patterns after the non-ejection complementary processing are "10" and "11".

(ii) A case where the code value "11" is selected as the code value A of the complementary source pixel in step S704 of the first time In step S706, the code value "00" having a smaller number of times of permission of ejection of ink, of the code values "00" and "10", is selected as the code value B of the complementary destination pixel. The number of times of permission indicated by the code value "11" as the code value A is larger than the number of times of permission indicated by the code value "00" as the code value B. Therefore, the code value "00" is replaced with the code value "11" in step S708.

Next, the remaining code value "01" is selected as the code value A of the complementary source pixel in step S705 of the second time. Here, in the present embodiment, a pixel once selected as the complementary destination pixel serves as the complementary destination candidate pixel in the subsequent processing regardless of whether the replacement has been performed. Therefore, in step S705 of the second time, the code value "10" that has not been selected in step S706 of the first time, and the code value "11" after the replacement has been performed in step S708 are acquired as the code values of the complementary destination candidate pixels. Then, the code value "10" having a smaller number of times of permission of ejection of ink, of the code values "11" and "10", is selected as the code value B of the complementary source pixel in step S706.

The number of times of permission indicated by the code value "01" as the code value A is smaller than the number of times of permission indicated by the code value "10" as the code value B. Therefore, the replacement in step S708 is not performed. Therefore, the code values allocated to the pixels corresponding to the ejection normal nozzles in the mask patterns after the non-ejection complementary processing are also "10" and "11".

Further, when the code values of the complementary source candidate pixels are "10" and "11", the code values allocated to the pixels corresponding to the ejection normal nozzles in the mask patterns before the non-ejection complementary processing are "00" and "01". Here, a case where the code value "10" is selected and a case where the code value "11" is selected as the code value A of the complementary source pixel in step S704 of the first time in the present embodiment will be respectively described.

(i) A case where the code value "10" is selected as the code value A of the complementary source pixel in step S704 of the first time In step S706, the code value "00" having a smaller number of times of permission of ejection of ink, of the code values "00" and "01", is selected as the code value B of the complementary destination pixel.

The number of times of permission indicated by the code value "10" as the code value A is larger than the number of times of permission indicated by the code value "00" as the code value B. Therefore, the code value "00" is replaced with the code value "10" in step S708.

Next, the remaining code value "11" is selected as the code value A of the complementary source pixel in step S705 of the second time. Here, in the present embodiment, a pixel once selected as the complementary destination pixel serves as the complementary destination candidate pixel in the subsequent processing regardless of whether the replacement has been performed. Therefore, in step S705 of the second time, the code value "01" that has not been selected in step S706 of the first time, and the code value "10" for which the replacement has been performed in step S708 of the first time are acquired as the code values of the complementary destination candidate pixels. Then, in step S706, the code value "01" having a smaller number of times of permission of ejection of ink, of the code values "01" and "10", is selected as the code value B of the complementary source pixel.

The number of times of permission indicated by the code value "11" as the code value A is larger than the number of times of permission indicated by the code value "01" as the code value B. Therefore, the code value "01" is replaced with the code value "11" in step S708. Therefore, the code values allocated to the pixels corresponding to the ejection normal nozzles in the mask patterns after the non-ejection complementary processing are "10" and "11".

(ii) A case where the code value "11" is selected as the code value A of the complementary source pixel in step S704 of the first time In step S706, the code value "00" having a smaller number of times of permission of ejection of ink, of the code values "00" and "01", is selected as the code value B of the complementary destination pixel. The number of times of permission indicated by the code value "11" as the code value A is larger than the number of times of permission indicated by the code value "00" as the code value B. Therefore, the code value "00" is replaced with the code value "11" in step S708.

Next, in step S705 of the second time, the remaining code value "10" is selected as the code value A of the complementary source pixel. Here, in the present embodiment, a pixel once selected as the complementary destination pixel serves as the complementary destination candidate pixel in the subsequent processing regardless of whether the replacement has been performed. Therefore, in step S705 of the second time, the code value "01" that has not been selected in step S706 of the first time, and the code value "11" after the replacement has been performed in step S708 are acquired as the code values of the complementary destination candidate pixels. Then, in step S706, the code value "01" having a smaller number of times of permission of ejection of ink, of the code values "01" and "11", is selected as the code value B of the complementary source pixel.

The number of times of permission indicated by the code value "01" as the code value A is larger than the number of ties of permission indicated by the code value "10" as the code value B. Therefore, the code value "01" is replaced with the code value "10" in step S708. Therefore, the code values allocated to the pixels corresponding to the ejection normal nozzles in the mask patterns after the non-ejection complementary processing are also "10" and "11".

As described above, according to the present embodiment, when the ejection failure of ink has occurred in a plurality of ejection ports, the code values allocated to the ejection normal nozzles in the mask pattern after the non-ejection complementary processing can be made to "10" and "11", similarly to the second embodiment illustrated in FIG. 18, regardless of the combination of the code values of the complementary source candidate pixels. Therefore, an effect similar to that in the second embodiment can be obtained.

Fourth Embodiment

In the above-described first to third embodiments, forms to replace the code value B using the code value A when the code value A of the complementary source pixel is larger than the code value B of the complementary destination have been described.

In contrast, in the present embodiment, a form to exchange a code value A and a code value B when the code value A of a complementary source pixel is larger than the code value B of the complementary destination will be described.

Note that description of similar portions to the first to third embodiments is omitted.

A small amount of ink may be ejected when ejection of ink is determined in print data even in a case of an ejection defective nozzle.

That is, an ejection port corresponding to a region where a decrease in density is shown may also be identified as the ejection detective nozzle, in addition to an ejection port corresponding to a region where no ink is ejected, when a test pattern is printed and the test pattern is read. In this case, a small amount of ink may be ejected through the ejection defective nozzle corresponding to the region where the decrease in density is shown. Therefore, as described in the first to third embodiments, a small amount of ink may be ejected through the ejection defective nozzle if the print data that indicates ejection of ink remains allocated to the ejection defective nozzle. In this case, even if an ideal number of times of ejection of ink is expressed even when ejection failure occurs by the non-ejection complementary processing described in the first to third embodiments, a gap may be caused from the ideal number of times of ejection due to ejection of a small amount of ink through the ejection defective nozzle.

In view of the foregoing, in the present embodiment, non-ejection complementary processing such as print data that indicates non-ejection ("0") of ink being able to be easily generated for a pixel corresponding to the ejection defective nozzle is performed.

Figure 21:
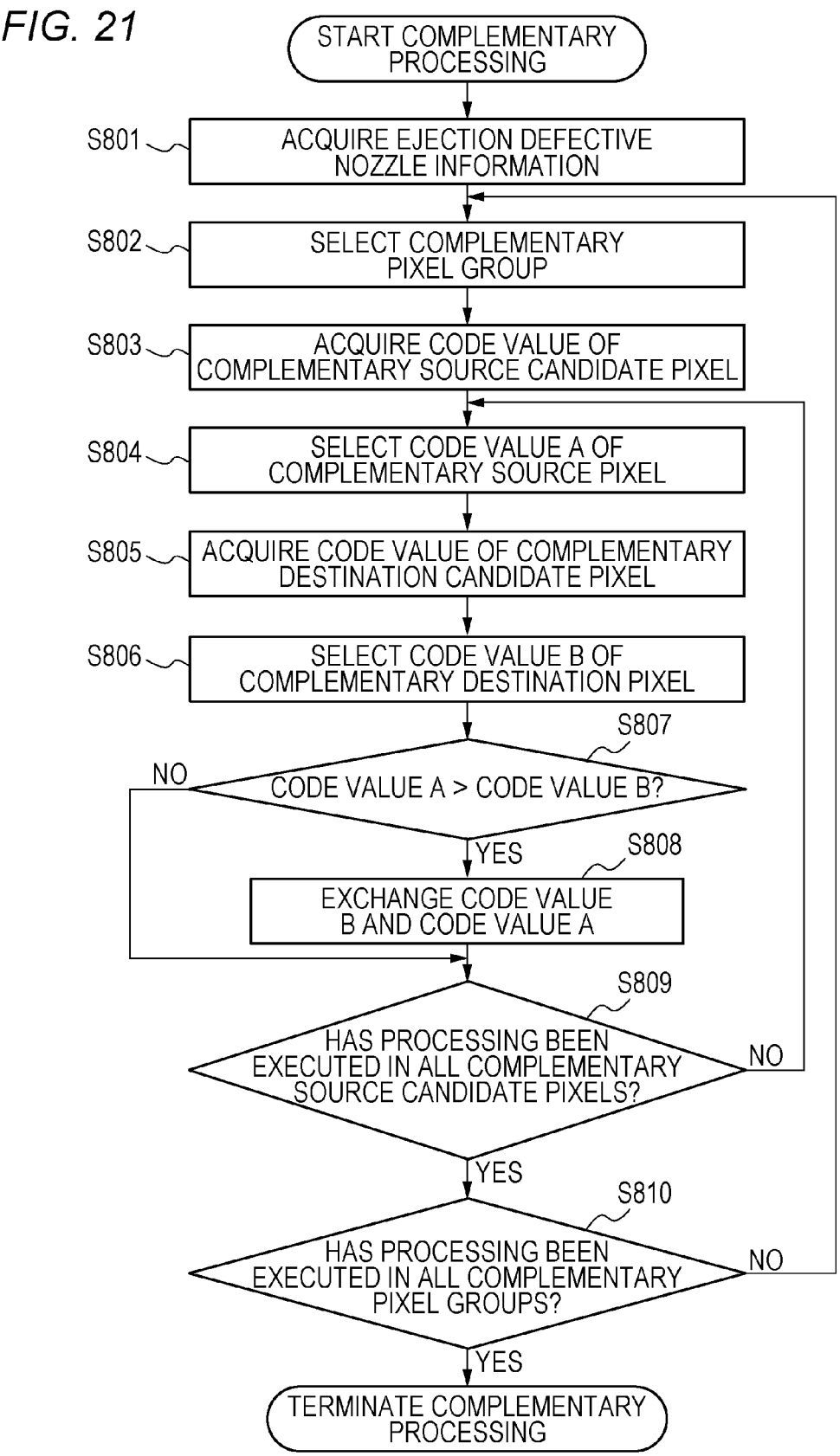
FIG. 21 is a diagram for describing a processing process of non-ejection complement in an embodiment.

FIG. 21 is a flowchart of a control program for executing the non-ejection complementary processing in the present embodiment. Note that processing in steps S801 to S807, S809, an S810 illustrated in FIG. 21 is similar to the processing in steps S701 to S707, S709, and S710 illustrated in FIG. 11, an thus description is omitted.

In step S807, when it is determined that the number of times of permission indicated by the code value A selected in step S804 is larger than the number of times of permission indicated by the code value B selected in step S806, in step S808, processing of exchanging the code value B determined for the complementary destination pixel and the code value A determined for the complementary source pixel is performed. Meanwhile, when the number of times of permission indicated by the code value A is smaller than the number of times of permission indicated by the code value B, the exchange processing is not executed.

For example, when the code value A selected in step S804 is "11", and the code value B selected in step S806 is "00", the number of times of permission (three times) indicated by the code value A is larger than the number of times of permission (zero times) indicated by the code value B. Therefore, in step S808, the code value B "00" of the complementary destination pixel and the code value A "11" of the complementary source pixel are exchanged. Therefore, after the exchange processing, the code value "11" is allocated to the complementary destination pixel, and the code value "00" is allocated to the complementary source pixel.

A process of when the non-ejection complementary processing illustrated in FIG. 21 is executed in a four-pass printing method will be herein described in detail, using a case in which an ejection defective nozzle 30a illustrated in FIG. 9 occurs, as an example.

FIGS. 22A to 22F are diagrams schematically illustrating an execution process of the non-ejection complementary processing.

Note that description of portions similar to the execution process of the non-ejection complementary processing illustrated in FIGS. 12A to 12F is omitted.

In the execution process of the non-ejection complementary processing illustrated in FIGS. 12A to 12F, for example, when the non-ejection complementary processing is executed for the first complementary pixel group made of four pixels 700, the number of times of permission (three times) indicated by the code value "11" of the pixel 700 in the mask pattern 505 as the code value A is larger than the number of times of permission (zero times) indicated by the code value "00" of the pixel 700 in the mask pattern 508 as the code value B. Therefore, the code value "00" of the pixel 700 in the mask pattern 508 is replaced with the code value "11" in step S708.

Meanwhile, in the present embodiment, the code value "00" of the pixel 700 in the mask pattern 508 and the code value "11" of the pixel 700 in the mask pattern 505 are exchanged in step S808. Therefore, as illustrated in FIG. 22C'-1, the code value of the pixel 700 in the mask pattern 505 after the non-ejection complement becomes "00". Further, as illustrated in FIG. 22C'-4, the code value of the pixel 700 in the mask pattern 508 after the non-ejection complement becomes "11".

Accordingly, the code value having a smaller number of times of permission is allocated to the pixel corresponding to the ejection defective nozzle in the mask pattern after the non-ejection complement. For example, by performing the non-ejection complementary processing of the present embodiment for the mask patterns illustrated in FIGS. 22C-1 to 22C-4, as can be seen from FIG. 22C'-1, the code value "00" is allocated to the pixels 700 to 703 in the mask pattern in the scanning of the first time corresponding to the ejection defective nozzles. Therefore, as illustrated in FIG. 22D-1, print data indicating non-ejection ("0") of ink can be easily generated for the ejection defective nozzle.

As described above, according to the present embodiment, printing in which a gap from an ideal number of times of ejection due to ejection of a small amount of ink through the ejection defective nozzle is suppressed can be performed.

Fifth Embodiment

In the present embodiment, the processing illustrated in FIG. 11 is simplified and non-ejection complementary processing is executed.

Note that description of similar portions to the first to fourth embodiments is omitted.

Figure 23:
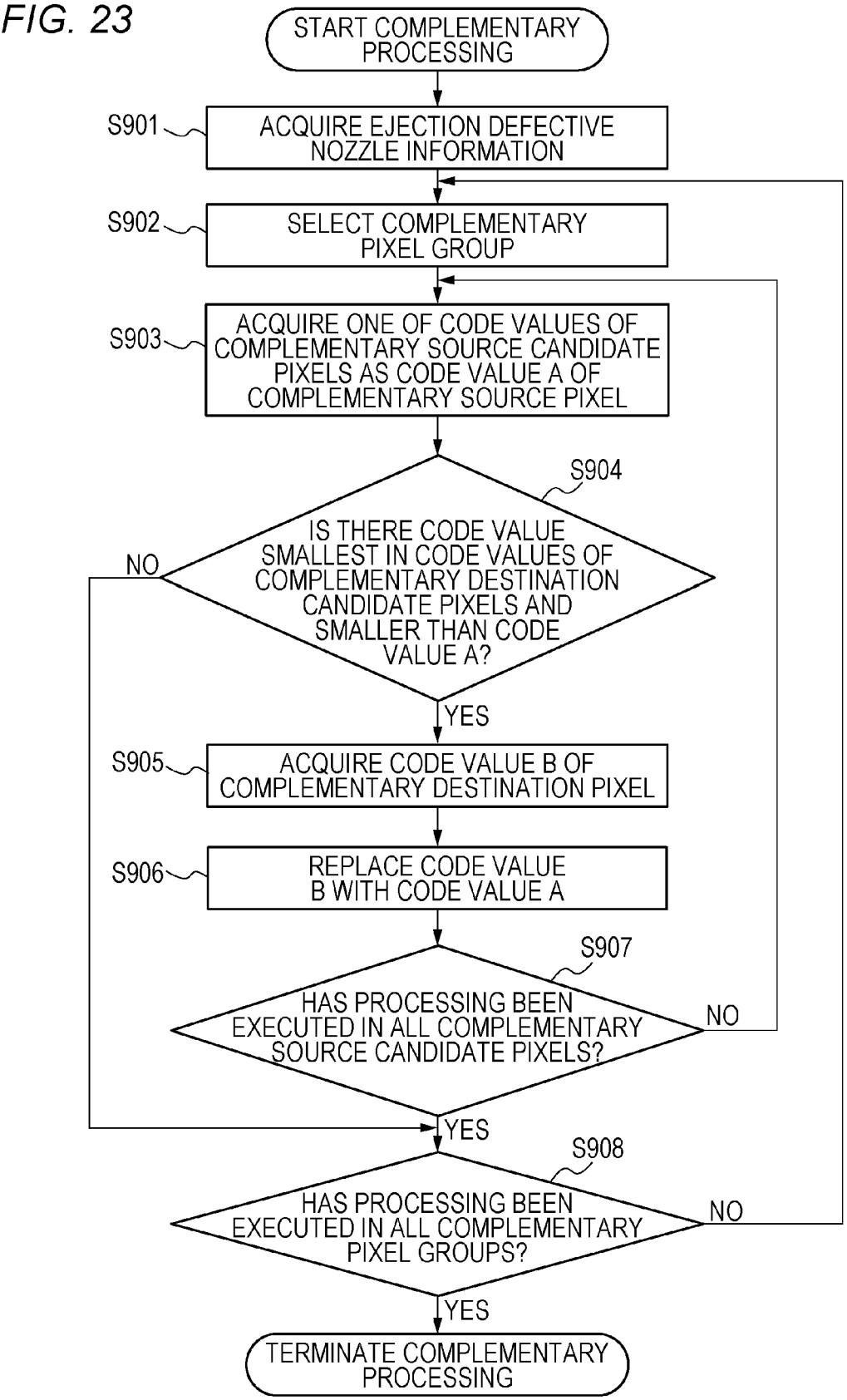
FIG. 23 is a diagram for describing a processing process of non-ejection complement in an embodiment.

FIG. 23 is a flowchart of a control program for executing the non-ejection complementary processing in the present embodiment. Note that processing illustrated in FIG. 23 can be realized by a CPU 301 reading the program stored in a ROM 302 to a RAM 303 and executing the program.

Steps S901 and S902 are similar to steps S701 and S702 illustrated in FIG. 11, and thus description is omitted.

Next, in step S903, one code value of code values of complementary source candidate pixels corresponding to ejection defective nozzles, of a complementary pixel group selected in step S902, is acquired as a code value A of a complementary source pixel. When a plurality of code values of complementary source candidate pixels exists, one code value may be randomly selected and acquired, or a code value having a larger number of times of permission of ejection of ink may be selected and acquired.

Next, in step S904, whether a code value indicating a smallest number of times of permission in code values of complementary destination candidate pixels corresponding to ejection normal nozzles, and indicating a smaller number of times of permission than the code value A of the complementary source pixel acquired in step S903 exists is determined.

For example, when the code value A of the complementary source pixel acquired in step S903 is "11", and the code values of the complementary destination candidate pixels are "00", "01", and "10", the code value "00" of the code values of the complementary destination candidate pixels satisfies the above conditions. Therefore, it is determined that the code value indicating a smallest number of times of permission in code values of complementary destination candidate pixels, and indicating a smaller number of times of permission than the code value A of the complementary source pixel exists.

Further, for example, when the code value A of the complementary source pixel acquired in step S903 is "10", and the code values of the complementary destination candidate pixels are "01" and "11", the code value "01" of the code values of the complementary destination candidate pixel satisfies the above conditions. Therefore, it is determined that the code value indicating a smallest number of times of permission in code values of complementary destination candidate pixels, and indicating a smaller number of times of permission than the code value A of the complementary source pixel exists.

Further, for example, when the code value A of the complementary source pixel acquired in step S903 is "01", and the code values of the complementary destination candidate pixels are "10" and "11", any of the code values of the complementary destination candidate pixel does not satisfy the above conditions. Therefore, it is determined that the code value indicating a smallest number of times of permission in code values of complementary destination candidate pixels, and indicating a smaller number of times of permission than the code value A of the complementary source pixel does not exist.

In step S904, when it is determined that the code value indicating a smallest number of times of permission in code values of complementary destination candidate pixels, and indicating a smaller number of times of permission than the code value A of the complementary source pixel exists, in step S905, the code value is acquired as the code value B of the complementary destination pixel. Then, in step S906, processing of replacing the code value B of the complementary destination pixel acquired in step S905 with the code value A of the complementary source pixel acquired in step S903 is performed.

Following that, in step S907, whether the complementary source candidate pixel for which the processing in steps S903 to S906 has not yet been executed, of the complementary pixel group selected in step S902, exists is determined. When it is determined that the processing in steps S903 to S906 has been executed for all the complementary source candidate pixels, the processing proceeds to step S908. Meanwhile, when it is determined that a remaining complementary source candidate pixel for which the processing in steps S903 to S906 has not yet been executed exists, the processing returns to step S903, and processing similar to the processing in step S903 to S906 is executed for the remaining complementary source candidate pixel. Here, the complementary destination pixel for which replacement has been executed even once in step S906 in one complementary pixel group may be excluded from the complementary destination candidate pixels in step S904 or may be used as the complementary candidate pixel again in the subsequent processing.

Meanwhile, in step S904, when it is determined that the code value indicating a smallest number of times of permission in code values of complementary destination candidate pixels, and indicating a smaller number of times of permission than the code value A of the complementary source pixel does not exist, the non-ejection complementary processing for the complementary pixel group selected in step S902 is terminated, and the processing proceeds to step S908.

Then, in step S908, whether the processing in steps S903 to S907 has been executed for all the complementary pixel groups that include at least one pixel corresponding to the ejection defective nozzle is determined. When it is determined that the complementary pixel group for which the processing in steps S903 to S907 has not yet been executed remains, the processing returns to S902, and the processing in steps S903 to S907 is executed for the remaining complementary pixel group. Meanwhile, when it is determined that the processing in steps S903 to S907 has been executed for all the complementary pixel groups, the non-ejection complementary processing is terminated, and the finally obtained mask pattern is updated as the mask pattern to be used for generation of the print data.

An effect similar to that of the first to fourth embodiments can be obtained even when the non-ejection complementary processing as described above is performed.

Sixth Embodiment

In the first to fifth embodiments, forms of using the mask patterns having b (b≥2)-bit information per pixel have been described.

In contrast, in the present embodiment, a form of using mask patterns having one-bit information per pixel will be described.

Note that description of portions similar to the first to fifth embodiments is omitted.

FIG. 24 is a diagram illustrating a decoding table used in generating print data in the present embodiment.

The image data in the present embodiment is configured from two-bit information per pixel, and any of three pixel values "00", "01", and "10" is allocated to each pixel. Here, when the pixel value is "00", an ink is not ejected to a corresponding pixel even once. Further, when the pixel value is "01", the ink is ejected to the corresponding pixel once. Further, when the pixel value is "10", the ink is ejected to the corresponding pixel twice.

Further, the mask pattern in the present embodiment is configured from one-bit information per pixel, and any of two code values "0" and "1" is allocated to the mask pattern.

Here, when the code value is "0", as can be seen by reference to the decoding table illustrated in FIG. 24, while the ink is not ejected when the pixel values in the corresponding pixels are "00" and "01", the ink is ejected when the code value is "10". In other words, the code value "0" corresponds to permission of ejection of ink only once for the three pixel values ("00", "01", and "10") (the number of times of permission of ejection of ink is once).

Further, when the code value is "1", while the ink is not ejected when the pixel value in the corresponding pixel is "00", the ink is ejected when the pixel values are "01" and "10". That is, the code value "1" corresponds to permission of ejection of ink twice for the three pixel values (the number of times of permission of ejection of ink is twice).

By use of such image data, mask patterns, and decoding table, in a two-pass printing method where printing is performed by twice of scanning to a unit area on a printing medium, the number of times of ejection from zero times to twice can be expressed for pixels.

In the present embodiment, when the two-pass printing method is executed using such image data, mask patterns, and decoding table, the non-ejection complementary processing illustrated in FIG. 11 is performed.

FIG. 25 is a diagram for describing code values finally allocated to pixels corresponding to ejection normal nozzles in mask patterns after the non-ejection complementary processing of the present embodiment, and an effect of suppression of degradation of image quality by use of the mask patterns after the non-ejection complementary processing, where the code values of the complementary source pixels are the respective values. Note that FIG. 25 exemplarily illustrates a case in which the ejection defective nozzles are caused in one pixel in a plurality of mask patterns (there is one complementary source candidate pixel).

Here, the first line of FIG. 25 illustrates that printing is performed by the two-pass printing method. The second line illustrates the code value A of the complementary source pixel of the mask pattern corresponding to the ejection defective nozzle. The third line illustrates the code value B of the complementary destination pixel of the mask pattern corresponding to the ejection normal nozzle. The fourth line illustrates the code value allocated to the mask pattern corresponding to the ejection normal nozzle after execution of the non-ejection complementary processing. The fifth line illustrates the pixel value of the image data. The sixth line illustrates the number of times of ejection of ink to the pixels when the ink is ejected based on the image data generated using the mask patterns before the non-ejection complementary processing is performed. The seventh line illustrates the number of times of ejection of ink to the pixels when the ink is ejected based on the print data generated using the mask patterns after the non-ejection complementary processing is performed.

When the code value of the complementary source pixel is "0", the code value allocated to the pixel corresponding to the ejection normal nozzle in the mask pattern before the non-ejection complementary processing is "1". Therefore, when the mask patterns before the non-ejection complementary processing are used, ideal numbers of times of ejection of ink can be expressed when the pixel values of the image data are "00" and "01" while an ideal number of times of ejection of ink cannot be expressed when the pixel value of the image data is "10". Meanwhile, the code value allocated to the pixel corresponding to the ejection normal nozzle in the mask pattern after the non-ejection complementary processing is also "1". Therefore, ideal numbers of times of ejection of ink can be expressed when the pixel values of the image data are "00" and "01" while an ideal number of times of ejection of ink cannot be expressed when the pixel value of the image data is "10".

Meanwhile, when the code value of the complementary source pixel is "1", the code values allocated to the pixels corresponding to the ejection normal nozzles in the mask patterns before the non-ejection complementary processing are "00", "10", and "11". Therefore, when the mask patterns before the non-ejection complementary processing are used, an ideal number of times of ejection of ink can be expressed when the pixel value of the image data is "00". However, an ideal number of times of ejection of ink cannot be expressed when the pixel values of the image data are "01" and "10". Meanwhile, the code value allocated to the pixel corresponding to the ejection normal nozzle in the mask pattern after the non-ejection complementary processing is "1". Therefore, an ideal number of times of ejection of ink can be expressed when the pixel value of the image data is "00" while an ideal number of times of ejection of ink cannot be expressed when the pixel value of the image data is "10". Further, when the mask patterns after the non-ejection complementary processing are used, an ideal number of times of ejection can be expressed when the pixel value of the image data is "01".

Seventh Embodiment

In the first to sixth embodiments, forms of performing printing by a plurality of times of print scanning to a unit area on a printing medium have been described.

In contrast, in the present embodiment, in a printing apparatus that performs printing by performing relative print scanning of printing heads and the printing medium once, using a plurality of printing heads corresponding to respective inks having a length corresponding to the entire region in a width direction (Z direction) of the printing medium, an ejection order of the plurality of inks is controlled.

Note that description of similar portions to the first to sixth embodiments is omitted.

FIG. 26 is a side view partially illustrating a configuration of an inside of an image printing apparatus according to the present embodiment.

In four printing heads 601 to 604, a predetermined number of ejection ports (not illustrated) that eject inks of yellow (Y), magenta (M), photo magenta (Pm), cyan (C), photo cyan (Pc), black (Bk) are arrayed in the Z direction per one printing head (ejection port array group). Therefore, four ejection port arrays that eject one color of ink are arrayed in total in the printing heads 601 to 604. The length of the ejection port array in the Z direction is the length of a printing medium 3 in the Z direction or more so that the printing can be performed on the entire region on the printing medium 3 in the Z direction. These printing heads 601 to 612 are arranged side by side in a W direction intersecting with the Z direction. Note that the four printing heads 601 to 604 are also collectively called printing unit.

A conveying belt 400 is a belt for conveying the printing medium 3, and conveys the printing medium 3 from a feeding portion 401 to a discharging portion 402 in the W direction intersecting with the Z direction by rotation of the conveying belt 400.

In this image printing apparatus, an image can be completed by one-time print scanning. Therefore, reduction of printing time can be achieved.

In the present embodiment, image data is distributed to the four ejection port arrays that eject the same color of ink in the printing heads 601 to 604 illustrated in FIG. 26, using the mask patterns corresponding to the respective times of scanning used in the first to fifth embodiments. For example, when the first mask pattern group illustrated in FIG. 11 is used, the mask pattern illustrated in FIG. 16C-1 is applied to the printing head 601 and the image data is distributed. Similarly, the mask patterns illustrated in FIGS. 16C-2, 16C-3, and 16C-4 are respectively applied to the printing heads 602, 603, and 604, and the image data is distributed. Then, by executing the non-ejection complementary processing illustrated in FIG. 11, even when the plurality of printing heads is used, favorable complement printing can be performed using the image data and the mask patterns having multiple-bit information when ejection failure of an ejection port is caused.

Further, the length of the ejection port array used in the present embodiment in the Z direction is the length corresponding to the width of the printing medium. However, a so-called connecting head that is made long by arraying a plurality of short ejection port arrays in the Z direction can be used as the printing head.

In the above-described embodiments, forms using the decoding table illustrated in FIG. 7 have been described. However, implementation with other forms is possible. For example, the decoding table illustrated in FIG. 27 may be used.

If the decoding table illustrated in FIG. 27 is used, when a code value is "00", an ink is not ejected even if a pixel value in a corresponding pixel is any of "00", "01", "10", and "11". That is, the code value "00" in the mask pattern corresponds to no permission of ejection of ink (the number of times of permission of ejection of ink is zero times).

Meanwhile, if the decoding table illustrated in FIG. 27 is used, when the code value is "01", the ink is not ejected when the pixel value in the corresponding pixel is "00", but the ink is ejected when the pixel values are "01", "10", and "11". In other words, the code value "01" corresponds to permission of ejection of ink only three times for the four pixel values ("00", "01", "10", and "11") (the number of times of permission of ejection of ink is three times).

Further, when the code value is "10", the ink is not ejected when the pixel values in the corresponding pixels are "00", "01", and "10", but the ink is ejected when the pixel value is "11". That is, the code value "10" corresponds to permission of ejection of ink once for the four pixel values (the number of times of permission of ejection of ink is once).

Further, when the code value is "11", the ink is not ejected when the pixel values in the corresponding pixels are "00" and "01", but the ink is ejected when the pixel values are "10" and "11". That is, the code value "11" corresponds to permission of ejection of ink twice for the four pixel values (the number of times of permission of ejection of ink is twice).

When using such a decoding table, the code values of the mask patterns are "00", "10", "11", and "10" in increasing order of the number of times of permission of ejection of ink. Therefore, for example, when the code values of the complementary destination candidate pixels acquired in step S705 are "00" and "11", the code value "00" may just be selected as the code value B of the complementary destination pixel in step S706. Further, for example, when the code values of the complementary destination candidate pixels acquired in step S705 are "01", "10", and "11", the code value "10" may just be selected as the code value B of the complementary destination pixel in step S706.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, in the embodiments, so-called thermal jet-type ink jet printing apparatus and printing method, which eject inks by energy of bubbling caused by heating, have been described. However, the present invention is not limited to the thermal jet-type ink jet printing apparatus. For example, the present invention can be effectively applied to various image printing apparatuses such as a piezo-type ink jet printing apparatus that ejects inks using piezoelectric transducers.

Further, in the embodiments, an image printing method using an image printing apparatus has been described. However, an image processing apparatus, an image processing method, and a program, which generate data for performing the image printing method described in the embodiments, can be applied to a form prepared in a separate body from the image printing apparatus. Further, the image processing apparatus, the image processing method, and the program can be widely applied to a form included in a part of the image printing apparatus.

Further, the "printing medium" includes not only paper used in a typical printing apparatus, but also ones that can accept inks such as fabric, plastic films, metal plates, glass, ceramics, wood, and leather.

Further, the "ink" means a liquid that can be provided for formation of an image, a design, a pattern, and the like, processing of the printing medium, or processing of an ink (for example, solidification or insolubilization of a colorant in the ink provided for the printing medium) by being provided on the printing medium.

According to the image processing apparatus and the image processing method of the present invention, print data to be used for printing can be generated so that favorable complement printing can be performed when ejection failure of an ejection port is caused even when printing is performed to eject a plurality of times of ink to one pixel region.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-079488, filed Apr. 8, 2015, which is hereby incorporated by reference herein in its entirety.

What is claimed is:

1. An image processing apparatus that generates print data using a printing head having an ejection port array in which a plurality of ejection ports for ejecting inks is arrayed in a predetermined direction, the print data using the printing head in each of K (K≥3) times of relative scanning to a unit area on a printing medium in a crossing direction intersecting with the predetermined direction, and the print data determining ejection or non-ejection of ink to each of pixel-equivalent pixel regions in the unit area, the image processing apparatus comprising:
a first acquiring unit configured to acquire image data in which information indicating the number of times of ejection of ink from zero to N (2≤N≤K) times for each of the plurality of pixel regions is determined for each pixel;
a storage unit configured to store a first mask pattern in which information indicating the number of times of permission of ejection of ink from 0 to M (2≤M≤K) times for each of the plurality of pixel regions is determined for each pixel;
a specifying unit configured to specify the first ejection port in which ejection failure of ink exists, of the plurality of ejection ports;
a first selecting unit configured to select the information indicating the number of times of permission in the K pixels, of the information determined by the first mask pattern stored in the storage unit, the K pixels corresponding to K different ejection ports including at least the first ejection port specified by the specifying unit and capable of ejecting the inks to a same position to each other in the K times of scanning, and the K pixels being positioned in a same position to each other in the crossing direction;
a second acquiring unit configured to acquire the information indicating the number of times of permission in a pixel corresponding to the first ejection port specified by the specifying unit, among the information selected by the first selecting unit;
a third acquiring unit configured to acquire the information indicating the number of times of permission in a pixel corresponding to the second ejection port not specified by the specifying unit, among the information selected by the first selecting unit;
a second selecting unit configured to select the first information having a smallest number of times of permission indicated by the information, from the information acquired by the third acquiring unit;
a first generating unit configured to generate a second mask pattern by replacing the first information selected by the second selecting unit using the information acquired by the second acquiring unit when the number of times of permission indicated by the information acquired by the second acquiring unit is larger than the number of times of permission indicated by the first information selected by the second selecting unit; and
a second generating unit configured to generate the print data based on the image data acquired by the first acquiring unit, and the second mask pattern generated by the first generating unit.

2. The image processing apparatus according to claim 1, wherein the first generating unit generates the second mask pattern without replacing the first information selected by the second selecting unit when the number of times of permission indicated by the information acquired by the second acquiring unit is smaller than the number of times of permission indicated by the first information selected by the second selecting unit.

3. The image processing apparatus according to claim 2, further comprising:
a third selecting unit configured to select the second information from the information acquired by the second acquiring unit when a plurality of the first ejection ports is specified in the K ejection ports by the specifying unit, wherein
the first generating unit generates the second mask pattern by replacing the first information selected by the second selecting unit using the second information selected by the third selecting unit when the number of times of permission indicated by the second information selected by the third selecting unit is larger than the number of times of permission indicated by the first information selected by the second selecting unit.

4. The image processing apparatus according to claim 3, wherein the third selecting unit selects the information having the largest number of times of permission indicated by the information from the information acquired by the second acquiring unit as the second information.

5. The image processing apparatus according to claim 4, wherein the second selecting unit further selects the third information having the next smallest number of times of permission indicated by the information to the number of times of permission indicated by the first information from the information acquire by the third acquiring unit,
the third selecting unit further selects the fourth information having the next largest number of times of permission indicated by the information to the number of times of permission indicated by the second information from the information acquired by the second acquiring unit, and
the first generating unit generates the second mask pattern by replacing the third information selected by the second selecting unit using the fourth information selected by the third selecting unit when the number of times of permission indicated by the fourth information selected by the third selecting unit is larger than the number of times of permission indicated by the third information selected by the second selecting unit.

6. The image processing apparatus according to claim 5, wherein the first generating unit generates the second mask pattern without replacing the third information selected by the second selecting unit when the number of times of permission indicated by the fourth information selected by the third selecting unit is smaller than the number of times of permission indicated by the third information selected by the second selecting unit.

7. The image processing apparatus according to claim 1, wherein the first generating unit generates the second mask pattern by replacing the information acquired by the second acquiring unit using the first information selected by the second selecting unit when the number of times of permission indicated by the information acquired by the second acquiring unit is larger than the number of times of permission indicated by the first information selected by the second selecting unit.

8. The image processing apparatus according to claim 1, wherein the first mask pattern is configured from K first mask patterns corresponding to the K times of scanning, and
the second mask pattern is configured from K second mask patterns corresponding to the K times of scanning.

9. The image processing apparatus according to claim 8, wherein, in M pixels of K pixels corresponding to the same position to each other in the K first mask patterns, information indicating different numbers of times of permission from each other, of once to M times of permission, is determined.

10. The image processing apparatus according to claim 9, wherein, in all the K−M pixels other than the M pixels, of the K pixels corresponding to the same position to each other in the K first mask patterns, information indicating zero times of permission is determined.

11. The image processing apparatus according to claim 8, wherein, in the K first mask patterns, information indicating a predetermined number of times of permission, of once to M times of permission, is determined in nearly a same number of pixels to each other.

12. The image processing apparatus according to claim 1, wherein M=N.

13. The image processing apparatus according to claim 12, wherein M=N=3.

14. The image processing apparatus according to claim 1, wherein the second generating unit generates the print data using a table in which ejection or non-ejection of ink for each pixel region is defined, according to the information indicating the number of times of ejection that determines the image data, and the information indicating the number of times of permission that determines the second mask pattern.

15. The image processing apparatus according to claim 14, wherein the table defines (i) ejection of ink when the number of times of ejection indicated by the information that determines the image data is a first number of times of ejection, and the number of times of permission indicated by the information that determines the second mask pattern is a first number of times of permission, and (ii) non-ejection of ink when the number of times of ejection indicated by the information that determines the image data is the first number of times of ejection, and the number of times of permission indicated by the information that determines the second mask pattern is a second number of times of permission smaller than the first number of times of permission.

16. The image processing apparatus according to claim 15, wherein the table defines non-ejection of ink when the number of times of ejection indicated by the information that determines the image data is the second number of times of ejection smaller than the first number of times, and the number of times of permission indicated by the information that determines the second mask pattern is the first number of times of permission.

17. The image processing apparatus according to claim 1, wherein the information indicating the number of times of ejection that determines the image data is a (a≥2)-bit information, and
the information indicating the numbers of times of permission that determine the first mask pattern and the second mask pattern is b (b≥2)-bit information.

18. The image processing apparatus according to claim 1, further comprising:
the printing head.

19. An image processing apparatus that generates print data using a printing head having an ejection port array in which a plurality of ejection ports for ejecting inks is arrayed in a predetermined direction, the print data using the printing head in each of K (K≥3) times of relative scanning to a unit area on a printing medium in a crossing direction intersecting with the predetermined direction, and the print data determining ejection or non-ejection of ink to each of pixel-equivalent pixel regions in the unit area, the image processing apparatus comprising:
a first acquiring unit configured to acquire the image data in which information indicating the number of times of ejection of ink from zero to N (2≤N≤K) times for each of the plurality of pixel regions is determined for each pixel;
a storage unit configured to store a first mask pattern in which information indicating the number of times of permission of ejection of ink from 0 to M (2≤M≤K) times for each of the plurality of pixel regions is determined for each pixel;
a specifying unit configured to specify the first ejection port in which ejection failure of ink exists, of the plurality of ejection ports;
a selecting unit configured to select the information indicating the number of times of permission in the K pixels, of the information determined by the first mask pattern stored in the storage unit, the K pixels corresponding to K different ejection ports including at least the first ejection port specified by the specifying unit and capable of ejecting the inks to a same position to each other in the K times of scanning, and the K pixels being positioned in a same position to each other in the crossing direction;
a second acquiring unit configured to acquire the information indicating the number of times of permission in a pixel corresponding to the first ejection port specified by the specifying unit, among the information selected by the selecting unit;
a first generating unit configured to generate a second mask pattern by replacing the first information using the information acquired by the second acquiring unit when the number of times of permission indicated by the information acquired by the second acquiring unit is larger than the number of times of permission indicated by the first information, of the first information indicating the smallest number of times of permission, of the information indicating the numbers of times of permission in pixels corresponding to the second ejection port not specified by the specifying unit, among the information selected by the selecting unit, and the information acquired by the second acquiring unit; and
a second generating unit configured to generate the print data based on the image data acquired by the first acquiring unit, and the second mask pattern generated by the first generating unit.

20. An image processing method for generating print data using a printing head having an ejection port array in which a plurality of ejection ports for ejecting inks is arrayed in a predetermined direction, the print data using the printing head in each of K (K≥3) times of relative scanning to a unit area on a printing medium in a crossing direction intersecting with the predetermined direction, and the print data determining ejection or non-ejection of ink to each of pixel-equivalent pixel regions in the unit area, the image processing method comprising:
- a first acquiring step of acquiring image data in which information indicating the number of times of ejection of ink from zero to N ($2 \leq N \leq K$) times for each of the plurality of pixel regions is determined for each pixel;
- a reading step of reading a first mask pattern in which information indicating the number of times of permission of ejection of ink from 0 to M ($2 \leq M \leq K$) times for each of the plurality of pixel regions is determined for each pixel;
- a specifying step of specifying the first ejection port in which ejection failure of ink exists, of the plurality of ejection ports;
- a first selecting step of selecting the information indicating the number of times of permission in the K pixels, of the information determined by the first mask pattern read in the reading step, the K pixels corresponding to K different ejection ports including at least the first ejection port specified by the specifying step, and capable of ejecting the inks to a same position to each other in the K times of scanning, and the K pixels being positioned in a same position to each other in the crossing direction;
- a second acquiring step of acquiring the information indicating the number of times of permission in a pixel corresponding to the first ejection port specified by the specifying step, among the information selected by the first selecting step;
- a third acquiring step of acquiring the information indicating the number of times of permission in a pixel corresponding to the second ejection port not specified by the specifying step, among the information selected by the first selecting step;
- a second selecting step of selecting the first information having a smallest number of times of permission indicated by the information, from the information acquired by the third acquiring step;
- a first generating step of generating a second mask pattern by replacing the first information selected by the second selecting step using the information acquired by the second acquiring step when the number of times of permission indicated by the information acquired by the second acquiring step is larger than the number of times of permission indicated by the first information selected by the second selecting step; and
- a second generating step of generating the print data based on the image data acquired by the first acquiring step, and the second mask pattern generated by the first generating step.

* * * * *